(12) United States Patent
Ooshima et al.

(10) Patent No.: US 8,657,433 B2
(45) Date of Patent: Feb. 25, 2014

(54) PORPHYRAZINE COLORING MATTER, INK COMPOSITION, RECORDING METHOD, AND COLORED OBJECT

(75) Inventors: Kenji Ooshima, Tokyo (JP); Takashi Yoneda, Tokyo (JP); Yasuo Kuroda, Tokyo (JP); Akira Kawaguchi, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 115 days.

(21) Appl. No.: 13/377,262

(22) PCT Filed: Jun. 8, 2010

(86) PCT No.: PCT/JP2010/059664
§ 371 (c)(1),
(2), (4) Date: Dec. 9, 2011

(87) PCT Pub. No.: WO2010/143619
PCT Pub. Date: Dec. 16, 2010

(65) Prior Publication Data
US 2012/0081457 A1 Apr. 5, 2012

(30) Foreign Application Priority Data
Jun. 12, 2009 (JP) .................................. 2009-141201

(51) Int. Cl.
*B41J 2/01* (2006.01)
(52) U.S. Cl.
USPC ........................................ 347/100; 106/31.13
(58) Field of Classification Search
USPC ........................................ 347/100; 106/31.13
See application file for complete search history.

(56) References Cited

U.S. PATENT DOCUMENTS

| | | | | |
|---|---|---|---|---|
| 7,083,669 B2 * | 8/2006 | Fukumoto et al. | ......... | 106/31.49 |
| 7,276,111 B2 * | 10/2007 | Oki et al. | ................... | 106/31.49 |
| 7,279,034 B2 * | 10/2007 | Oki et al. | ................... | 106/31.58 |
| 7,303,616 B2 * | 12/2007 | Oki et al. | ................... | 106/31.49 |
| 7,854,797 B2 * | 12/2010 | Fujii et al. | ................... | 106/31.47 |
| 2008/0275286 A1 * | 11/2008 | Xiao et al. | ...................... | 585/734 |
| 2009/0029120 A1 * | 1/2009 | Fujii et al. | ................... | 428/195.1 |
| 2009/0047430 A1 * | 2/2009 | Mori et al. | .................... | 427/256 |
| 2009/0095199 A1 * | 4/2009 | Aikawa et al. | ............. | 106/31.47 |
| 2009/0151599 A1 * | 6/2009 | Fujii et al. | ................... | 106/31.47 |
| 2010/0112218 A1 * | 5/2010 | Fujii et al. | ..................... | 427/256 |
| 2010/0279082 A1 * | 11/2010 | Shimizu et al. | ............. | 428/195.1 |
| 2012/0147084 A1 * | 6/2012 | Ikeda et al. | ..................... | 347/20 |
| 2012/0148807 A1 * | 6/2012 | Ikeda et al. | ................ | 428/195.1 |

FOREIGN PATENT DOCUMENTS

| | | |
|---|---|---|
| JP | 59-022967 | 2/1984 |
| JP | S60 208365 A | 10/1985 |
| JP | 62-190273 | 8/1987 |
| JP | 05-171085 | 7/1993 |
| JP | 07-138511 | 5/1995 |
| JP | 10-140063 | 5/1998 |
| JP | 11-515048 | 12/1999 |
| JP | 2000-303009 | 10/2000 |
| JP | 2002-080762 | 3/2002 |
| JP | 2002-105349 | 4/2002 |
| JP | 2002-249677 | 9/2002 |
| JP | 2003-034758 | 2/2003 |
| JP | 2004-075986 | 3/2004 |
| JP | 2008-013706 | 1/2008 |
| JP | 2009-057540 | 3/2009 |
| WO | WO 97/13812 | 4/1997 |
| WO | WO 02/34844 A1 | 5/2002 |
| WO | WO 2004/087815 A1 | 10/2004 |
| WO | WO 2007/091631 A1 | 8/2007 |
| WO | WO 2007/116933 A1 | 10/2007 |
| WO | WO 2008/068843 A1 | 6/2008 |
| WO | WO 2008/111635 A1 | 9/2008 |
| WO | WO 2010/001559 A1 | 1/2010 |

OTHER PUBLICATIONS

Extended European Search Report issued in EP Application No. 10786150.2, mailed May 7, 2013.

* cited by examiner

*Primary Examiner* — Laura Martin
(74) *Attorney, Agent, or Firm* — Knobbe Martens Olson & Bear LLP

(57) ABSTRACT

Provided is a porphyrazine dye suitable for use in ink-jet recording, the porphyrazine dye giving a cyan ink with a satisfactory hue, having various excellent fastness properties, in particular, ozone resistance, and attaining a high color density. Also provided is an ink composition containing the dye. The porphyrazine dye is a porphyrazine dye represented by formula (1) or a salt thereof. In formula (1), rings A to D each independently represents a benzene ring, a nitrogenous heteroaromatic ring, etc.; E represents an alkylene; X represents sulfoanilino, etc.; R represents a hydrogen atom, sulfo, carboxy, etc.; group F represents phenyl, a nitrogenous heteroaromatic ring, etc.; a is an integer of 1-6; b is 0.00-3.90, excluding 3.90, on average; c is 0.10-4.00, excluding 4.00, on average; and the sum of b and c is 1.00-4.00, excluding 4.00, on average.

18 Claims, No Drawings

PORPHYRAZINE COLORING MATTER, INK COMPOSITION, RECORDING METHOD, AND COLORED OBJECT

This application is the U.S. National Phase under 35 U.S.C. §371 of International Application PCT/JP2010/059664, filed Jun. 8, 2010, designating the U.S., and published in Japanese as WO 2010/143619 on Dec. 16, 2010, which claims priority to Japanese Patent Application No. 2009-141201, filed Jun. 12, 2009, the entire contents of which are incorporated herein by reference.

TECHNICAL FIELD

The present invention relates to a novel porphyrazine coloring matter, an ink composition containing this, an ink jet recording method using this ink composition, and a colored object.

BACKGROUND ART

In recent years, materials for forming color images have predominantly been employed as image recording materials. More specifically, recording materials used in systems such as ink jet systems and electrophotography systems; thermal transfer type image recording materials; transfer-type silver halide sensitive materials; printing inks; recording pens; etc. are widely used. In addition, color filters have been used in the displays for LCD (liquid crystal display) and PDP (plasma display panel) and in filming equipment for electronic components such as CCD (charge-coupled device). In these color image recording materials and color filters, in order to reproduce or record a full color image, the coloring matters (dye or pigment) of three primary colors of the so-called additive color mixture system or subtractive color mixture system have been used; however, the current situation is that coloring matters having a preferable absorbing characteristic of light wavelength that can realize a gamut of reproducible colors, and can endure various service conditions do not exist, and thus improvements thereto have been strongly desired.

The ink jet recording method has rapidly spread and continues to be further developed due to the material cost being inexpensive, high-speed recording being possible, the noise during recording being low, ease of color recording, and the like. The ink jet recording method includes a continuous system in which drops are continuously made to jet, and an on-demand system in which drops are made to jet according to an image information signal. In addition, the spray methods thereof include a method of causing drops to discharge by increasing pressure using a piezo element; a method of causing drops to discharge by generating bubbles in the ink by heat; a method using ultrasonic waves; a method of causing drops to be attractively discharged using electrostatic force; and the like. As examples of inks suited to such ink-jet recording, water-based ink, oil-based ink, solid (molten type) ink, and the like can be exemplified.

The performances demanded in the coloring matters used in inks for ink-jet recording include: the solubility in solvents and dispersability being favorable; high-density recording being possible; hue being favorable; having strong resistance to light, heat, active gasses in the environment (e.g., oxidizing gases such as NOx and ozone, and SOx), and the like; excelling in durability to water and chemicals; good fusability to recorded material; low bleeding tendency; excelling storability of ink containing the coloring matter; no toxicity; and further, ability to procure inexpensively; and the like. In particular, as a cyan coloring matter, it is strongly desired to have favorable cyan hue and high print density, and for bronzing phenomenon not to occur, and to excel in various resistances such as light resistance (durability to light), ozone resistance (durability to ozone gas), water resistance (durability to water), and moisture resistance (durability under high moisture environment), for example.

The bronzing phenomenon refers to a speckle phenomenon caused by the association of coloring matters, the ineffective absorption of inks, and the like, in which the coloring matter becomes a metallic flake shape on the surface of the record-receiving material. When this phenomenon occurs, the record-receiving material becomes worse in all of the aspects of luster, print quality and print density. Particularly in a case of using a metallic phthalocyanine coloring matter as the coloring matter, the "bronzing phenomenon" often appears in areas in which printing was performed at high density, and the color balance of the overall image becomes non-uniform, thereby lowering the quality thereof. Furthermore, in recent years, glossy paper is often used as a recording medium having texture near that of photographic; however, when the bronzing phenomenon occurs, variation arises in the glossy sense for the recorded matter surface, and the texture of the image drastically suffers. A coloring matter for which the bronzing phenomenon does not occur is strongly desired from such a perspective.

Phthalocyanine and triphenylmethane based coloring matters are exemplary of the aqueous cyan coloring matters used in cyan inks for ink jet recording. Among these, the phthalocyanine derivatives classified into the following A to H are known as typical phthalocyanine coloring matters.

A: Well-known phthalocyanine coloring matter having a C.I. (color index) number such as Direct Blue 86, Direct Blue 87, Direct Blue 199, Acid Blue 249, and Reactive Blue 71.

B: Phthalocyanine coloring matter disclosed in Patent Documents 1 to 3, etc.
(For example, $Cu\text{-}Pc\text{-}(SO_3Na)m(SO_2NH_2)n$; mixture of m+n=1 to 4.)

C: Phthalocyanine coloring matter disclosed in Patent Document 4, etc.
(For example, $Cu\text{-}Pc\text{-}(CO_2H)m(CONR^1R^2)n$; m+n=number of 0 to 4.)

D: Phthalocyanine coloring matter disclosed in Patent Document 5, etc.
(For example, $Cu\text{-}Pc\text{-}(SO_3H)m(SO_2NR^1R^2)n$; m+n=number of 0 to 4, and m is not 0.)

E: Phthalocyanine coloring matter disclosed in Patent Document 6, etc.
(For example, $Cu\text{-}Pc\text{-}(SO_3H)l(SO_2NH_2)m(SO_2NR^1R^2)n$; l+m+n=number of 0 to 4.)

F: Phthalocyanine coloring matter disclosed in Patent Document 7, etc.
(For example, $Cu\text{-}Pc\text{-}(SO_2NR^1R^2)n$; n=number of 1 to 5.)

G: Phthalocyanine coloring matter disclosed in Patent Documents 8, 9, 12, etc.
(Position of substitution of substituent-controlled phthalocyanine compound, phthalocyanine coloring matter in which substituent is introduced at β-position.)

H: Benzopyridoporphyrazine coloring matter having pyridine ring and benzene ring disclosed in Patent Documents 10, 13, 14 to 16, etc.

Presently, phthalocyanine coloring matters typified by C.I. Direct Blue 86 or C.I. Direct Blue 199, which are widely used for ink jet recording, are characterized in generally excelling in light resistance compared to magenta coloring matters and yellow coloring matters. However, phthalocyanine coloring matters are greenish hues under acidic conditions, and are not very preferable hues as cyan inks. As a result, in a case of using these coloring matters as cyan inks, it is preferable to be used under neutral to basic conditions. However, even if the ink is neutral or basic, in a case of the record-receiving material being acidic paper, for example, there is a possibility that the hue of the recorded matter will change greatly.

In addition, in a case of using phthalocyanine coloring matters as cyan inks, depending on the oxidizing gases such as nitric oxide gas and ozone, which are often exemplified as recent environmental problems, the hue of the recorded matter will change to a greenish color, and decoloring, fading or the like will also occur; therefore, a phenomenon will occur in which the print density of the recorded matter declines.

On the other hand, although the hues are known to be favorable for triphenylmethane dyes, it is much worse than phthalocyanine coloring matters in terms of the light resistance, ozone resistance, and moisture resistance.

In the future, if the field of application of ink jet recording expands and becomes widely employed in display items such as advertisements, the chance for the coloring matters and inks used therein to be exposed to light and oxidizing gasses in the environment will also increase. As a result, it has been increasingly strongly desired for a cyan coloring matter for ink jet recording to have favorable hue, to be low cost, as well as excelling in the above such various resistances. However, it has been regarded as difficult to develop a cyan coloring matter and cyan ink satisfying these requirements at a high level. Although the phthalocyanine coloring matters imparted with ozone resistance up to now have been disclosed in Patent Documents 3, 8 to 12, 14 to 17, etc., a cyan coloring matter has yet to be obtained that satisfies all qualities such as hue, print density, light resistance, ozone resistance, moisture resistance, and not producing bronzing phenomenon, and furthermore, enabling manufacture at low cost. Therefore, it still falls short of adequately satisfying the market requirements.

Patent Document 1: Japanese Unexamined Patent Application Publication No. S62-190273
Patent Document 2: Japanese Unexamined Patent Application Publication No. H7-138511
Patent Document 3: Japanese Unexamined Patent Application Publication No. 2002-105349
Patent Document 4: Japanese Unexamined Patent Application Publication No. H5-171085
Patent Document 5: Japanese Unexamined Patent Application Publication No. H10-140063
Patent Document 6: Japanese Unexamined Patent Application (Translation of PCT Publication), Publication No. H11-515048
Patent Document 7: Japanese Unexamined Patent Application Publication No. S59-22967
Patent Document 8: Japanese Unexamined Patent Application Publication No. 2000-303009
Patent Document 9: Japanese Unexamined Patent Application Publication No. 2002-249677
Patent Document 10: Japanese Unexamined Patent Application Publication No. 2003-34758
Patent Document 11: Japanese Unexamined Patent Application Publication No. 2002-80762
Patent Document 12: PCT International Publication No. WO2004/087815
Patent Document 13: PCT International Publication No. WO2002/034844
Patent Document 14: Japanese Unexamined Patent Application Publication No. 2004-75986
Patent Document 15: PCT International Publication No. WO2007/091631
Patent Document 16: PCT International Publication No. WO2007/116933
Patent Document 17: PCT International Publication No. WO2008/111635

DISCLOSURE OF THE INVENTION

Problems to be Solved by the Invention

The present invention has an object of providing a porphyrazine coloring matter having favorable hue as a cyan ink, excelling in ozone resistance, and is suited to ink jet recording in which high print density is obtained, as well as an ink composition containing this.

Means for Solving the Problems

Upon thoroughly researching coloring matters having favorable hue, having high light resistance and ozone resistance, while not causing bronzing phenomenon, the present inventor found that a certain porphyrazine coloring matter represented by the following formula (1) could solve the above-mentioned problems, thereby arriving at completion of the present invention.

Accordingly, a first aspect of the present invention provides a porphyrazine coloring matter represented by the following formula (1) or a salt thereof,

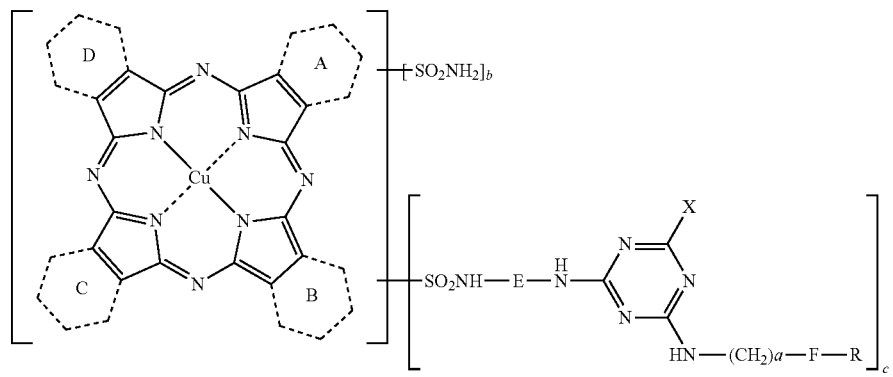

in the formula (1):
rings A to D represented by dotted lines each independently represent a benzene ring or a six-membered nitrogen-containing heteroaromatic ring that has been ring condensed to a porphyrazine ring; and the number of nitrogen-containing heteroaromatic rings is more than 0.00 and no more than 3.00 in terms of mean value, and the rest represents a benzene ring;

E represents a C2-C12 alkylene;

X represents a sulfoanilino group, a carboxyanilino group, a phosphonoanilino group, a sulfonaphthylamino group, a carboxynaphthylamino group or a phosphononaphthylamino group which may have one or at least two types of substituent(s) selected from the group consisting of a sulfo group, a carboxy group, a phosphorate group, a sulfamoyl group, a carbamoyl group, a hydroxy group, a C1-C6 alkoxy group, an amino group, a mono-C1-C4 alkylamino group, a di-C1-C4 alkylamino group, a mono-C6-C10 arylamino group, a di-C6-C10 arylamino group, a C1-C3 alkylcarbonylamino group, an ureido group, a C1-C6 alkyl group, a nitro group, a cyano group, a halogen atom, a C1-C6 alkylsulfonyl group, and a C1-C6 alkylthio group;

R represents a hydrogen atom, a sulfo group, a carboxy group, a phosphorate group, a sulfamoyl group, a carbamoyl group, a hydroxy group, a C1-C6 alkoxy group, an amino group, a mono-C1-C6 alkylamino group, a di-C1-C6 alkylamino group, a mono-C6-C10 arylamino group, a di-C6-C10 arylamino group, a C1-C3 alkylcarbonylamino group, an ureido group, a C1-C6 alkyl group, a nitro group, a cyano group, a halogen atom, a C1-C6 alkylsulfonyl group, or an alkylthio group;

group F represents a phenyl group, or a six-membered nitrogen-containing heteroaromatic ring group;

a represents an integer of 1 to 6,
b is at least 0.00 and less than 3.90 in terms of mean value,
c is at least 0.10 and less than 4.00 in terms of mean value,
and the sum of b and c is at least 1.00 and less than 4.00 in terms of mean value.

A second aspect of the invention provides a porphyrazine coloring matter or salt thereof as described in the first aspect, in which the six-membered nitrogen-containing heteroaromatic rings represented by rings A to D is a pyridine ring or a pyrazine ring.

A third aspect of the invention provides a porphyrazine coloring matter or salt thereof as described in the first aspect, obtained by reacting an organic amine represented by the following formula (3) with a porphyrazine compound represented by the following formula (2) under the presence of ammonia,

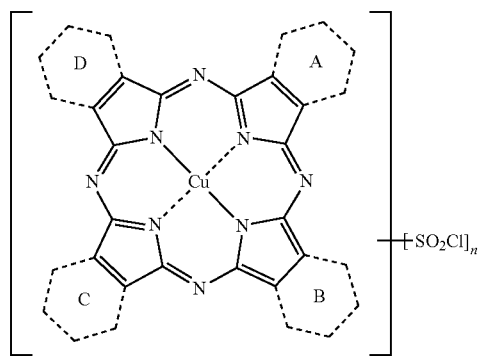

in the formula (2): rings A to D are defined similarly to those described in the first aspect, and n is at least 1.00 and less than 4.00 in terms of mean value,

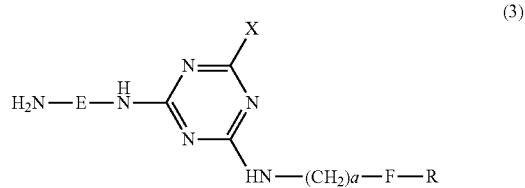

in the formula (3): E, X, R, group F and a are defined similarly to those described in the first aspect.

A fourth aspect of the invention provides a porphyrazine coloring matter or salt thereof as described in the first aspect, in which:

E is a C2-C4 alkylene;

X represents a sulfoanilino group, a carboxyanilino group, a phosphonoanilino group, a sulfonaphthyl amino group, a carboxynaphthyl amino group or a phosphononaphthyl amino group which may have zero to three of one or at least two types of substituent(s) selected from the group consisting of a sulfo group, a carboxy group, a hydroxy group, a sulfamoyl group, a C1-C6 alkoxy group, an amino group, a mono-C1-C4 alkylamino group, a di-C1-C4 alkylamino group, a C1-C3 alkylcarbonylamino group, a nitro group, a halogen atom, a C1-C6 alkylsulfonyl group, and a C1-C6 alkylthio group;

R is a hydrogen atom, a sulfo group, a carboxy group, a C1-C6 alkoxy group, a C1-C6 alkyl group or a halogen atom;

group F is a phenyl group, or a pyridyl group when R is a hydrogen atom;

and a is 1 or 2.

A fifth aspect of the invention provides a porphyrazine coloring matter or salt thereof as described in the first aspect, in which:

E is a linear C2-C4 alkylene;

X represents a sulfoanilino group which may have zero to two of one or two types of substituent(s) selected from the group consisting of a sulfo group, a carboxy group, a hydroxy group, a C1-C6 alkoxy group, an amino group, a mono-C1-C4 alkylamino group, a di-C1-C4 alkylamino group, a C1-C3 alkylcarbonylamino group, a nitro group, a halogen atom, a C1-C6 alkylsulfonyl group, and a C1-C6 alkylthio group; a carboxyanilino group which may have zero to two of one or two types of substituent(s) selected from the group consisting of a sulfo group, a carboxy group, a hydroxy group and a sulfamoyl group; a phosphonoanilino group; or a sulfonaphthyl amino group which may have zero to two of one or two types of substituent(s) selected from the group consisting of a sulfo group and a hydroxy group;

group F is a phenyl group, or a pyridyl group when R is a hydrogen atom;

and a is 1 or 2.

A sixth aspect of the invention provides a porphyrazine coloring matter or salt thereof as described in the fifth aspect, in which: the nitrogen-containing heteroaromatic ring of the rings A to D is each independently a pyridine ring that has been ring condensed at the 2-position and 3-position, or the 3-position and 4-position, or a pyrazine ring that has been ring condensed at the 2-position and 3-position; and E is ethylene or propylene.

A seventh aspect of the invention provides a porphyrazine coloring matter or salt thereof as described in the first aspect, in which: the nitrogen-containing heteroaromatic ring of the rings A to D are each independently a pyridine ring that has been ring condensed at the 2-position and 3-position;

E is ethylene;

X is a sulfoanilino group which may have zero or one sulfo group as a substituent, or is a sulfonaphthylamino group having two sulfo groups as substituents;

R is a sulfo group or a carboxy group;

group F is a phenyl group, or a pyridyl group when R is a hydrogen atom;

a is 1, b is at least 0.00 and less than 3.90 in terms of mean value, c is at least 0.10 and less than 4.00 in terms of mean value, and the sum of b and c is at least 1.00 and less than 4.00 in terms of mean value.

An eighth aspect of the invention provides an ink composition including the porphyrazine coloring matter or salt thereof as described in the first aspect as a coloring matter.

A ninth aspect of the invention provides an ink composition as described in the eighth aspect, further including an organic solvent.

A tenth aspect of the invention provides an ink composition as described in the ninth aspect, in which the ink composition is utilizing in ink jet recording.

An eleventh aspect of the invention provides an ink jet recording method, including discharging ink droplets of the ink composition as described in the eighth aspect in response to a recording signal to execute recording on a record-receiving material.

A twelfth aspect of the invention provides an ink jet recording method as described in the eleventh aspect, in which the record-receiving material is a communication sheet.

A thirteenth aspect of the invention provides an ink jet recording method as described in the twelfth aspect, in which the communication sheet is a sheet on which surface treatment has been performed, the sheet having an ink receiving layer containing white inorganic pigment particles on a substrate.

A fourteenth aspect of the invention provides a vessel containing the ink composition as described in the eighth aspect.

A fifteenth aspect of the invention provides an ink jet printer to which the vessel as described in the fourteenth aspect is loaded.

A sixteenth aspect of the invention provides a colored object which is colored by the porphyrazine coloring matter or salt thereof as described in the first aspect.

A seventeenth aspect of the invention provides a colored object which was colored by the ink composition as described in the eighth aspect.

An eighteenth aspect of the invention provides a colored object which was colored by the ink jet recording method as described in the eleventh aspect.

Effects of the Invention

The ink composition containing a porphyrazine coloring matter or salt thereof of the present invention has a favorable hue as a cyan ink. In addition, the recorded image obtained using the ink composition of the present invention excels in ozone resistance, the bronzing phenomenon does not easily occur, and has high print density, and thus the concentration of coloring matter in ink can be decreased. For this reason, it has industrial superiority associated with a cost reduction.

Therefore, the porphyrazine coloring matter or salt thereof, and a cyan ink composition containing this of the present invention are remarkably useful for various recording uses, particularly as ink for ink jet recording.

PREFERRED MODE FOR CARRYING OUT THE INVENTION

The present invention will be explained in detail.

The coloring matter of the present invention is represented by the above formula (1). More specifically, it is a coloring matter derived from tetrabenzoporphyrazine (commonly referred to as phthalocyanine) by replacing more than zero and no more than three among the four benzo (benzene) rings with a nitrogen-containing heteroaromatic ring. It should be noted that, in the present specification, for convenience, both "(porphyrazine) coloring matter and salt thereof of the present invention" are included by the abbreviated description of "(polyphyrazine) coloring matter of the present invention".

As the nitrogen-containing heteroaromatic ring for rings A through D (the four rings of rings A, B, C and D) represented by the dotted lines in the above formula (1), for example, a nitrogen-containing heteroaromatic ring containing one or two nitrogen atom(s) such as a pyridine ring, a pyrazine ring, a pyrimidine ring, and a pyridazine ring can be exemplified. A pyridine ring or pyrazine ring is preferable among these, and a pyridine is more preferable. As the number of the nitrogen-containing heteroaromatic ring increases, the ozone resistance is improved; however, the bronzing phenomenon tends to be exhibited. Thus, the number of the nitrogen-containing heteroaromatic rings may be selected to provide a well balanced proportion by appropriately adjusting while taking the ozone resistance and the bronzing phenomenon into consideration.

Although the number of the nitrogen-containing heteroaromatic rings is not necessarily defined since it may vary depending on the type of the hetero ring, it is generally, in terms of a mean value, in the range of more than 0.00 to 3.00, preferably 0.20 to 2.00, more preferably 0.50 to 1.75, and still more preferably 0.75 to 1.50.

The remaining rings A to D are benzene rings, and the benzene rings among rings among A to D it is generally, similarly in terms of a mean value, at least 1.00 to less than 4.00, preferably 2.00 to 3.80, more preferably 2.25 to 3.50, and still more preferably 2.50 to 3.25.

It should be noted that the porphyrazine coloring matter of the present invention is a coloring matter mixture of a plurality of coloring matters, as is evident from the number of the nitrogen-containing heteroaromatic rings of rings A to D being represented by in terms of mean values.

In addition, unless otherwise noted in the present specification, the number of the nitrogen-containing heteroaromatic ring indicates up to two decimal places by rounding up the third and lower decimal places. However, when the number of the nitrogen-containing heteroaromatic ring is 1.375 and the number of the benzene ring is 2.625, for example, if both were rounded off, the former would become 1.38 and the latter 2.63, and the total of both would exceed 4.00, which is the total of the rings A to D. In such a case, for convenience, the third and lower decimal digits on the nitrogen-containing heteroaromatic ring side are omitted, and only the benzene ring side is rounded up, whereby the former is indicated as 1.37 and the latter as 2.63. In addition, for the b and c in the formula (1) as well, the third and lower decimal digits are rounded up as a general rule to indicate up to the second digit, as described later; however, in a similar case, the third digit and lower decimals on the b side will be omitted, and only the c side is indicated by rounding up.

In the above formula (1), linear, branched, and cyclic alkylenes are exemplified as the alkylene of E in the above formula (1), linear and cyclic being preferable, and linear being more preferable. The range of carbon atoms is usually C2 to C12, preferably C2 to C6, more preferably C2 to C4, and still more preferably C2 to C3.

Specific examples include linear alkylenes such as ethylene, propylene, butylene, pentylene, hexylene, heptylene, octylene, nonylene, decylene, undecylene and dodecylene; branched alkylenes such as 2-methylethylene; and cyclic alkylenes such as cyclopropylenediyl, 1,2- or 1,3-cyclopentylenediyl, and each cyclohexylenediyl of 1,2-, 1,3-, 1,4-cyclohexylenediyl, and the like. It is preferably ethylene, propylene, butylene, pentylene or hexylene, more preferably ethylene, propylene or butylene, and still more preferably ethylene or propylene, and particularly preferably ethylene.

In the above formula (1), X represents a sulfoanilino group, a carboxyanilino group, a phosphonoanilino group, a sulphonaphthylamino group, a carboxynaphthylamino group or a phosphononaphthylamino group. The substituted number of sulfo, carboxy and phosphono in these aniline groups and naphthyl amino groups is all 1.

Specific examples include sulfoanilino groups such as 2-sulfoanilino, 3-sulfoanilino and 4-sulfoanilino; carboxyanilino groups such as 2-carboxyanilino, 3-carboxyanilino and 4-carboxyanilino; phosphonoanilino groups such as 2-phosphonoanilino, 3-phosphonoanilino and 4-phosphonoanilino; sulfonaphthyl amino groups such as 3-sulfo-1-naphthylamino, 6-sulfo-1-naphthylamino, 8-sulfo-1-naphthylamino, 1-sulfo-2-naphthylamino, 3-sulfo-2-naphthylamino, 4-sulfo-2-naphthylamino, 5-sulfo-2-naphthylamino, 6-sulfo-2-naphthylamino, 7-sulfo-2-naphthylamino and 8-sulfo-2-naphthylamino; and the like.

It should be noted that "phosphono" indicates a phosphorate group "—P(O)(OH)$_2$".

As X, a sulfoanilino group, a carboxyanilino group, a phosphonoanilino group or a sulfonaphthylamino group is preferable, a sulfoanilino group or a sulfonaphthylamino group is more preferable, and a sulfoanilino group is particularly preferable.

The above-mentioned sulfoanilino group, carboxyanilino group, phosphonoanilino group, sulfonaphthyl amino group, carboxynaphthyl amino group or phosphononaphthyl amino group for X may further have as a substituent one or at least two types of group(s) selected from the group consisting of a sulfo group, a carboxy group, a phosphorate group, a sulfamoyl group, a carbamoyl group, a hydroxy group, a C1-C6 alkoxy group, an amino group, a mono-C1-C4 alkylamino group, a di-C1-C4 alkylamino group, a monoarylamino group, a diarylamino group, a C1-C3 alkylcarbonylamino group, an ureido group, a C1-C6 alkyl group, a nitro group, a cyano group, a halogen atom, a C1-C6 alkylsulfonyl group, and a C1-C6 alkylthio group. The group of 20 groups from the sulfo group until the C1-C6 alyklthio group given herein will be abbreviated hereinafter to be indicated as "group of substituents of 20 groups" in the present specification. The number of substitution for X of a group selected from the above-mentioned group of substituents of 20 groups is usually 0 to 4, preferably 0 to 3, more preferably 0 to 2, and still more preferably 0 or 1. The position of substitution of the group selected from the above-mentioned group of substituents of 20 groups is not particularly limited; however, substituting on a carbon atom of an aniline group and naphthylamino group, i.e. on the benzene ring if the former, and on the naphthylene ring if the latter, is preferable.

As the C1-C6 alkoxy group in the above group of substituents of 20 groups, linear, branched or cyclic groups can be exemplified, linear or branched being preferable, and linear being more preferable. The range of carbon atoms is usually C1 to C6, preferably C1 to C4, and more preferably C1 to C3.

Specific examples include linear groups such as methoxy, ethoxy, n-propoxy, n-butoxy, n-pentoxy and n-hexyloxy; branched groups such as isopropoxy, isobutoxy, sec-butoxy, t-butoxy, isopentyloxy and isohexyloxy; cyclic groups such as cyclopropoxy, cyclopentoxy and cyclohexyloxy; and the like. Among these, methoxy or ethoxy is preferable, and methoxy is particularly preferable.

As the mono-C1-C4 alkylamino group in the above group of substituents of 20 groups, linear or branched groups can be exemplified, and the range of carbon atoms thereof is in general C1 to C4, and preferably is C1 to C3. Specific examples include linear groups such as methylamino, ethylamino, n-propylamino and n-butylamino; branched groups such as isopropylamino, isobutylamino, sec-butylamino and t-butylamino; and the like. Among these, methylamino is preferable.

As the di-C1-C4 alkylamino group in the above group of substituents of 20 groups, a dialkylamino group having two alkyl portions given in the above-mentioned monoalkyl amino groups independently can be exemplified. Specific examples include dimethylamino, diethylamino, methylethylamino, and the like. Among these, dimethylamino is preferable.

As the mono-C6-C10 arylamino group in the above group of substituents of 20 groups, a mono-C6-C10 aromatic amino group can be exemplified, preferably a phenylamino group or naphthylamino group, and more preferably a phenylamino group.

As the di-C6-C10 arylamino group in the above group of substituents of 20 groups, a diarylamino group having two aryls given in the above-mentioned mono-C6-C10 arylamino groups independently can be exemplified. Preferably, a diarylamino group having two of the same aryls, and preferably phenyls, can be exemplified, and specific examples include diphenylamino.

As the C1-C3 alkylcarbonylamino group in the above group of substituents of 20 groups, linear or branched groups can be exemplified, linear groups being preferable. Specific examples include linear groups such as methylcarbonylamino (acetylamino), ethylcarbonylamino and n-propylcarbonylamino; branched groups such as isopropylcarbonylamino; and the like. Among these, acetylamino is preferable.

As the C1-C6 alkyl group in the above group of substituents of 20 groups, linear, branched or cyclic C1-C6 alkyl groups can be exemplified, C1-C4 being preferable, and C1-C3 being more preferable. Linear or branched groups are preferable, and linear groups are more preferable. Specific examples include linear groups such as methyl, ethyl, n-propyl, n-butyl, n-pentyl and n-hexyl; branched groups such as isopropyl, isobutyl, sec-butyl, t-butyl, isopentyl and isohexyl; cyclic groups such as cyclopropyl, cyclopentyl and cyclohexyl; and the like. Among these, methyl is preferable.

As the halogen atom in the above group of substituents of 20 groups, a fluorine atom, chlorine atom and bromine atom can be exemplified, a fluorine atom or chlorine atom being preferable, and a chlorine atom being more preferable.

As the C1-C6 alkylsulfonyl group in the above group of substituents of 20 groups, linear or branched C1-C6 alkylsulfonyl groups can be exemplified, preferably C1-C4, and more preferably C1-C3, and linear groups are preferable. Specific examples include linear groups such as methanesulfonyl(methylsulfonyl), ethanesulfonyl(ethylsulfonyl), n-propanesulfonyl(n-propylsulfonyl), n-butylsulfonyl, n-pentylsulfonyl and n-hexylsulfonyl; branched groups such as isopropylsulfonyl and isobutylsulfonyl; and the like. Among these, methylsulfonyl is preferable.

As the C1-C6 alkylthio group in the above group of substituents of 20 groups, linear or branched C1-C6 alkylthio groups can be exemplified, C1-C4 being preferable and C1-C3 being more preferable, and linear groups are preferable. Specific examples include linear groups such as methylthio, ethylthio, n-propylthio, n-butylthio, n-pentylthio and n-hexylthio; branched groups such as isopropylthio, isobutylthio, t-butylthio, isopentylthio and isohexylthio; and the like. Among these, methylthio is preferable.

Among the above group of substituents of 20 groups, it is preferably one or at least two types of group(s) selected from the group consisting of a sulfo group, carboxy group, hydroxyl group, sulfamoyl group, C1-C6 alkoxy group, amino group, mono-C1-C4 alkylamino group, di-C1-C4 alkylamino group, C1-C3 alkylcarbonylamino group, nitro group, halogen atom, C1-C6 alkylsulfonyl group and C1-C6 alkylthio group.

When X is a sulfoanilino group, among the above group of substituents of 20 groups, a sulfo group, a carboxy group, a hydroxyl group, a C1-C6 alkoxy group, an amino group, a mono-C1-C4 alkylamino group, a di-C1-C4 alkylamino group, a C1-C3 alkylcarbonylamino group, a C1-C6 alkyl group, a nitro group, a halogen atom, a C1-C6 alkylsulfonyl group and a C1-C6 alkylthio group are preferable, and a sulfo group is particularly preferable.

When X is a carboxyanilino group, among the above group of substituents of 20 groups, a sulfo group, a carboxy group, a hydroxyl group and a sulfamoyl group are preferable.

When X is a phosphonoanilino group, the group selected from the above group of substituents of 20 groups is preferably nothing.

When X is a sulfonaphthyl amino group, among the above group of substituents of 20 groups, a sulfo group and a hydroxyl group are preferable.

When X is a carboxynaphthylamino group or phosphononaphthylamino group, the group selected from the above group of substituents of 20 groups is preferably nothing.

Specific examples of X in the above formula (1) include sulfoanilino groups further having zero or one sulfo group such as 2-sulfoanilino, 3-sulfoanilino, 4-sulfoanilino, 2,4-disulfoanilino and 2,5-disulfoanilino; sulfoanilino groups further having one carboxy group (or carboxyanilino groups further having 1 sulfo group) such as 2-carboxy-4-sulfoanilino and 2-carboxy-5-sulfoanilino; sulfoanilino groups further having one C1-C6 alkoxy group such as 4-methoxy-2-sulfoanilino, 4-ethoxy-2-sulfoanilino and 4-ethoxy-6-sulfoanilino; sulfoanilino groups further having one amino group such as 3-amino-4-sulfoanilino; sulfoanilino groups further having one mono C1-C4 alkylamino group such as 4-methylamino-5-sulfoanilino; sulfoanilino groups further having one di-C1-C4 alkylamino group such as 4-dimethylamino-5-sulfoanilino; sulfoanilino groups further having one C1-C6 alkyl group such as 2-methyl-5-sulfoanilino and 3-methyl-6-sulfoanilino; sulfoanilino groups further having one C6-C10 arylamino group such as 4-anilino-3-sulfoanilino; sulfoanilino groups further having one C1-C3 alkylcarbonylamino group such as 4-acetylamino-2-sulfoanilino; sulfoanilino groups further have one or two halogen atoms such as 2-chloro-5-sulfoanilino and 3,5-dichloro-4-sulfoanilino; sulfoanilino groups further having one C1-C6 alkylsulfonyl group such as 4-methlsulfonyl-2-sulfoanilino, 4-methylsulfonyl-5-sulfoanilino and 4-hexylsulfonyl-2-sulfoanilino; sulfoanilino groups further having one C1-C6 alkylthio group such as 4-methlthio-2-sulfoanilino and 4-hexylthio-2-sulfoanilino; sulfoanilino groups further having two of groups of two types selected from the above group of substituents of 20 groups, such as 3-carboxy-4-hydroxy-5-sulfoanilino, 2-hydroxy-5-nitro-3-sulfoanilino, 2-methoxy-4-nitro-5-sulfoanilino, 3-methyl-6-methoxy-4-sulfoanilino and 2-hydroxy-3-acetylamino-5-sulfoanilino; carboxyanilino groups further having zero or one carboxy group such as 2-carboxyanilino, 3-carboxyanilino, 4-carboxyanilino and 3,5-dicarboxyanilino; carboxyanilino groups further having one sulfamoyl group such as 4-sulfamoyl-2-carboxyanilino; carboxyanilino groups further having one hydroxy group such as 3-carboxy-4-hydroxyanilino; carboxyanilino groups further having two groups of two types selected from the above group of substituents of 20 groups such as 4-hydroxy-3-sulfo-5-carboxyanilino; phosphonoanilino groups such as 2-phosphonoanilino, 3-phosphonoanilino and 4-phosphonoanilino; sulfonaphthylamino groups further having one or two sulfo group(s) such as 4,8-disulfo-2-naphthylamino, 1,5,-disulfo-2-naphthylamino, 3,6-disulfo-1-naphthylamino, 5,7-disulfo-2-naphthylamino, 6,8-disulfo-2-naphthylamino, 3,6,8-trisulfo-1-naphthylamino and 3,6,8-trisulfo-2-naphthylamino; sulfonaphthylamino groups further having one hydroxy group such as 5-hydroxy-7-sulfo-2-naphthylamino; sulfonaphthylamino groups further having two groups of two types selected from the above group of substituents of 20 groups such as 3,6-disulfo-8-hydroxy-1-naphthylamino, 8-chloro-3,6-disulfonaphthalen-1-ylamino and 6-nitro-4,8-disulfo-2-naphthylamino; and the like.

Among these, 2-sulfoanilino, 3-sulfoanilino, 4-sulfoanilino, 2,4-disulfoanilino, 2,5-disulfoanilino, 3,6-disulfo-1-naphthylamino, 5,7-disulfo-2-naphthylamino, 6,8-disulfo-2-naphthylamino and 3,6,8-trisulfo-1-naphthylamino are preferable; 4-sulfoanilino, 2,5-disulfoanilino and 3,6,8-trisulfo-1-naphthylamino are more preferable; and 2,5-disulfoanilino is still more preferable.

R in the above formula represents a hydrogen atom, a sulfo group, a carboxy group, a phosphorate group, a sulfamoyl group, a carbamoyl group, a hydroxy group, a C1-C6 alkoxy group, an amino group, a mono-C1-C6 alkylamino group, a di-C1-C6 alkylamino group, a mono-C6-C10 arylamino group, a di-C6-C10 arylamino group, a C1-C3 alkylcarbonylamino group, an ureido group, a C1-C6 alkyl group, a nitro group, a cyano group, a halogen atom, a C1-C6 alkylsulfonyl group, or an alkylthio group.

As the C1-C6 alkoxy group of the above R, linear, branched or cyclic C1-C6 alkyl group can be exemplified, C1-C4 being preferable, and C1-C3 being more preferable. A linear or branched group is preferable, and a linear group is more preferable. Specific examples include linear groups such as methoxy, ethoxy, n-propoxy, n-butoxy, n-pentoxy and n-hexyloxy; branched groups such as isopropoxy, isobutoxy, sec-butoxy, t-butoxy, isopentyloxy and isohexyloxy; cyclic groups such as cyclopropoxy, cyclopentoxy and cyclohexyloxy; and the like. Among these, methoxy or ethoxy is preferable, and methoxy is particularly preferable.

As the mono-C1-C4 alkylamino group for the above R, linear or branched groups can be exemplified, and the range of carbon atoms thereof is in general C1 to C4, and preferably is C1 to C3. Specific examples include linear groups such as methylamino, ethylamino, n-propylamino and n-butylamino; and branched groups such as isopropylamino, isobutylamino, sec-butylamino and t-butylamino; and the like.

As the di-C1-C4 alkylamino group for the above R, a dialkylamino group having two alkyl portions given in the above-mentioned mono-C1-C4 alkylamino groups independently can be exemplified. Specific examples include dimethylamino, diethylamino, methylethylamino, and the like.

As the mono-C6-C10 arylamino group for the above R, a mono-C6-C10 aromatic amino group can be exemplified, preferably a phenylamino group or naphthylamino group, and more preferably a phenylamino group.

As the di-C6-C10 arylamino group for the above R, a diarylamino group having two aryls given in the above-mentioned mono-C6-C10 arylamino groups independently can be exemplified. Preferably, a diarylamino group having two of the same aryls, and preferably phenyls, can be exemplified, and specific examples include diphenylamino.

As the C1-C3 alkylcarbonylamino group for the above R, linear or branched groups can be exemplified, linear groups being preferable. Specific examples include linear groups such as methylcarbonylamino(acetylamino), ethylcarbonylamino and n-propylcarbonylamino; branched groups such as isopropylcarbonylamino; and the like.

As the C1-C6 alkyl group for the above R, linear, branched or cyclic C1-C6 alkyl groups can be exemplified, C1-C4 being preferable, and C1-C3 being more preferable. Linear or branched groups are preferable, and linear groups are more preferable. Specific examples include linear groups such as methyl, ethyl, n-propyl, n-butyl, n-pentyl and n-hexyl; branched groups such as isopropyl, isobutyl, sec-butyl, t-butyl, isopentyl and isohexyl; cyclic groups such as cyclopropyl, cyclopentyl and cyclohexyl; and the like. Among these, methyl is preferable.

As the halogen atom for the above R, a fluorine atom, chlorine atom and bromine atom can be exemplified, a fluorine atom or chlorine atom being preferable, and a chlorine atom being more preferable.

As the C1-C6 alkylsulfonyl group for the above R, linear or branched C1-C6 alkylsulfonyl groups can be exemplified, preferably C1-C4, and more preferably C1-C3, and linear groups are preferable. Specific examples include linear groups such as methanesulfonyl(methylsulfonyl), ethanesulfonyl(ethylsulfonyl), n-propanesulfonyl(n-propylsulfonyl), n-butylsulfonyl, n-pentylsulfonyl and n-hexylsulfonyl; branched groups such as isopropylsulfonyl and isobutylsulfonyl; and the like.

As the C1-C6 alkylthio group for the above R, linear or branched C1-C6 alkylthio groups can be exemplified, C1-C4 being preferable and C1-C3 being more preferable, and linear groups are preferable. Specific examples include linear groups such as methylthio, ethylthio, n-propylthio, n-butylthio, n-pentylthio and n-hexylthio; branched groups such as isopropylthio, isobutylthio, t-butylthio, isopentylthio and isohexylthio; and the like.

Group F in the above formula (1) represents a phenyl group, or a six-membered nitrogen-containing heteroaromatic ring group. A nitrogen-containing heteroaromatic ring group containing one nitrogen atom can be exemplified as the six-membered nitrogen-containing heteroaromatic ring group. Specific examples include pyridyl.

The bond position of the six-membered nitrogen-containing heteroaromatic ring with the alkylene represented with "a", which is the number thereof, is not particularly limited; however, it is preferably bonded at a carbon atom adjacent to a nitrogen atom. In other words, when the group F is pyridyl, with the position of substitution of the nitrogen atom being defined as the 1-position, 2-pyridyl, 3-pyridyl and 4-pyridyl can be exemplified, and that bonded to the carbon atom adjacent to the nitrogen atom, i.e. 2-pyridyl, is preferable.

When the group F in the above formula (1) is a phenyl group, among the above R, a hydrogen atom, a sulfo group, a carboxy group, a C1-C6 alkoxy group, a C1-C6 alkyl group, and a halogen atom are preferable, a hydrogen atom, a sulfo group, a carboxy group, a methoxy group, a methyl group, a fluorine atom and a chlorine atom being more preferable, and a hydrogen atom, a sulfo group and a carboxy group being still more preferable.

When the group F in the above formula (1) is a six-membered nitrogen-containing heteroaromatic ring group, among the above R, a hydrogen atom or a halogen atom is preferable, a hydrogen atom being particularly preferable.

The position of substitution of R in the group F in the above formula (1) is not particularly limited.

When the group F is a phenyl group, with the bond position with "$(CH_2)a$" as the 1-position, the position of substitution of R can be exemplified as the 2-position, 3-position or 4-position, the 4-position being preferable.

In addition, when the group F is a six-membered nitrogen-containing heteroaromatic ring group, preferably pyridyl, the bond position of "$(CH_2)a$" and R, with the nitrogen atom of the pyridyl ring as the 1-position, a combination of the 2-position for the former, and the 3-position, 4-position, 5-position or 6-position for the latter can be exemplified, and the combination of the 2-position for the former and the 4-position for the latter is preferable.

a in the above formula (1) represents the repeating number of "$(CH_2)$", i.e. the length of the alkylene, and in general is an integer from 1 to 6, preferably an integer from 1 to 4, more preferably an integer from 1 to 3, and still more preferably 1 or 2, and particularly preferably is 1.

The b, c and the sum of b and c in the above formula (1) are all mean values. b is at least 0.00 and less than 3.90, c is at least 0.10 and less than 4.00, and the sum of b and c is at least 1.00 and less than 4.00 in terms of mean value. In this case, the nitrogen-containing heteroaromatic ring of rings A to D is over 0.00 and no more than 3.00 in average value, and similarly the benzene ring is at least 1.00 and less than 4.00.

Preferably, when the nitrogen-containing heteroaromatic rings of the rings A to D is 0.20 to 2.00 and the benzene ring is 2.00 to 3.80, b is 0.00 to 3.40, c is 0.40 to 2.00, and the sum of b and c is 2.00 to 3.80.

More preferably, when the nitrogen-containing heteroaromatic rings of rings A to D is 0.50 to 1.75 and the benzene ring is 2.25 to 3.50, b is 0.35 to 3.05, c is 0.45 to 1.90, and the sum of b and c is 2.25 to 3.50.

Still more preferably, when the nitrogen-containing heteroaromatic rings of rings A to D is 0.75 to 1.50 and the benzene ring is 2.50 to 3.25, b is 0.70 to 2.75, c is 0.50 to 1.80, and the sum of b and c is 2.50 to 3.25.

Although the ozone resistance tends to improve with increasing b, the bronzing phenomenon tends to easily occur, and it is only necessary to appropriately adjust the numbers of b and c while considering the ozone resistance and bronzing property to select a ratio with good balance.

It should be noted that, in a case in which the rings A to D are benzene rings, either an unsubstituted sulfamoyl group and substituted sulfamoyl group with the number of substitutions being represented by b and c, respectively, is substituted on the benzene ring, and in the case of rings A to D being 6-membered nitrogen-containing heteroaromatic rings, they are not substituted.

It should be noted that b, c and the sum of b and c in the present specification indicate up to two decimal digits by rounding up the third and lower digits for all.

For the above rings A to D, E, X, R, group F, a, b and c, coloring matters combining the preferable options are more preferred, and coloring matters combining the more preferable options are still more preferred. This also applies for combinations of still more preferable options, and combinations of preferable options and more preferable options.

The porphyrazine coloring matter represented by the above formula (1) can also form a salt by using a sulfo, carboxy, phosphono, or the like contained intramolecularly. When forming a salt, the countercation thereof preferable forms a salt with the respective cations of organic bases, inorganic metals, or ammonia ($NH_3$).

Alkali metals and alkali earth metals can be exemplified as the inorganic metal. Examples of the alkali metal include lithium, sodium, potassium and the like. Calcium, magnesium and the like can be exemplified as the alkali earth metal.

Particularly, organic amines can be exemplified as the organic base. For example, C1-C3 alkylamines such as methylamine and ethylamine; and mono-, di- or tri-C1-C4 alkanolamines such as monoethanolamine, diethanolamine, triethanolamine, monoisopropanolamine, diisopropanolamine and triisopropanolamine can be exemplified.

Among the salts using a countercation of the above-mentioned options, salts with an alkali metal such as sodium, potassium and lithium; salts with a mono- di- or tri-C1-C4 alkanolamine such as monoethanolamine, diethanolamine, triethanol amine, monoisopropanolamine, diisopropanolamine and triisopropanolamine; and ammonium salt have been exemplified as being preferable; however, it is not to be limited to these.

In addition, the salt of porphyrazine coloring matter of the present invention may have varying physical properties such as solubility, or performance of the ink when used as an ink, particularly performance related to fastness properties, depending on the type of salt thereof. As a result, selection of the type of salt is preferably performed according to the intended performance and the like of the ink.

Specific examples of the rings A to D, E, X, R and group F, and the numbers of a, b and c in the porphyrazine coloring matter represented by the above formula (1) are shown in the following Tables 1 to 4.

The following examples show exemplary coloring matters for specifically explaining the coloring matter of the present invention, and the present invention is not to be limited to the following examples.

In addition, when the nitrogen-containing heteroaromatic ring of rings A to D is a pyridine ring, position isomers of the nitrogen atom exist as described later, and a mixture of the isomers is obtained when the coloring matter is synthesized. Separation of such isomers is difficult, and identification of the isomer by analysis is also difficult. As a result, mixtures are used without modification in general. The coloring matter of the present invention also contains such mixtures. In the present invention, when displayed by a structural formula without distinguishing these isomers and the like, one typical structural formula is indicated for convenience. It should be noted that, for the numbers of b and c in the tables, in order to avoid confusion, the second and lower decimal digits are rounded up to list up to the first digit. It should be noted that, in Tables 1 to 4, "2,3-pyrido" indicates a pyridine ring that has been ring condensed to the porphyrazine ring at the 2-position and 3-position, "benzo" indicates a benzene ring that has been ring condensed to the porphyrazine ring, and "2-pyridyl" indicates the bonding position with "($CH_2$)a" being the 2-position, with the nitrogen atom of the pyridine ring defining the 1-position. In addition, for the "4-chloro" and the like as R, the position of substitution of R is represented, when group F is a phenyl group, with the bond position with "($CH_2$)a" as the 1-position, and when group F is pyridyl, with the nitrogen position of the pyridine ring as the 1-position.

TABLE 1

| No. | A | B | C | D | E | F | X | R | a | b | c |
|---|---|---|---|---|---|---|---|---|---|---|---|
| 1 | 2,3-pyrido | benzo | benzo | benzo | ethylene | phenyl | 2,5-disulfoanilino | H | 1 | 1 | 2 |
| 2 | 2,3-pyrido | benzo | benzo | benzo | ethylene | phenyl | 2,4-disulfoanilino | H | 1 | 1 | 2 |
| 3 | 2,3-pyrido | benzo | benzo | benzo | ethylene | phenyl | 2-sulfoanilino | H | 1 | 1 | 2 |
| 4 | 2,3-pyrido | benzo | benzo | benzo | ethylene | phenyl | 3-sulfoanilino | H | 1 | 1 | 2 |
| 5 | 2,3-pyrido | benzo | benzo | benzo | ethylene | phenyl | 4-sulfoanilino | H | 1 | 1 | 2 |
| 6 | 2,3-pyrido | benzo | benzo | benzo | ethylene | phenyl | 2,5-disulfoanilino | H | 2 | 1 | 2 |
| 7 | 2,3-pyrido | benzo | benzo | benzo | ethylene | phenyl | 2,5-disulfoanilino | H | 3 | 1 | 2 |
| 8 | 2,3-pyrido | benzo | benzo | benzo | ethylene | phenyl | 2,5-disulfoanilino | H | 4 | 1 | 2 |
| 9 | benzo | 2,3-pyrido | 2,3-pyrido | 2,3-pyrido | ethylene | phenyl | 2,5-disulfoanilino | H | 1 | 0 | 1 |
| 10 | benzo | 2,3-pyrido | 2,3-pyrido | benzo | ethylene | phenyl | 2,5-disulfoanilino | H | 1 | 1 | 1 |
| 11 | 2,3-pyrido | benzo | benzo | benzo | propylene | phenyl | 2,5-disulfoanilino | H | 1 | 2 | 1 |
| 12 | 2,3-pyrido | benzo | 2,3-pyrido | benzo | propylene | phenyl | 2,5-disulfoanilino | H | 1 | 1 | 1 |
| 13 | 2,3-pyrido | benzo | 2,3-pyrido | 2,3-pyrido | propylene | phenyl | 2,5-disulfoanilino | H | 1 | 0 | 1 |
| 14 | 2,3-pyrido | benzo | benzo | benzo | ethylene | phenyl | 2-sulfoanilino | 4-sulfo | 1 | 1 | 2 |
| 15 | 2,3-pyrido | benzo | benzo | benzo | ethylene | phenyl | 3-sulfoanilino | 4-sulfo | 1 | 1 | 2 |
| 16 | 2,3-pyrido | benzo | benzo | benzo | ethylene | phenyl | 4-sulfoanilino | 4-sulfo | 1 | 1 | 2 |
| 17 | benzo | 2,3-pyrido | 2,3-pyrido | 2,3-pyrido | ethylene | phenyl | 4-sulfoanilino | 4-sulfo | 1 | 0 | 1 |

TABLE 2

| No. | A | B | C | D | E | F | X | R | a | b | c |
|---|---|---|---|---|---|---|---|---|---|---|---|
| 18 | benzo | 2,3-pyrido | 2,3-pyrido | benzo | ethylene | phenyl | 4-sulfoanilino | 4-sulfo | 1 | 1 | 1 |
| 19 | 2,3-pyrido | benzo | benzo | benzo | ethylene | phenyl | 2,5-disulfoanilino | 4-sulfo | 1 | 1 | 2 |
| 20 | benzo | 2,3-pyrido | 2,3-pyrido | 2,3-pyrido | ethylene | phenyl | 2,5-disulfoanilino | 4-sulfo | 1 | 0 | 1 |
| 21 | benzo | 2,3-pyrido | 2,3-pyrido | benzo | ethylene | phenyl | 2,5-disulfoanilino | 4-sulfo | 1 | 1 | 1 |
| 22 | 2,3-pyrido | benzo | benzo | benzo | ethylene | phenyl | 2-sulfoanilino | 4-carboxy | 1 | 1 | 2 |
| 23 | 2,3-pyrido | benzo | benzo | benzo | ethylene | phenyl | 3-sulfoanilino | 4-carboxy | 1 | 1 | 2 |
| 24 | 2,3-pyrido | benzo | benzo | benzo | ethylene | phenyl | 4-sulfoanilino | 4-carboxy | 1 | 1 | 2 |
| 25 | 2,3-pyrido | benzo | benzo | benzo | ethylene | phenyl | 2,5-disulfoanilino | 4-carboxy | 1 | 1 | 2 |
| 26 | benzo | 2,3-pyrido | 2,3-pyrido | 2,3-pyrido | ethylene | phenyl | 2,5-disulfoanilino | 4-carboxy | 1 | 0 | 1 |
| 27 | benzo | 2,3-pyrido | 2,3-pyrido | benzo | ethylene | phenyl | 2,5-disulfoanilino | 4-carboxy | 1 | 1 | 1 |
| 28 | benzo | 2,3-pyrido | 2,3-pyrido | 2,3-pyrido | ethylene | phenyl | 4-sulfoanilino | H | 1 | 0 | 1 |
| 29 | benzo | 2,3-pyrido | 2,3-pyrido | benzo | ethylene | phenyl | 4-sulfoanilino | H | 1 | 1 | 1 |
| 30 | 2,3-pyrido | benzo | benzo | benzo | propylene | phenyl | 4-sulfoanilino | H | 1 | 2 | 1 |
| 31 | 2,3-pyrido | benzo | 2,3-pyrido | benzo | propylene | phenyl | 4-sulfoanilino | H | 1 | 1 | 1 |
| 32 | 2,3-pyrido | benzo | 2,3-pyrido | 2,3-pyrido | propylene | phenyl | 4-sulfoanilino | H | 1 | 0 | 1 |
| 33 | 2,3-pyrido | benzo | benzo | benzo | ethylene | phenyl | 2,5-disulfoanilino | 4-chloro | 1 | 1 | 2 |
| 34 | 2,3-pyrido | benzo | benzo | benzo | ethylene | phenyl | 2,5-disulfoanilino | 4-methyl | 1 | 1 | 2 |

TABLE 3

| No. | A | B | C | D | E | F | X | R | a | b | c |
|---|---|---|---|---|---|---|---|---|---|---|---|
| 35 | 2,3-pyrido | benzo | benzo | benzo | ethylene | phenyl | 2,5-disulfoanilino | 4-methoxy | 1 | 1 | 2 |
| 36 | 2,3-pyrido | benzo | benzo | benzo | ethylene | phenyl | 2,5-disulfoanilino | 4-fluoro | 1 | 1 | 2 |
| 37 | 2,3-pyrido | benzo | benzo | benzo | ethylene | phenyl | 2,5-disulfoanilino | 2-chloro | 1 | 1 | 2 |
| 38 | 2,3-pyrido | benzo | benzo | benzo | ethylene | phenyl | 2,5-disulfoanilino | 2-methyl | 2 | 1 | 2 |
| 39 | 2,3-pyrido | benzo | benzo | benzo | ethylene | phenyl | 2,5-disulfoanilino | 2-methoxy | 2 | 1 | 2 |
| 40 | 2,3-pyrido | benzo | benzo | benzo | ethylene | phenyl | 2,5-disulfoanilino | 2-methoxy | 2 | 1 | 2 |
| 41 | 2,3-pyrido | benzo | benzo | benzo | ethylene | 2-pyridly | 2,5-disulfoanilino | H | 1 | 1 | 2 |
| 42 | benzo | 2,3-pyrido | 2,3-pyrido | 2,3-pyrido | ethylene | 2-pyridly | 2,5-disulfoanilino | H | 1 | 0 | 1 |
| 43 | benzo | 2,3-pyrido | 2,3-pyrido | benzo | ethylene | 2-pyridly | 2,5-disulfoanilino | H | 1 | 1 | 1 |
| 44 | 2,3-pyrido | benzo | benzo | benzo | ethylene | phenyl | 3,6,8-trisulfo-1-naphthylamino | H | 1 | 1 | 2 |
| 45 | benzo | 2,3-pyrido | 2,3-pyrido | 2,3-pyrido | ethylene | phenyl | 3,6,8-trisulfo-1-naphthylamino | H | 1 | 0 | 1 |
| 46 | benzo | 2,3-pyrido | 2,3-pyrido | benzo | ethylene | phenyl | 3,6,8-trisulfo-1-naphthylamino | H | 1 | 1 | 1 |
| 47 | 2,3-pyrido | benzo | benzo | benzo | ethylene | phenyl | 4,8-disulfo-2-naphthylamino | H | 1 | 1 | 2 |
| 48 | 2,3-pyrido | benzo | benzo | benzo | ethylene | 2-pyridly | 3,6-disulfo-1-naphthylamino | 4-chloro | 1 | 1 | 2 |
| 49 | 2,3-pyrido | benzo | benzo | benzo | ethylene | phenyl | 3,6-disulfo-8-hydroxy-1-naphthylamino | H | 1 | 2 | 1 |

TABLE 3-continued

| No. | A | B | C | D | E | F | X | R | a | b | c |
|---|---|---|---|---|---|---|---|---|---|---|---|
| 50 | 2,3-pyrido | benzo | benzo | benzo | ethylene | phenyl | 4-methoxy-2-sulfoanilino | H | 1 | 2 | 1 |
| 51 | 2,3-pyrido | benzo | benzo | benzo | ethylene | phenyl | 4-nitro-2-sulfoanilino | H | 1 | 2 | 1 |

TABLE 4

| No. | A | B | C | D | E | F | X | R | a | b | c |
|---|---|---|---|---|---|---|---|---|---|---|---|
| 52 | 2,3-pyrido | benzo | benzo | benzo | ethylene | phenyl | 2-chloro-5-sulfoanilino | H | 1 | 2 | 1 |
| 53 | 2,3-pyrido | benzo | benzo | benzo | ethylene | phenyl | 3-methyl-6-sulfoanilino | H | 1 | 2 | 1 |
| 54 | 2,3-pyrido | benzo | benzo | benzo | ethylene | phenyl | 2-carboxy-5-sulfoanilino | H | 1 | 2 | 1 |
| 55 | 2,3-pyrido | benzo | benzo | benzo | ethylene | phenyl | 2,5-dicarboxyanilino | H | 1 | 2 | 1 |
| 56 | 2,3-pyrido | benzo | benzo | benzo | ethylene | phenyl | 3-phosphonoanilino | H | 1 | 2 | 1 |
| 57 | 2,3-pyrido | benzo | benzo | benzo | ethylene | phenyl | 2-hydroxy-3-acetylamino-5-sulfoanilino | H | 1 | 2 | 1 |
| 60 | 2,3-pyrido | benzo | benzo | benzo | ethylene | phenyl | 5,7-disulfo-2-naphthylamino | H | 1 | 2 | 1 |
| 61 | 2,3-pyrido | benzo | benzo | benzo | ethylene | 2-pyridyl | 6,8-disulfo-2-naphthylamino | H | 1 | 2 | 1 |
| 62 | 2,3-pyrido | benzo | benzo | benzo | ethylene | phenyl | 3-carboxy-4-hydroxy-5-sulfoanilino | 4-methoxy | 1 | 2 | 1 |
| 63 | 2,3-pyrido | benzo | benzo | benzo | ethylene | phenyl | 3-methyl-6-methoxy-4-sulfoanilino | 4-sulfo | 1 | 2 | 1 |
| 64 | 2,3-pyrido | benzo | benzo | benzo | ethylene | 2-pyridyl | 4-methylsulfonyl-2-sulfoanilino | H | 1 | 2 | 1 |
| 65 | 2,3-pyrido | benzo | benzo | benzo | ethylene | phenyl | 4-methylthio-2-sulfoanilino | H | 1 | 2 | 1 |
| 66 | 2,3-pyrido | benzo | benzo | benzo | ethylene | phenyl | 3-amino-4-sulfoanilino | 2-methoxy | 1 | 2 | 1 |
| 67 | 2,3-pyrido | benzo | benzo | benzo | ethylene | phenyl | 4-methylamino-5-sulfoanilino | 2-chloro | 1 | 2 | 1 |
| 68 | 2,3-pyrido | benzo | benzo | benzo | ethylene | 2-pyridyl | 4-dimethylamino-5-sulfoanilino | H | 1 | 2 | 1 |
| 69 | 2,3-pyrido | benzo | benzo | benzo | ethylene | phenyl | 4-sulfamoyl-2-carboxyanilino | H | 1 | 2 | 1 |

The porphyrazine coloring matter of the present invention can typically be used without blending with other coloring matters; however, depending on the situation, it may be used by blending with a well-known cyan coloring matter in a range that does not deteriorate the effects of the present invention.

In the case of using by blending with a well-known cyan coloring matter, as the coloring matter to be blended, a triphenylmethane coloring matter, phthalocyanine coloring matter or the like to which C.I. number has been assigned can be used; however, a phthalocyanine coloring matter is preferable.

The method of preparing the porphyrazine coloring matter of the present invention represented by the above formula (1) will be explained.

The coloring matter represented by the above formula (1) can be obtained by reacting a porphyrazine compound represented by the above formula (2) and an organic amine represented by the above formula (3) under the presence of ammonia.

The porphyrazine compound represented by the above formula (2) can be obtained by any well-known method, or based thereon, synthesizing a compound represented by the following formula (4), and then chlorosulfonylating this.

In other words, the compound represented by the following formula (4) can be synthesized based on the well-known methods disclosed in PCT International Publication No. WO2007/091631 and PCT International Publication No. WO2007/116933, for example. These published documents do not disclose a production method related to a compound in which the number of nitrogen-containing heteroaromatic rings of rings A to D is less than 1. However, when performing synthesis with a well-known nitrile process or Wyler method, a compound represented by the formula (4) in which the number of nitrogen-containing heteroaromatic rings of the rings A to D is less than 1 can also be synthesized by changing the blending ratio between the dicarboxylic acid derivative having a nitrogen-containing heteroaromatic ring and phthalic acid derivative used as reaction materials. It should be noted that, for the compound represented by the formula (4) thus obtained, the matter of making a mixture of position isomers relative to the position of substitution of the nitrogen-containing heteroaromatic rings of the rings A to D and relative to the position of substitution of the nitrogen atom in the nitrogen-containing heteroaromatic ring is also as described in the above-mentioned published documents.

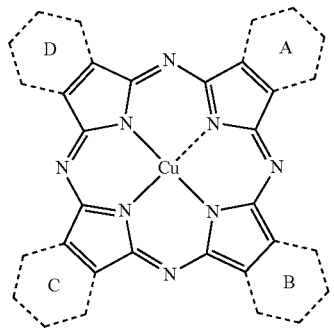

(4)

In the formula (4), rings A to D have the same meaning as in the above formula (1).

The porphyrazine compound represented by the formula (2) can be obtained by chlorosulfonylating the compound represented by the formula (4), following a well-known method disclosed in the above-mentioned international publication pamphlets the same as in the synthesis of the compound represented by the formula (4). The chlorosulfonyl group in the formula (2) is introduced on a benzene ring of the rings A to D, but not introduced when the rings A to D represent a nitrogen-containing heteroaromatic ring. Since one chlorosulfonyl group is usually introduced onto the benzene ring, the number n in the formula (2) is within the number of benzene rings as rings A to D. Therefore, the number "n" of chlorosulfonyl groups in the formula (2) is at least 1.00 and less than 4.00, depending on the number of the benzene rings of the porphyrazine compound represented by formula (2).

As another method for synthesizing the porphyrazine compound represented by the formula (2), a method can be exemplified in which a sulfophthalic acid having a sulfo group is subjected to ring-closing condensation with a dicarboxylic acid derivative having a nitrogen-containing heteroaromatic ring such as quinolinic acid beforehand to synthesize a porphyrazine compound having a sulfo group, and thereafter the sulfo group is converted into a chlorosulfonyl group by a suitable chlorinating agent such as thionyl chloride. In this case, the position of substitution of the sulfo group introduced into the porphyrazine compound represented by the formula (2) can be controlled by selecting between sulfophthalic acids in which the position of substitution of the sulfo group of sulfophthalic acid, which is a synthesis raw material, is the 3-position or the 4-position. In other words, the sulfo group can be selectively introduced to the "α"-position in the following formula (5) if using 3-sulfophthalic acid, and similarly to the "β"-position if using 4-sulfophthalic acid, respectively. It should be noted that, unless otherwise noted in the present specification, the terminology of "α-position of porphyrazine ring" or "β-position of porphyrazine ring" indicates the corresponding position in the following formula (5).

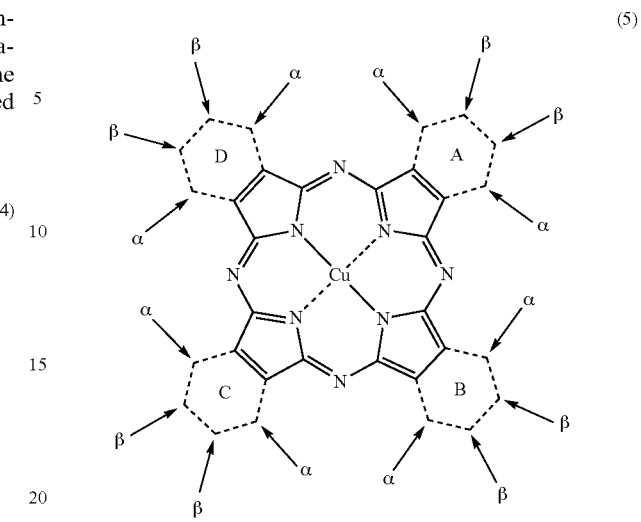

(5)

On the other hand, the organic amine represented by the above formula (3) can also be produced by a well-known method.

For example, a substituted aniline or a substituted naphthylamine that corresponds to X in an amount of 0.9 to 1.2 mol is allowed to react with 1 mol of 2,4,6-trichloro-S-triazine (cyanuric chloride) under conditions adjusting the reaction solution to a pH of approximately 1 to 5 by way of the hydroxide of an alkali metal such as sodium hydroxide, at 0 to 40° C. for 2 to 12 hours to obtain a primary condensate. Next, a secondary condensate is obtained by adding 0.9 to 1.5 mol of amine of "$H_2N—(CH_2)a-F—R$", adjusting the reaction solution to a pH of approximately 5 to 10 by way of a hydroxide of an alkali metal such as sodium hydroxide, and allowing to react at 5 to 80° C. for 0.5 to 12 hours. An organic amine represented by the above formula (3) is obtained by allowing 1 mol of the resulting secondary condensate to react with 1 to 50 mol of the alkylenediamine (amine of "$H_2N-E-NH_2$") that corresponds to E at a pH of approximately 9 to 12, at 5 to 90° C. for 0.5 to 8 hours. For adjusting the pH in each condensation reaction, a hydroxide of an alkali metal such as sodium hydroxide or potassium hydroxide; a carbonate of an alkali metal such as sodium carbonate or potassium carbonate; or the like is usually used. It should be noted that the order of the condensation may be decided appropriately depending on the reactivity of various compounds condensing with cyanuric chloride, and is not limited to the above-mentioned order.

The reaction between the porphyrazine compound represented by the formula (2) and the organic amine represented by the formula (3) is performed by allowing to react under the presence of ammonia in an aqueous solvent at a pH of approximately 8 to 10, at 5 to 70° C. for 1 to 20 hours, whereby the porphyrazine coloring matter of the present invention represent by the formula (1) is obtained. The "ammonia" used in the reaction usually indicates aqueous ammonia. However, if it is a chemical substance generating ammonia by neutralization or decomposition, this can be used as well. As the chemical substance generating ammonia, for example, substances generating ammonia by neutralization as in an ammonia salt such as ammonium chloride and ammonium sulfate; substances generating ammonia by pyrolysis such as urea water; ammonia gas; and the like can be exemplified; however, it is not to be limited to these. Aqueous ammonia is preferable as the "ammonia", and it is only necessary to use concentrated aqueous ammonia that can be procured as a commercial product (usually sold as approximately 28% aqueous ammonia), or by diluting this with water as necessary.

The amount of the organic amine represented by the formula (3) used is usually no less than 1 mol of the theoretical value (calculated number of moles of organic amine represented by the formula (3) necessary to obtain a value of c for the coloring matter represented by the formula (1) intended) relative to 1 mol of the porphyrazine compound represented by the formula (2), but may vary depending on the reactivity of the organic amine used and the reaction conditions. Accordingly, the amount of the organic amine is not limited thereto. In general, the amount is 1 to 3 mol of the above-mentioned theoretical value, and preferably about 1 to 2 mol.

In addition, the porphyrazine coloring matter of the present invention represented by the above formula (1) is synthesized from a compound represented by the above formula (2) and a compound represented by the formula (3) under reaction conditions that do not particularly require an anhydrous condition. Thus, it is theoretically considered that a compound is generated as a by-product in which the chlorosulfonyl group in the formula (2) is hydrolyzed in part by water contaminated in the reaction system to be converted into a sulfonic acid, and as a result, the by-product is contaminated in the intended coloring matter represented by the formula (1).

However, to distinguish between an unsubstituted sulfamoyl group and a sulfo group by mass spectrometry is difficult. Therefore, in the present invention, the chlorosulfonyl group in the formula (2) other than those made to react with the organic amine represented by the formula (3) is described with an assumption that all such groups were converted into unsubstituted sulfamoyl groups.

Moreover, for a part of the coloring matter represented by the above formula (1), impurities of dimers (for example, Pz-L-Pz) or trimers formed from the copper porphyrazine ring (Pz) via a divalent linking group (L) may be generated as by-products, which may be contaminated in the reaction product.

The divalent linking group represented by L may include —$SO_2$—, —$SO_2$—NH—$SO_2$—, and the like. In the case of trimers, by-products may be formed in which two such linking groups L are combined.

The porphyrazine coloring matter of the present invention obtained in the aforementioned way can be isolated from the reaction solution of the final step in this synthesis reaction as a solid by filtration, separation and the like of a solid separating from acid deposition, salting-out, or the like. The salting-out is preferably carried out under acidity to alkalinity, for example, preferably in the range of pH of 1 to 11. The temperature during salting-out is not particularly limited; however, after heating to usually 40 to 80° C., preferably 50 to 70° C., preferably sodium chloride or the like is added to start salting-out.

The porphyrazine coloring matter of the present invention synthesized by the above-mentioned method is obtained as a free acid or a salt thereof. As a method of isolating this coloring matter as a free acid, acid deposition can be exemplified. In addition, as a method of isolating this coloring matter as a salt, salting out, a method of salt formation by, when the desired salt is not obtained by salting-out, adding the desired organic or inorganic base after the salt thus obtained has been converted to a free acid, for example, a well-known salt conversion method, or the like can be exemplified.

An ink composition of the present invention will be described.

The ink composition of the present invention is a water-based ink composition substantially of a solution, characterized by containing the porphyrazine coloring matter of the present invention represented by the above formula (1). The porphyrazine coloring matter of the present invention exhibits a vivid cyan color, and thus an ink composition containing this coloring matter can be used as a cyan ink. The ink composition containing the porphyrazine coloring matter of the present invention is not only a cyan ink in which the concentration of the coloring matter is high, but may be used as a cyan ink (called a light cyan ink or photo cyan ink, for example) in which the concentration of the coloring matter is low to be used for the purpose of smoothly replicating gradation portions of an image, or the purpose of reducing the granular sense of a light colored region. In addition, it may be used as a green ink by blending with a yellow coloring matter, and may be used as a violet or blue ink by blending with a magenta coloring matter. Furthermore, it is also possible to prepare an ink by blending several coloring matters to use as various inks of dark yellow, grey or black.

When using the ink composition of the present invention for ink-jet recording, the content of anions such as $Cl^-$ and $SO_4^{2-}$ contained as impurities in the porphyrazine coloring matter of the present invention is preferably small, and the target for the content thereof as a total content of $Cl^-$ and $SO_4^{2-}$ for the total mass of coloring matter is no more than 5% by mass, preferably no more than 3% by mass, and still more preferably no more than 1% by mass. In addition, similarly in the ink composition, the total content of anions is no more than 1% by mass relative to the total mass of ink. The lower limit may be no more than the detection limit of a detector, i.e. 0%.

In order to produce the porphyrazine coloring matter with little $Cl^-$ and $SO_4^{2-}$, for example, a desalination treatment may be carried out with a typical method using a reverse osmosis membrane, or a method such as of suspending and agitating dried matter or wet cake of the porphyrazine coloring matter of the present invention in an aqueous water-soluble solvent, preferably an aqueous alcohol.

As the alcohol of the above-mentioned aqueous alcohol, a C1-C4 alcohol, preferably C1-C3 alcohol, and still more preferably methanol, ethanol, n-propanol or 2-propanol (isopropanol) can be exemplified. When using an aqueous alcohol, a method of desalinizing by heating a suspension in which a coloring matter desired to be desalinized is suspended up to near the boiling point thereof, and then cooling can also be employed.

By drying the porphyrazine coloring matter of the present invention subjected to desalinization treatment in an aqueous alcohol after having been filtrated and separated, a coloring matter in the dry state can be obtained.

The content of $Cl^-$ and $SO_4^{2-}$ in the coloring matter is measured by ion chromatography, for example.

In a case of using the ink composition of the present invention in an ink-jet recording application, it is preferable for the content of impurities other than the above-mentioned $Cl^-$ and $SO_4^{2-}$ such as of various ions of heavy metals such as zinc and iron, and calcium, and silica, for example, to be small.

However, the porphyrazine coloring matter of the present invention has a central metal from ionic bonds, coordinate bonds, and the like and forms a copper complex, and thus this central metal is not included as an impurity.

The target for the content of the above-mentioned impurities is preferably no more than about 500 ppm for each of various ions such as of heavy metals such as zinc and iron, and calcium, and silica, for example, in the dry finished product of the porphyrazine coloring matter, and the lower limit may be no more than the detection limit of a detector, i.e. 0%.

The ion content such as of heavy metals can be measured through ion chromatography, atomic absorption spectrometry, or ICP (Inductively Coupled Plasma) luminescence analysis.

The ink composition of the present invention contains the porphyrazine coloring matter of the present invention represented by the formula (1) in 0.1 to 8% by mass, and preferably 0.3 to 6% by mass.

This ink composition may further contain a water soluble organic solvent and an ink preparation agent as needed in a range that does not deteriorate the effects of the present invention. The water soluble organic solvent is used expecting effects such as solubilizing dye and preventing drying of the ink composition (wetting); viscosity adjustment; permeation acceleration; adjustment of surface tension; and defoaming, and it is preferred that the water soluble organic solvent is contained in the ink composition of the present invention.

As an ink preparation agent, for example, a preservative and fungicide, a pH adjusting agent, a chelating agent, a rust-preventive agent, an ultraviolet ray absorbing agent, a viscosity adjusting agent, a dye solubilizer, a discoloration-preventive agent, an emulsification stabilizer, a surface tension adjusting agent, a defoaming agent, and the like may be added as needed.

The water soluble organic solvent may be used in 0 to 60% by mass, and preferably 10 to 50% by mass of the entire ink, and the ink preparation agent may be used in 0 to 20% by mass, and preferably 0 to 15%, each relative to the mass of the entire ink. The remaining component is water.

The above-mentioned water soluble organic solvent may be, for example: (C1-C4)alcohols such as methanol, ethanol, n-propanol, isopropanol, n-butanol, isobutanol, secondary butanol or tertiary butanol; carboxylic amides such as N,N-dimethylformamide and N,N-dimethylacetamide; heterocyclic ketones such as 2-pyrrolidone, N-methyl-2-pyrrolidone, 1,3-dimethylimidazolidin-2-one and 1,3-dimethylhexahydropyrimid-2-one; ketones or keto alcohols such as acetone, methylethylketone or 2-methyl-2-hydroxypentan-4-one; cyclic ethers such as tetrahydrofuran or dioxane; mono-, oligo-, or poly-alkylene glycols or thioglycols having a (C2-C6)alkylene unit such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, thiodiglycol, polyethylene glycol or polypropylene glycol; polyol (triol) such as glycerin and hexane-1,2,6-triol; (C1-C4)monoalkyl ethers of a polyhydric alcohol such as ethylene glycol monomethyl ether, ethylene glycol monoethyl ether, diethylene glycol monomethyl ether, diethylene glycol monoethyl ether, diethylene glycol monobutyl ether (butylcarbitol), triethylene glycol monomethyl ether or triethylene glycol monoethyl ether; γ-butyrolactone, dimethyl sulfoxide, and the like.

As the water soluble organic solvent, preferable examples include isopropanol, glycerin, mono-, di-, or tri-ethylene glycol, dipropylene glycol, 2-pyrrolidone, N-methyl-2-pyrrolidone, and butylcarbitol, whereas more preferable examples include isopropanol, glycerin, diethylene glycol, 2-pyrrolidone, and butylcarbitol.

These are used either alone or as a mixture.

The preservative and fungicide may include, for example, a compound of organic sulfur based, organic nitrogen sulfur based, organic halogen based, haloaryl sulfone based, iodopropargyl based, N-haloalkylthio based, benzothiazole based, nitrile based, pyridine based, 8-oxyquinoline based, isothiazoline based, dithiol based, pyridineoxide based, nitropropane based, organic tin based, phenol based, quaternary ammonium salt based, triazine based, thiadiazine based, anilide based, adamantane based, dithiocarbamate based, brominated indanone based, benzylbromoacetate based, inorganic salt based compound or the like.

The organic halogen based compound may include, for example, sodium pentachlorophenol. The pyridineoxide based compound may include, for example, sodium 2-pyridinethiol-1-oxide. The isothiazoline based compound may include, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride, and the like.

The other preservative and fungicide may be exemplified by sodium sorbate, sodium benzoate, sodium acetate, trade names Proxel® GXL (S), Proxel® XL-2 (S) manufactured by Arch Chemicals, Inc., and the like.

It should be noted that the superscript "®" indicates registered trademark in the present specification.

The pH adjusting agent may be used for the purpose of improving the storage stability of the ink, and an arbitrary substance can be used as long as the pH of the ink can be controlled to fall within the range of 6.0 to 11.0. Examples of the pH adjusting agent include: alkanolamines such as diethanolamine and triethanolamine; hydroxides of an alkali metal such as lithium hydroxide, sodium hydroxide and potassium hydroxide; ammonium hydroxide (aqueous ammonia); carbonates of an alkali metal such as lithium carbonate, sodium carbonate and potassium carbonate; aminosulfonic acids such as taurine; and the like.

The chelating agent may include, for example, sodium ethylenediamine tetraacetate, sodium nitrilo triacetate, sodium hydroxyethylethylenediamine triacetate, sodium diethylenetriamine pentaacetate, sodium uracil diacetate, and the like.

The rust-preventive agent may include, for example, acidic sulfite, sodium thiosulfate, ammonium thioglycolate, diisopropylammonium nitrite, pentaerythritol tetranitrate, dicyclohexylammonium nitrite, and the like.

Examples of the ultraviolet ray absorbing agent include benzophenone based compounds, benzotriazole based compounds, cinnamic acid based compounds, triazine based compounds, stilbene based compounds, and the like. In addition, a generally referred to fluorescent whitening agent, which is a compound that absorbs an ultraviolet ray to emit fluorescence, and which is typified by a benzoxazole based compound may be used.

The viscosity adjusting agent may include a water soluble polymer compound, and specific examples include polyvinyl alcohols, cellulose derivatives, polyamine, polyimine, and the like.

The dye solubilizer may include, for example, urea, ε-caprolactam, ethylene carbonate, and the like. Among these, urea is preferable.

The discoloration-preventive agent is used for the purpose of improving the storability of the image. As the discoloration-preventive agent, a variety of organic and metal complex based discoloration-preventive agents may be used. Examples of the organic discoloration-preventive agent include hydroquinones, alkoxyphenols, dialkoxyphenols, phenols, anilines, amines, indanes, chromanes, alkoxyanilines, heterocycles and the like, whereas examples of the metal complex include nickel complexes, zinc complexes and the like.

As the surface tension adjusting agent, surfactants may be exemplified, and examples include anionic surfactants, amphoteric surfactants, cationic surfactants, nonionic surfactants, and the like.

Examples of the anionic surfactant include alkylsulfocarboxylic acid salts, α-olefinsulfonic acid salts, polyoxyethylenealkyl ether acetic acid salts, N-acylamino acid and salts thereof, N-acylmethyltaurine salts, alkylsulfate polyoxyalkyl ether sulfuric acid salts, alkylsulfate polyoxyethylenealkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, dioctyl sulfosuccinic acid salts, and the like.

Examples of the cationic surfactant include 2-vinylpyridine derivatives, poly(4-vinylpyridine) derivatives, and the like.

Examples of the amphoteric surfactant include lauryldimethylamino acetate betaine, 2-alkyl-N-carboxymethyl-N-hydroxyethylimidazolinium betaine, coconut oil fatty acid amide propyldimethylamino acetate betaine, polyoctylpolyaminoethylglycine, imidazoline derivatives, and the like.

Examples of the nonionic surfactant include: ether based surfactants such as polyoxyethylene nonylphenyl ether, polyoxyethylene octylphenyl ether, polyoxyethylene dodecyl phenyl ether, polyoxyethylene oleyl ether, polyoxyethylene lauryl ether and polyoxyethylene alkyl ether; ester based surfactants such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; acetylene alcohol based surfactants such as 2,4,7,9-tetramethyl-5-decyne-4,7-diol, 3,6-dimethyl-4-octyne-3,6-diol and 3,5-dimethyl-1-hexyn-3-ol (e.g., trade names Surfynol® 104, 82, 465, Olfin® STG manufactured by Nissin Chemical Co., Ltd., and the like), and the like.

As the defoaming agent, a highly oxidized oil based compound, glycerin fatty acid ester based compound, fluorine based compound, or silicone based compound may be used as needed.

These ink preparation agents may be used either alone or as a mixture. The surface tension of the ink of the present invention is usually 25 to 70 mN/m, and more preferably 25 to 60 mN/m. In addition, the viscosity of the ink of the present invention is preferably adjusted to no greater than 30 mPa·s, and more preferably is no greater than 20 mPa·s.

In production of the ink composition of the present invention, the order of dissolving each component to be contained is not particularly limited. The water employed in the preparation of the ink composition is preferably water including impurities such as metal ions in an amount as low as possible, such as ion-exchanged water or distilled water. Furthermore, precision filtration may be carried out to remove contamination, as needed, using a membrane filter or the like. In particular, when the ink is used as an ink for ink-jet recording, carrying out the precision filtration is preferred. The filter for carrying out precision filtration has a pore size of usually 1 to 0.1 µm, and preferably 0.8 to 0.1 µm.

The ink composition of the present invention can be used not only in monochromatic image formation, but also in full-color image formation. In order to form a full-color image, it is used an ink set of the three primary colors with magenta ink and yellow ink, and also as a four-color ink set in which black ink has been further added to this. In addition, in order to form a higher-detail image, it may be used as an ink set in which light magenta ink, blue ink, green ink, orange ink, dark yellow ink, grey ink and the like are used together. Well-known coloring matters of various colors can be exemplified as the coloring matters used in an ink set of various colors used together with the ink composition of the present invention.

As the well-known yellow coloring matter, for example, azo coloring matters having aryl and/or heteroaryl; methine coloring matters such as benzylidene coloring matter and monomethine oxonol coloring matter; quinone coloring matters such as naphthoquinone coloring matter and anthraquinone coloring matter; quinophthalone coloring matters; nitro-nitroso coloring matters; acridine coloring matters; acridinone coloring matters; and the like can be exemplified.

As the well-known magenta coloring matter, for example, azo coloring matters having aryl and/or heteraryl; azomethine coloring matters; methine coloring matters such as arylidene coloring matter, styryl coloring matter, merocyanine coloring matter, cyanine coloring matter and oxonol coloring matter; carbonium coloring matters such as diphenyl methane coloring matter, triphenylmethane coloring matter and xanthene coloring matter; quinone coloring matters such as naphthoquinone, anthraquinone and anthrapyridone; condensed polycyclic coloring matters such as dioxazine; and the like can be exemplified.

As the well-known black coloring matter, azo coloring matters such as disazo, trisazo and tetraazo; sulfur coloring matter; dispersions of carbon black; and the like can be exemplified.

The ink composition of the present invention can be used in various recording applications such as stamp printing, copying, marking, writing, drawing and stamping; however, it is particularly suited to ink-jet recording.

The ink-jet recording method of the present invention is a method that performs recording employing the ink composition of the present invention as the ink, by applying energy to the ink according to a recording signal, causing ink drops of this ink to discharge, and allowing to adhere to various record-receiving materials, i.e. plain paper, resin coated paper, exclusive ink jet paper, glossy paper, glossy film, electrophotography common use paper, fiber or cloth (cellulose, nylon, wool, etc.), glass, metal, ceramics, leather, or the like, thereby forming an image.

Upon forming an ink-jet recorded image, a polymer particle dispersion (also referred to as polymeric latex) may be used for the purpose of imparting glassiness and water fastness and of improving weatherability.

The timing to apply polymeric latex to the record-receiving material may be before or after, or at the same time as applying ink to the record-receiving material.

In other words, recording may be performed with the ink composition of the present invention on the record-receiving material containing the polymeric latex, or the polymeric latex may be contained in this ink composition. Alternatively, the polymeric latex may by applied to the record-receiving material as an independent liquid material before or after performing recording to the record-receiving material by way of this ink composition.

The colored object of the present invention indicates a substance which was colored by any of:

i) the coloring matter of the present invention or a salt thereof, ii) the ink composition containing the coloring matter of the present invention, and iii) the ink-jet recording method of the present invention.

Although the colored substance is not particularly limited, for example, a communication sheet such as a paper or film, a fiber or cloth (cellulose, nylon, wool, etc.), leather, a substrate for color filters, and the like can be exemplified, and among these, a communication sheet is preferred.

The communication sheet is preferably obtained by subjecting a base material to a surface treatment, and specifically, obtained by providing an ink receiving layer on a base material such as paper, synthetic paper, films and the like. The ink receiving layer is provided by, for example: a method in which a cation based polymer is impregnated in or coated on the aforementioned base material; a method in which inorganic fine particles that can absorb a coloring matter in an ink such as porous silica, alumina sol and special ceramics are coated on the surface of the base material together with a hydrophilic polymer such as polyvinyl alcohol or polyvinylpyrrolidone; or the like.

Such communication sheets provided with an ink receiving layer are generally referred to as ink jet exclusive paper (film), glossy paper (film), and the like. Among these, the paper referred to as being susceptible to gasses having an oxidizing action in the air such as ozone gas is ink jet exclusive paper of a type produced by coating inorganic fine particles that can absorb a coloring matter in an ink such as porous silica, alumina sol and special ceramics on the surface of a base material.

As typical examples of the above-mentioned exclusive papers that can be procured as a commercial item, there are trade names Glossy Photo Paper Pro "Platinum Grade" and Glossy Photo Paper Gold manufactured by Canon, Inc.; trade names Photo Paper CRISPIA (Super Glossy), Photo Paper (Glossy), and Photo Matte Paper manufactured by Seiko Epson Corporation; trade name Advanced Photo Paper (Glossy) manufactured by Hewlett-Packard Japan, Ltd.; trade name Premium Plus Glossy Photo Paper manufactured by Brother Industries, Ltd.; etc. It should be noted that plain paper can also be used as a matter of course, specifically exemplified by trade name PB paper GF500 manufactured by Canon, Inc.; trade name Double-Sided High Quality Plain Paper manufactured by Seiko Epson Corporation; etc.; however, the intended purpose of the ink composition of the present invention is not limited to these exclusive papers, and the like.

For performing recording on the above-mentioned record-receiving material with the ink-jet recording method of the present invention, for example, a vessel containing the above-mentioned ink composition is attached at a specified position of an ink jet printer, and the recording may be executed by the above-mentioned recording method.

As the ink-jet printer, for example, a piezo system printer utilizing mechanical vibration; a bubble jet (registered trademark) system printer utilizing bubbles generated by heating; and the like can be exemplified; however, the ink composition of the present invention is not limited to these discharge systems, and can be used according to any system.

The ink composition of the present invention is precluded from precipitation and separation during storage. Additionally, when the ink composition is used in ink-jet recording, clogging of the injector (ink head) can be also avoided. The ink composition of the present invention does not cause alteration of physical properties even if: recording for a comparatively long time interval and under a recycling condition by way of a continuous ink jet printer; intermittent recording by way of an on-demand ink jet printer; and the like.

The ink composition containing the porphyrazine coloring matter of the present invention exhibits a vivid cyan color, has a favorable hue as a cyan ink, as well as exhibiting favorable storage stability, without being accompanied by solid precipitation, physical property alteration, color change or the like after storage for a long period of time. In addition, the recorded image obtained using the ink composition of the present invention has high print density and can reduce a concentration of the coloring matter in the ink, and thus has industrial superiority in the reduction of costs. Furthermore, it is excels in a variety of fastnesses such as light resistance, water resistance, ozone resistance and moisture resistance of the recorded image, and particularly in ozone resistance. Moreover, it is possible to express color tones in a wide visible spectrum by using cyan inks of every shade, and in addition to this, by using inks such yellow and magenta, and as needed, to further use green, red, orange and blue.

Therefore, the porphyrazine coloring matter of the present invention and the ink composition containing this are remarkably useful as cyan coloring matters and cyan inks for ink-jet recording.

EXAMPLES

Hereinafter, the present invention is more specifically described by way of Examples. In the specification, the expressions "part" and "%" are on the basis of the mass unless otherwise specifically stated. In addition, each operation of the reaction, crystallization and the like was carried out under stirring unless otherwise specifically stated. Moreover, the "trade name Leocol TD-90 and TD-50" used in the synthesis reactions are both surfactants manufactured by Lion Corporation.

It should be noted that, when the required amount of an intended compound was not obtained by one-time synthesis reaction, the same reaction was repeatedly performed until the required amount was obtained.

The coloring matters of the present invention represented by the above formula (1) synthesized in the Examples are all a mixture containing isomers and the like as explained above, and contain these isomers and the like for the yield as well. In addition, unless otherwise specifically stated, the position of substitution of the unsubstituted and substituted sulfamoyl group in the coloring matter of the present invention is a mixture of coloring matter substituted at both the α-position and β-position of the porphyrazine ring.

Furthermore, the values for which the maximum absorption wavelength (λmax) was measured for the coloring matters of the present invention and for comparison obtained in the Examples all express the measured value in an aqueous solution with a pH of 7 to 9. A sodium hydroxide aqueous solution was used in the adjustment of pH during this.

Example 1

Step 1: Synthesis of compound represented by the following formula (4) in which 1.37 of rings A to D are pyridine rings that have been ring condensed at the 2-position and 3-position, and the remaining 2.63 are benzene rings.

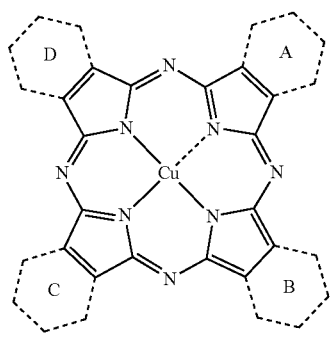

(4)

Added to 375 parts of sulfolane were 29.16 parts of phthalic anhydride, 17.23 parts of quinolinic acid, 108 parts of urea, 10.1 parts of copper(II) chloride and 1.5 parts of ammonium molybdate, the temperature of the mixture was elevated to 200° C., and was allowed to react for 5 hours at the same temperature. After completing the reaction, the mixture was cooled to 65° C., 50 parts of DMF (N,N-dimethylformamide) was added thereto, and the precipitated solid was filtrated and separated. The solid thus obtained was washed with 50 parts of DMF to obtain 75.1 parts of a wet cake. The wet cake thus obtained was added to 450 parts of DMF, the temperature of the mixture was elevated to 110° C., and was allowed to react for 1 hour at the same temperature. The precipitated solid was filtrated and separated, then washed with 200 parts of water to obtain a wet cake. The wet cake thus obtained was added into 450 parts of 5% hydrochloric acid, and the temperature was elevated to 60° C., followed by stirring at the same temperature for 1 hour. The precipitated solid was filtrated and separated, then washed with 200 parts of water to obtain a wet cake. The wet cake thus obtained was added into 450 parts of 5% aqueous ammonia, stirred for 1 hour at 60° C., then the precipitated solid was filtrated and separated, followed by washing with 200 parts of water to obtain 78.6 parts of a wet cake. The wet cake thus obtained was dried at 80° C. to obtain 23.1 parts of the target compound as a blue solid.

Step 2: Synthesis of compound of the following formula (2) in which 1.37 of rings A to D are pyridine rings that have been ring condensed at the 2-position and 3-position, the remaining 2.63 are benzene rings, and n is 2.63.

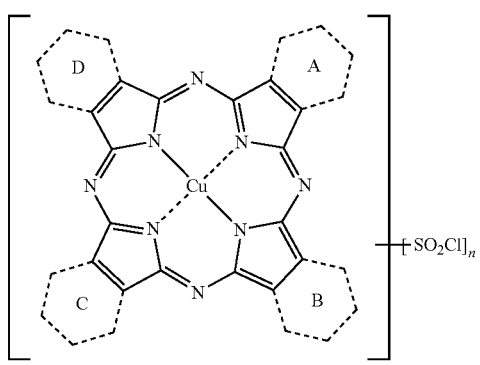

(2)

Under room temperature, 5.8 parts of the compound of formula (4) obtained in the above Step 1 was gradually added into 46.2 parts of chlorosulfonic acid so as not to exceed 60° C., and then the reaction was allowed at 140° C. for 4 hours. The reaction liquid thus obtained was cooled to 70° C., to which 17.9 parts of thionyl chloride was added dropwise over 30 min, and the reaction was further allowed at 70° C. for 3 hours. The reaction liquid was cooled to no higher than 30° C., and was slowly poured into 800 parts of ice water. Thus precipitated solid was filtrated and separated, and washed with 200 parts of cold water to obtain 33.0 parts of a wet cake of the target compound.

Step 3: Synthesis of organic amine represented by the following formula (6) (organic amine of the above formula (3) in which E is ethylene, X is 2,5-disulfoanilino, a is 1, group F is 2-pyridyl, and R is a hydrogen atom).

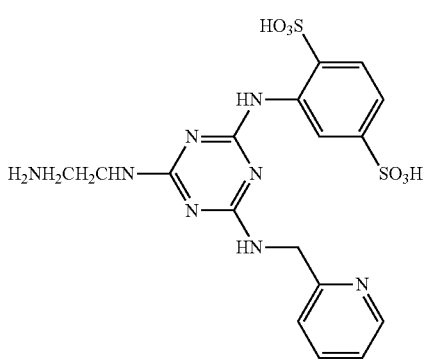

(6)

Into 200 parts of ice water were added 18.4 parts of cyanuric chloride and Leocol TD-50 (0.1 parts), and the mixture was stirred at no higher than 10° C. for 30 min. Next, thereto was added 31.7 parts of 2,5-disulfoaniline (using 88.4% purity commercially available product), and the reaction was allowed while adjusting the pH to 2.8 to 3.0 with a 10% aqueous sodium hydroxide solution at 0 to 10° C. for 2 hours, and while adjusting the pH to 2.8 to 3.0 at 25 to 30° C. for 1 hour. To this reaction liquid were added 10.8 parts of 2-(aminomethyl)pyridine, and was allowed to react while adjusting the pH to 6.0 to 6.5 with a 10% aqueous sodium hydroxide solution at 25 to 30° C. for 1 hour, and at 40 to 45° C. for 2.5 hours, to obtain a reaction liquid containing a secondary condensate.

To a liquid in which 60.1 parts of ethylenediamine had been added to 150 parts of ice, the reaction liquid containing the secondary condensate obtained in the above way was gradually added, and then stirred at room temperature for 1 hour. To the liquid thus obtained were added 150 parts of ice and 210 parts of concentrated hydrochloric acid to adjust the pH to 1.0. The amount of the liquid was 950 parts in this step. To this liquid were added 190 parts of sodium chloride, and the mixture was stirred overnight to allow a solid to precipitate. The precipitated solid was filtrated and separated to obtain 244.1 parts of a wet cake. The wet cake thus obtained was added to 270 parts of water, and permitted to dissolve by adjusting the pH to 9.0 with a 10% aqueous sodium hydroxide solution. The amount of the liquid was 550 parts in this step. This solution was adjusted to a pH of 1.0 with concentrated hydrochloric acid, and 120 parts of sodium chloride was added thereto, followed by stirring overnight to allow a solid to be precipitated. The precipitated solid was filtrated and separated to obtain 64.4 parts of a wet cake. The wet cake thus obtained was added into a mixed solvent of 255 parts of methanol and 45 parts of water, followed by stirring at 50° C. for 2 hours, after which the precipitated solid was filtrated and separated to obtain 39.8 parts of a wet cake. The wet cake thus obtained was dried to obtain 20.9 parts of a white powder of the intended organic amine represented by the formula (6).

Step 4: Synthesis of porphyrazine coloring matter of the present invention represented by the following formula (7) (coloring matter of the above formula (1) in which 1.37 of rings A to D are pyridine rings that have been ring condensed at the 2-position and 3-position, the remaining 2.63 are benzene rings, E is ethylene, X is 2,5-disulfoanilino, a is 1, b is 1.83, c is 0.80, group F is 2-pyridyl, and R is a hydrogen atom).

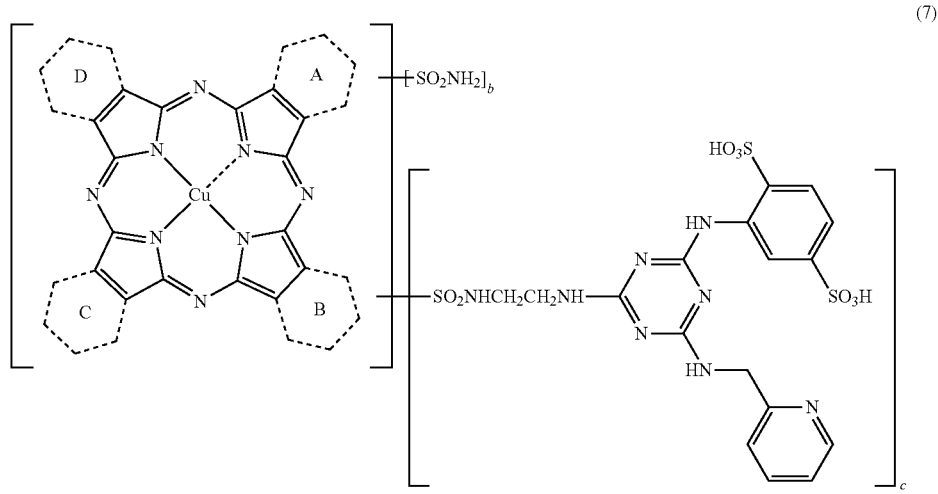

(7)

To 120 parts of ice water were added 33.0 parts of the wet cake of the formula (2) obtained in the above Step 2, followed by allowing to be suspended by stirring at no higher than 5° C. After 10 min, a solution in which 5.1 parts of the organic amine represented by the formula (6) obtained in the above Step 3 was dissolved while maintaining at no higher than 10° C. into the mixed liquid of 1 part of 28% aqueous ammonia and 40 parts of water was added to this suspension while maintaining at no higher than 10° C., and was allowed to react while maintaining a pH of 9.0 with 28% aqueous ammonia. The temperature was elevated to 20° C. while maintaining at the same pH over 1 hour, and reaction was further allowed overnight at the same temperature. The liquid amount of the reaction liquid in this step was 250 parts. The temperature of the reaction liquid was elevated to 50° C., and 25 parts of sodium chloride was added thereto and stirred for 10 min, after which the pH was adjusted to 1.6 over 20 min with concentrated hydrochloric acid, followed by filtrating and separating the precipitated solid, and washing with 100 parts of a 10% aqueous sodium chloride solution, whereby 91.4 parts of a wet cake were obtained. The wet cake thus obtained was added to 200 parts of water, and the pH was adjusted to 9.0 with a 25% aqueous sodium hydroxide solution to permit dissolution. The amount of the liquid was 295 parts in this step. The temperature of this solution was elevated to 50° C., and 30 parts of sodium chloride was added thereto. After the mixture was stirred for 10 min, the pH was adjusted to 3.0 with concentrated hydrochloric acid, followed by filtration and separation of the precipitated solid, and washing with 100 parts of a 10% aqueous sodium chloride solution to obtain 87.1 parts of a wet cake. The wet cake thus obtained was added to a mixed liquid of 255 parts of methanol and 45 parts of water. After stirring the mixture at 50° C. for 1 hour, the precipitated solid was filtrated and separated to obtain 50.7 parts of a wet cake. The wet cake thus obtained was dried to obtain 9.95 parts of free acid of the coloring matter of the present invention represented by the formula (7) as a blue powder. λmax: 602 nm.

Example 2

Step 1: Synthesis of porphyrazine coloring matter of the present invention represented by the above formula (7) (coloring matter of the above formula (1) in which 1.37 of rings A to D are pyridine rings that have been ring condensed at the 2-position and 3-position, the remaining 2.63 are benzene rings, E is ethylene, X is 2,5-disulfoanilino, a is 1, b is 1.43, c is 1.20, group F is 2-pyridyl, and R is a hydrogen atom).

To 200 parts of ice water were added 33.0 parts of the wet cake obtained similarly to Step 2 in Example 1, followed by allowing to be suspended by stirring at no higher than 5° C. After 10 min, a solution in which 7.7 parts of the organic amine of the formula (6) obtained in Step 3 of Example 1 was dissolved into the mixed liquid of 1 part of 28% aqueous ammonia and 30 parts of water was added to this suspension while maintaining at no higher than 10° C., and was allowed to react while maintaining a pH of 9.0 with 28% aqueous ammonia. The temperature was elevated to 20° C. while maintaining at the same pH, and reaction was further allowed over night at the same temperature. The amount of the liquid in this step was 290 parts. The temperature of the reaction liquid was elevated to 60° C., and 27.5 parts of sodium chloride was added thereto and stirred for 10 min, after which the pH was adjusted to 1.0 with concentrated hydrochloric acid, followed by filtrating and separating the precipitated solid, and washing with 100 parts of a 10% aqueous sodium chloride solution to obtain 85.2 parts of a wet cake. The wet cake thus obtained was added to 200 parts of water, and the pH was adjusted to 9.0 with a 25% aqueous sodium hydroxide solution, thereby permitting dissolution. The amount of the liquid was 300 parts in this step. The temperature of this solution was elevated to 50° C., and 30 parts of sodium chloride was added thereto. After the mixture was stirred for 10 min, the pH was adjusted to 1.0 with concentrated hydrochloric acid, followed by filtration and separation of the precipitated solid, and washing with 100 parts of a 10% aqueous sodium chloride solution to obtain 59.6 parts of a wet cake. The wet cake thus obtained was added to a mixed liquid of 255 parts of methanol and 45 parts of water. After stirring the mixture at 50° C. for 1 hour, the precipitated solid was filtrated and separated to obtain 41.2 parts of a wet cake. The wet cake thus obtained was dried to obtain 10.5 parts of free acid of the coloring matter represented by the above formula (7), in which the values of b and c differ from Example 1, as a blue powder. λmax: 604 nm.

Example 3

Step 1: Synthesis of organic amine represented by the following formula (8) (organic amine of the above formula (3) in which E is ethylene, X is 4-sulfoanilino, a is 1, group F is phenyl, and R is 4-sulfa).

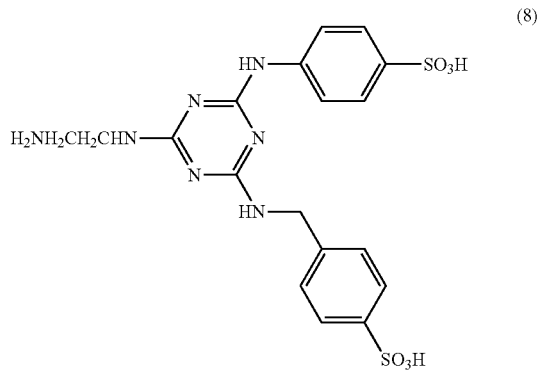

Into 100 parts of ice water were added 18.4 parts of cyanuric chloride and Leocol TD-90 (0.05 parts), and the mixture was stirred at no higher than 10° C. for 30 min. Next, thereto was added 19.5 parts of 4-sulfoaniline, and the reaction was allowed while adjusting the pH to 2.0 to 2.5 with a 10% aqueous sodium hydroxide solution at 0 to 10° C. for 2 hours, and at 25 to 30° C. for 1 hour. Subsequently, to this reaction liquid were added 21.0 parts of benzylamine sulfonic acid, and was allowed to react overnight while adjusting the pH to 7.0 to 8.0 with a 10% aqueous sodium hydroxide solution at 25 to 30° C., to obtain a reaction liquid containing a secondary condensate.

To an aqueous solution in which 60.1 parts of ethylenediamine had been added to 120 parts of ice, the reaction liquid containing the secondary condensate obtained in the above way was gradually added, and then stirred at room temperature for 1 hour. To this solution were added 150 parts of water and 210 parts of concentrated hydrochloric acid to adjust the pH to 1.0. The amount of the liquid was 830 parts in this step. To this reaction liquid were added 190 parts of sodium chloride, and the mixture was stirred overnight to allow a solid to precipitate. The precipitated solid was filtrated and separated to obtain 70.4 parts of a wet cake. The wet cake thus obtained was added to 550 parts of water, and permitted to dissolve by adjusting the pH to 9.0 with a 10% aqueous sodium hydroxide solution. The amount of the liquid was 630 parts in this step. This solution was adjusted to a pH of 1.0 with concentrated hydrochloric acid, and 140 parts of sodium chloride was added thereto, followed by stirring overnight to allow a solid to be precipitated. The precipitated solid was filtrated and separated to obtain 27.2 parts of a wet cake. The wet cake thus obtained was added into a mixed solvent of 255 parts of methanol and 45 parts of water, followed by stirring at 50° C. for 1 hour, after which the precipitated solid was filtrated and separated to obtain 42.2 parts of a wet cake. The wet cake thus obtained was dried to obtain 16.3 parts of a white powder of the intended organic amine represented by the formula (8).

Step 2: Synthesis of porphyrazine coloring matter of the present invention represented by the following formula (9) (coloring matter of the above formula (1) in which 1.37 of rings A to D are pyridine rings that have been ring condensed at the 2-position and 3-position, the remaining 2.63 are benzene rings, E is ethylene, X is 4-sulfoanilino, a is 1, b is 1.83, c is 0.80, group F is phenyl, and R is 4-sulfo).

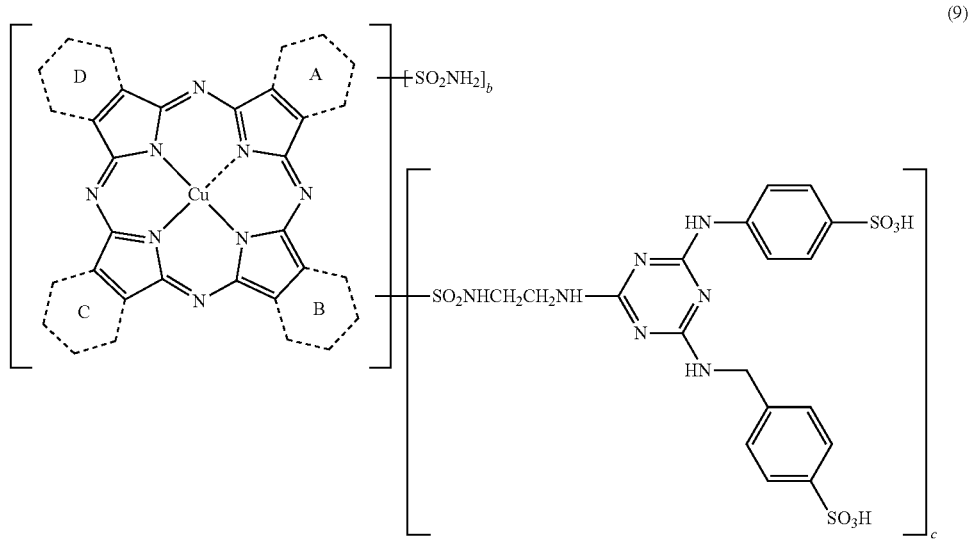

To 200 parts of ice water were added 33.0 parts of the wet cake obtained similarly to Step 2 in Example 1, followed by allowing to be suspended by stirring at no higher than 5° C. After 10 min, a solution in which 4.5 parts of the organic amine of the formula (8) obtained in the above Step 1 was dissolved into the mixed liquid of 1 part of 28% aqueous ammonia and 40 parts of water was added to this suspension while maintaining at no higher than 10° C., and was allowed to react while maintaining a pH of 9.0 with 28% aqueous ammonia. The temperature was elevated to 20° C. while maintaining at the same pH, and reaction was further allowed over night at the same temperature. The amount of the liquid was 300 parts in this step. The temperature of the reaction liquid was elevated to 50° C., and 41.3 parts of sodium chloride was added thereto and stirred for 10 min, after which the pH was adjusted to 1.0 with concentrated hydrochloric acid, followed by filtrating and separating the precipitated solid, and washing with 100 parts of a 20% aqueous sodium chloride solution to obtain 58.1 parts of a wet cake. The wet cake thus obtained was added to 235 parts of water, and the pH was adjusted to 9.0 with a 25% aqueous sodium hydroxide solution, thereby permitting dissolution. The amount of the liquid was 300 parts in this step. The temperature of this solution was elevated to 50° C., and 50 parts of sodium chloride was added thereto. After the mixture was stirred for 30 min, the pH was adjusted to 1.0 with concentrated hydrochloric acid, followed by filtration and separation of the precipitated solid, and washing with 100 parts of a 20% aqueous sodium chloride solution to obtain 42.9 parts of a wet cake. The wet cake thus obtained was added to a mixed liquid of 40 parts of water, 80 parts of methanol, and 40 parts of isopropyl alcohol. After stirring the mixture at 50° C. for 1 hour, the precipitated solid was filtrated and separated to obtain 27.0 parts of a wet cake. The wet cake thus obtained was dried to obtain 10.4 parts of free acid of the colorant matter represented by the above formula (9) as a blue powder. λmax: 602 nm.

Example 4

Step 1: Synthesis of compound represented by the above formula (4) in which 1.20 of rings A to D are pyridine rings that have been ring condensed at the 2-position and 3-position, and the remaining 2.80 are benzene rings.

Added to 375 parts of sulfolane were 31.11 parts of phthalic anhydride, 15.04 parts of quinolinic acid, 108 parts of urea, 10.1 parts of copper(II) chloride and 1.5 parts of ammonium molybdate, the temperature of the mixture was elevated to 200° C., and was allowed to react for 5 hours at the same temperature. After completing the reaction, the mixture was cooled to 65° C., 50 parts of DMF was added thereto, and the precipitated solid was filtrated and separated. The solid thus obtained was washed with 50 parts of DMF to obtain 75.1 parts of a wet cake. The wet cake thus obtained was added to 450 parts of DMF, the temperature of the mixture was elevated to 110° C., and was allowed to react for 1 hour at the same temperature. The precipitated solid was filtrated and separated, then washed with 200 parts of water to obtain a wet cake. The wet cake thus obtained was added into 450 parts of 5% hydrochloric acid, and the temperature was elevated to 60° C., followed by stirring at the same temperature for 1 hour. The precipitated solid was filtrated and separated, then washed with 200 parts of water to obtain a wet cake. The wet cake thus obtained was added into 450 parts of 5% aqueous ammonia, stirred for 1 hour at 60° C., then the precipitated solid was filtrated and separated, followed by washing with 200 parts of water to obtain 78.6 parts of a wet cake. The wet cake thus obtained was dried at 80° C. to obtain 24.9 parts of the target compound as a blue solid.

Step 2: Synthesis of compound of the above formula (2) in which 1.20 of rings A to D are pyridine rings that have been ring condensed at the 2-position and 3-position, the remaining 2.80 are benzene rings, and n is 2.80.

Under room temperature, 5.8 parts of the compound of the formula (4) obtained in Step 1 of Example 1 was gradually added into 46.2 parts of chlorosulfonic acid so as not to exceed 60° C., and then the reaction was allowed at 140° C. for 4 hours. The reaction liquid thus obtained was cooled to 70° C., to which 17.9 parts of thionyl chloride was added dropwise over 30 min, and the reaction was further allowed for 3 hours at 70° C. The reaction liquid was cooled to no higher than 30° C., and was slowly poured into 800 parts of ice water. Thus precipitated solid was filtrated and separated, and washed with 200 parts of cold water to obtain 38.2 parts of a wet cake of the target compound.

Step 3: Synthesis of organic amine represented by the following formula (10) (organic amine of the above formula (3) in which E is ethylene, X is 2,5-disulfoanilino, a is 1, group F is phenyl, and R is a hydrogen atom).

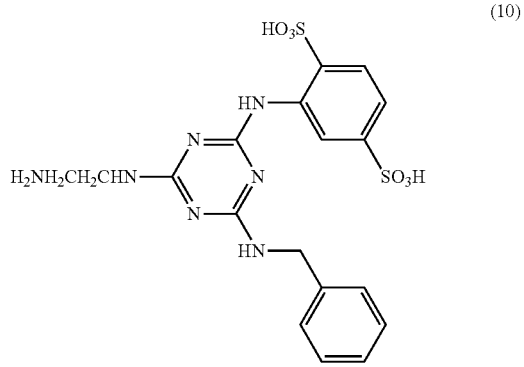

(10)

Into 100 parts of ice water were added 18.4 parts of cyanuric chloride and Leocol TD-90 (0.05 parts), and the mixture was stirred at no higher than 10° C. for 30 min. Next, thereto was added 31.7 parts of 2,5-disulfoaniline (using 88.4% purity commercially available product), and the reaction was allowed while adjusting the pH to 2.0 to 3.0 with a 10% aqueous sodium hydroxide solution at 0 to 10° C. for 2 hours, and at 25 to 30° C. for 1 hour. Subsequently, to this reaction liquid were added 10.9 parts of benzylamine, and was allowed to react while adjusting the pH to 7.0 to 8.0 with a 10% aqueous sodium hydroxide solution at 25 to 30° C. for 1 hour, and at 30 to 40° C. for 1 hour to obtain a reaction liquid containing a secondary condensate.

To an aqueous solution in which 60.1 parts of ethylenediamine had been added to 120 parts of ice, the reaction liquid containing the secondary condensate obtained in the above way was gradually added, and then stirred at room temperature for 1 hour. To this solution were added 150 parts of ice and 200 parts of concentrated hydrochloric acid to adjust the pH to 1.0. The amount of the liquid was 700 parts in this step. To this reaction liquid were added 140 parts of sodium chloride, and the mixture was stirred overnight to allow a solid to precipitate. The precipitated solid was filtrated and separated to obtain 70.0 parts of a wet cake. The wet cake thus obtained was added to 280 parts of water, and permitted to dissolve by adjusting the pH to 9.0 with a 10% aqueous sodium hydroxide solution. The amount of the liquid was 360 parts in this step. This solution was adjusted to a pH of 1.0 with concentrated hydrochloric acid, and 70 parts of sodium chloride was added thereto, followed by stirring overnight to allow a solid to be precipitated. The precipitated solid was filtrated and separated to obtain 60.3 parts of a wet cake. The wet cake thus obtained was added into a mixed solvent of 255 parts of methanol and 45 parts of water, followed by stirring at 50° C. for 1 hour, after which the precipitated solid was filtrated and separated to obtain 50.3 parts of a wet cake. The wet cake thus obtained was dried to obtain 15.3 parts of a white powder of the intended organic amine represented by the formula (10).

Step 4: Synthesis of porphyrazine coloring matter of the present invention represented by the following formula (11) (coloring matter of the above formula (1) in which 1.20 of rings A to D are pyridine rings that have been ring condensed at the 2-position and 3-position, the remaining 2.80 are benzene rings, E is ethylene, X is 2,5-disulfoanilino, a is 1, b is 1.60, c is 1.20, group F is phenyl, and R is a hydrogen atom).

obtained was dried to obtain 11.2 parts of free acid of the coloring matter of the present invention represented by the above formula (11) as a blue powder. λmax: 605 nm.

Example 5

Step 1: Synthesis of porphyrazine coloring matter of the present invention represented by the above formula (11) (coloring matter of the above formula (1) in which 1.37 of rings A

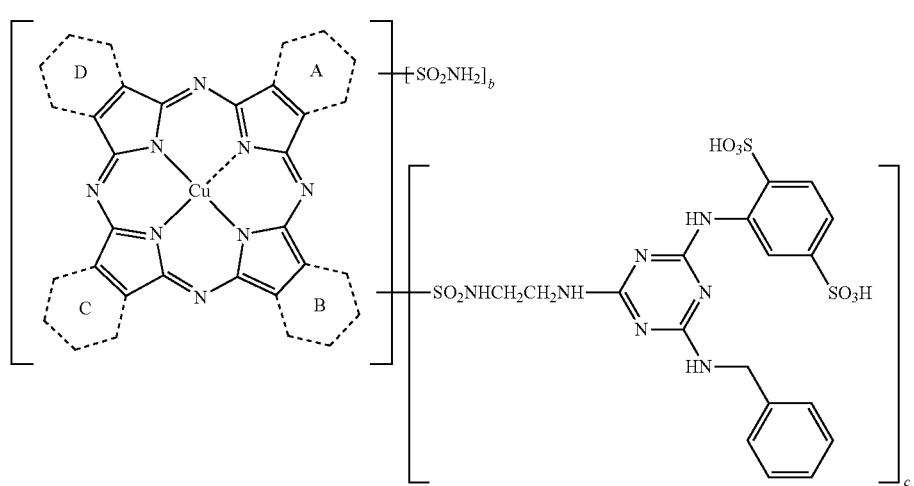

(11)

To 200 parts of ice water were added 38.2 parts of the wet cake obtained in the above Step 2, followed by allowing to be suspended by stirring at no higher than 5° C. After 10 min, a solution in which 7.4 parts of the organic amine of the formula (10) obtained in the above Step 3 was dissolved into the mixed liquid of 1.5 parts of 28% aqueous ammonia and 40 parts of water was added to this suspension while maintaining at no higher than 10° C., and was allowed to react while maintaining a pH of 9.0 with 28% aqueous ammonia. The temperature was elevated to 20° C. while maintaining at the same pH, and reaction was further allowed overnight at the same temperature. The amount of the liquid was 300 parts in this step. The temperature of the reaction liquid was elevated to 50° C., and 51 parts of sodium chloride was added thereto and stirred for 30 min, after which the pH was adjusted to 1.0 with concentrated hydrochloric acid, followed by filtrating and separating the precipitated solid, and washing with 100 parts of a 20% aqueous sodium chloride solution to obtain 27.1 parts of a wet cake. The wet cake thus obtained was added to 191 parts of water, and the pH was adjusted to 9.0 with a 25% aqueous sodium hydroxide solution, thereby permitting dissolution. The amount of the liquid was 270 parts in this step. The temperature of this solution was elevated to 50° C., and 50 parts of sodium chloride was added thereto. After the mixture was stirred for 30 min, the pH was adjusted to 4.0 with concentrated hydrochloric acid, followed by filtration and separation of the precipitated solid, and washing with 100 parts of a 20% aqueous sodium chloride solution to obtain 21.4 parts of a wet cake. To the wet cake thus obtained were added a mixed liquid of 160 parts of isopropyl alcohol and 40 parts of water. After stirring the mixture at 50° C. for 1 hour, 15.7 parts of a wet cake were obtained. The wet cake thus to D are pyridine rings that have been ring condensed at the 2-position and 3-position, the remaining 2.63 are benzene rings, E is ethylene, X is 2,5-disulfoanilino, a is an integer of 1, b is 1.43, c is 1.20, group F is phenyl, and R is a hydrogen atom).

To 200 parts of ice water were added 33.0 parts of the wet cake obtained similarly to Step 2 in Example 1, followed by allowing to be suspended by stirring at no higher than 5° C. After 10 min, a solution in which 7.4 parts of the organic amine of the formula (10) obtained in Step 3 of Example 4 was dissolved into the mixed liquid of 1 part of 28% aqueous ammonia and 40 parts of water was added to this suspension while maintaining at no higher than 10° C., and was allowed to react while maintaining a pH of 9.0 with 28% aqueous ammonia. The temperature was elevated to 20° C. while maintaining at the same pH, and reaction was further allowed over night at the same temperature. The amount of the liquid was 300 parts in this step. The temperature of the reaction liquid was elevated to 50° C., and 55.0 parts of sodium chloride was added thereto and stirred for 10 min, after which the pH was adjusted to 1.0 with concentrated hydrochloric acid, followed by filtrating and separating the precipitated solid, and washing with 100 parts of a 20% aqueous sodium chloride solution to obtain 31.2 parts of a wet cake. The wet cake thus obtained was added to 240 parts of water, and the pH was adjusted to 9.0 with a 25% aqueous sodium hydroxide solution, thereby permitting dissolution. The amount of the liquid was 280 parts in this step. The temperature of this solution was elevated to 50° C., and 55 parts of sodium chloride was added thereto. After the mixture was stirred for 30 min, the pH was adjusted to 1.0 with concentrated hydrochloric acid, followed by filtration and separation of the precipitated solid, and washing with 100 parts of a 20% aqueous sodium chloride solution to obtain 25.1 parts of a wet cake. The wet cake thus obtained was added to a mixed liquid of 40 parts of water and 160 parts of isopropyl alcohol. After stirring the mixture at 50° C. for 1 hour, the precipitated solid was filtrated and separated to obtain 30.0 parts of a wet cake. The wet cake thus obtained was dried to obtain 10.4 parts of free acid of the coloring matter of the present invention represented by the above formula (11) as a blue powder. λmax: 604 nm.

Example 6

Step 1: Synthesis of organic amine represented by the following formula (12) (organic amine of the above formula (3) in which E is ethylene, X is 2,5-disulfoanilino, a is an integer of 1, group F is phenyl, and R is sulfo).

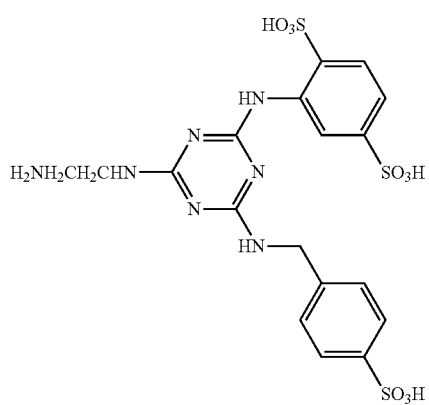

(12)

Into 100 parts of ice water were added 18.4 parts of cyanuric chloride and Leocol TD-50 (0.1 parts), and the mixture was stirred at no higher than 10° C. for 30 min. Next, thereto was added 31.7 parts of 2,5-disulfoaniline (using 88.4% purity commercially available product), and the reaction was allowed while adjusting the pH to 2.0 to 3.0 with a 10% aqueous sodium hydroxide solution at 0 to 10° C. for 2 hours, and at 25 to 30° C. for 1 hour. Subsequently, to this reaction liquid were added 21.0 parts of benzylamine sulfonic acid, and was allowed to react while adjusting the pH to 7.0 to 8.0 with a 10% aqueous sodium hydroxide solution at 25 to 30° C. for 1 hour, and at 30 to 40° C. for 1 hour to obtain a reaction liquid containing a secondary condensate.

To an aqueous solution in which 60.1 parts of ethylenediamine had been added to 120 parts of ice, the reaction liquid containing the secondary condensate obtained in the above way was gradually added, and then stirred at room temperature for 1 hour. To this solution were added 200 parts of ice and 200 parts of concentrated hydrochloric acid to adjust the pH to 1.0. The amount of the liquid was 800 parts in this step. To this reaction liquid were added 200 parts of sodium chloride, and the mixture was stirred overnight to allow a solid to precipitate. The precipitated solid was filtrated and separated to obtain 153.0 parts of a wet cake. The wet cake thus obtained was added to 300 parts of water, and permitted to dissolve by adjusting the pH to 9.0 with a 10% aqueous sodium hydroxide solution. The amount of the liquid was 460 parts in this step. This solution was adjusted to a pH of 1.0 with concentrated hydrochloric acid, and 80 parts of sodium chloride was added thereto, followed by stirring overnight to allow a solid to be precipitated. The precipitated solid was filtrated and separated to obtain 61.2 parts of a wet cake. The wet cake thus obtained was added into a mixed solvent of 160 parts of methanol and 40 parts of water, followed by stirring at 50° C. for 1 hour, after which the precipitated solid was filtrated and separated to obtain 134.0 parts of a wet cake. The wet cake thus obtained was dried to obtain 24.5 parts of a white powder of the intended organic amine represented by the formula (12).

Step 2: Synthesis of porphyrazine coloring matter of the present invention represented by the following formula (13) (coloring matter of the above formula (1) in which 1.20 of rings A to D are pyridine rings that have been ring condensed at the 2-position and 3-position, the remaining 2.80 are benzene rings, E is ethylene, X is 2,5-disulfoanilino, a is an integer of 1, b is 1.60, c is 1.20, group F is phenyl, and R is 4-sulfo).

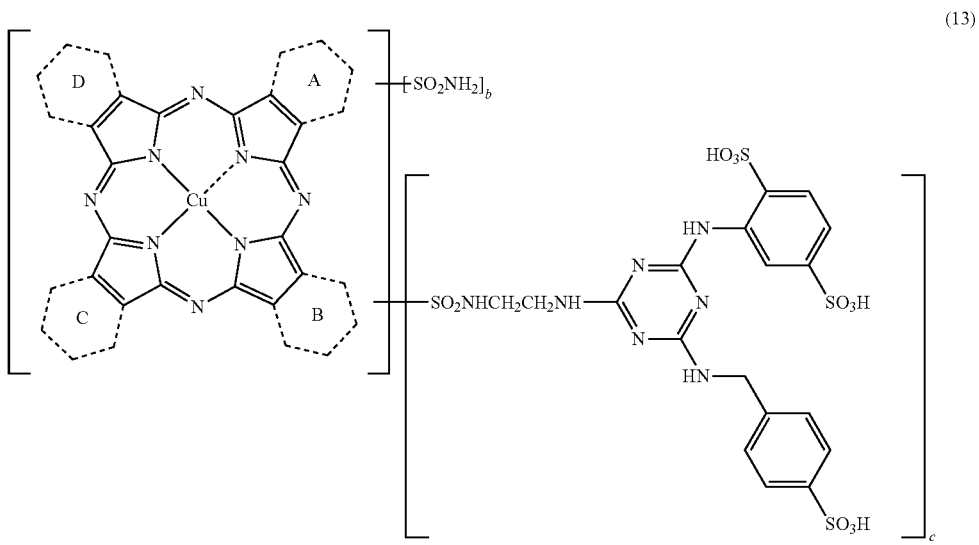

(13)

To 200 parts of ice water were added 33.0 parts of the wet cake obtained similarly to Step 2 in Example 4, followed by allowing to be suspended by stirring at no higher than 5° C. After 10 min, a solution in which 9.8 parts of the organic amine of the formula (12) obtained in the above Step 1 was dissolved into the mixed liquid of 1 part of 28% aqueous ammonia and 40 parts of water was added to this suspension while maintaining at no higher than 10° C., and was allowed to react while maintaining a pH of 9.0 with 28% aqueous ammonia. The temperature was elevated to 20° C. while maintaining at the same pH, and reaction was further allowed over night at the same temperature. The amount of the liquid was 310 parts in this step. The temperature of the reaction liquid was elevated to 50° C., and 50.0 parts of sodium chloride was added thereto and stirred for 10 min, after which the pH was adjusted to 1.0 with concentrated hydrochloric acid, followed by filtrating and separating the precipitated solid, and washing with 100 parts of a 20% aqueous sodium chloride solution to obtain 100.0 parts of a wet cake. The wet cake thus obtained was added to 180 parts of water, and the pH was adjusted to 9.0 with a 25% aqueous sodium hydroxide solution, thereby permitting dissolution. The amount of the liquid was 300 parts in this step. The temperature of this solution was elevated to 50° C., and 55 parts of sodium chloride was added thereto. After the mixture was stirred for 30 min, the pH was adjusted to 1.0 with concentrated hydrochloric acid, followed by filtration and separation of the precipitated solid, and washing with 100 parts of a 20% aqueous sodium chloride solution to obtain 69.4 parts of a wet cake. The wet cake thus obtained was added to a mixed liquid of 40 parts of water and 160 parts of methanol. After stirring the mixture at 50° C. for 1 hour, the precipitated solid was filtrated and separated to obtain 45.2 parts of a wet cake. The wet cake thus obtained was dried to obtain 11.4 parts of free acid of the coloring matter of the present invention represented by the above formula (13) as a blue powder. λmax: 600 nm.

Example 7

Step 1: Synthesis of compound represented by the above formula (4) in which 1.00 of rings A to D are pyridine rings that have been ring condensed at the 2-position and 3-position, and the remaining 3.00 are benzene rings.

Added to 375 parts of sulfolane were 33.32 parts of phthalic anhydride, 10.08 parts of quinolinic acid, 108 parts of urea, 10.1 parts of copper(II) chloride and 1.5 parts of ammonium molybdate, the temperature of the mixture was elevated to 200° C., and was allowed to react for 5 hours at the same temperature. After completing the reaction, the mixture was cooled to 65° C., 50 parts of DMF was added thereto, and the precipitated solid was filtrated and separated. The solid thus obtained was washed with 50 parts of DMF to obtain 75.1 parts of a wet cake. The wet cake thus obtained was added to 450 parts of DMF, the temperature of the mixture was elevated to 110° C., and was allowed to react for 1 hour at the same temperature. The precipitated solid was filtrated and separated, then washed with 200 parts of water to obtain a wet cake. The wet cake thus obtained was added into 450 parts of 5% hydrochloric acid, and the temperature was elevated to 60° C., followed by stirring at the same temperature for 1 hour. The precipitated solid was filtrated and separated, then washed with 200 parts of water to obtain a wet cake. The wet cake thus obtained was added into 450 parts of 5% aqueous ammonia, stirred for 1 hour at 60° C., then the precipitated solid was filtrated and separated, followed by washing with 200 parts of water to obtain 78.6 parts of a wet cake. The wet cake thus obtained was dried at 80° C. to obtain 25.2 parts of the target compound as a blue solid.

Step 2: Synthesis of compound of the above formula (2) in which 1.00 of rings A to D are pyridine rings that have been ring condensed at the 2-position and 3-position, the remaining 3.00 are benzene rings, and n is 3.00.

Under room temperature, 5.8 parts of the compound of the formula (4) obtained in the above Step 1 was gradually added into 46.2 parts of chlorosulfonic acid so as not to exceed 60° C., and then the reaction was allowed at 140° C. for 4 hours. The reaction liquid thus obtained was cooled to 70° C., to which 17.9 parts of thionyl chloride was added dropwise over 30 min, and the reaction was further allowed for 3 hours at 70° C. The reaction liquid was cooled to no higher than 30° C., and was slowly poured into 800 parts of ice water. Thus precipitated solid was filtrated and separated, and washed with 200 parts of cold water to obtain 31.5 parts of a wet cake of the target compound.

Step 3: Synthesis of organic amine represented by the following formula (14) (organic amine of the above formula (3) in which E is ethylene, X is 3,6,8-trisulfo-1-naphthylamino, a is 1, group F is phenyl, and R is a hydrogen atom).

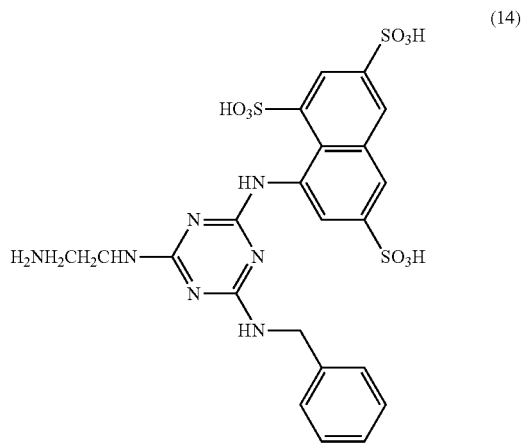

Into 100 parts of ice water were added 18.4 parts of cyanuric chloride and Leocol TD-50 (0.1 parts), and the mixture was stirred at no higher than 10° C. for 30 min. To this liquid was added 44.0 parts of 3,6,8-trisulfo-naphthylamine, and the reaction was allowed while adjusting the pH to 2.0 to 3.0 with a 10% aqueous sodium hydroxide solution at 0 to 10° C. for 2 hours, and at 25 to 30° C. for 1 hour. To the reaction liquid thus obtained were added 10.7 parts of benzylamine, and was allowed to react while adjusting the pH to 7.0 to 8.0 with a 10% aqueous sodium hydroxide solution at 25 to 30° C. for 1 hour, and at 30 to 40° C. for 1 hour, to obtain a reaction liquid containing a secondary condensate.

To an aqueous solution in which 60.1 parts of ethylenediamine had been added to 120 parts of ice, the reaction liquid containing the secondary condensate obtained in the above way was gradually added, and then stirred at room temperature for 1 hour. To this solution were added 200 parts of ice and 200 parts of concentrated hydrochloric acid to adjust the pH to 1.0. The amount of the liquid was 800 parts in this step. To this reaction liquid were added 200 parts of sodium chloride, and the mixture was stirred overnight to allow a solid to precipitate. The precipitated solid was filtrated and separated to obtain 60.7 parts of a wet cake. The wet cake thus obtained was added to 250 parts of water, and permitted to dissolve by adjusting the pH to 9.0 with a 10% aqueous sodium hydroxide solution. The amount of the liquid was 320 parts in this step. This solution was adjusted to a pH of 1.0 with concentrated hydrochloric acid, and 80 parts of sodium chloride was added thereto, followed by stirring overnight to allow a solid to be precipitated. The precipitated solid was filtrated and separated to obtain 70.0 parts of a wet cake. The wet cake thus obtained was added into a mixed solvent of 160 parts of methanol and 40 parts of water, followed by stirring at 50° C.

for 1 hour, after which the precipitated solid was filtrated and separated to obtain 46.1 parts of a wet cake. The wet cake thus obtained was dried to obtain 29.6 parts of a white powder of the intended organic amine represented by the formula (14).

Step 4: Synthesis of porphyrazine coloring matter of the present invention represented by the following formula (15) (coloring matter of the above formula (1) in which 1.00 of rings A to D are pyridine rings that have been ring condensed at the 2-position and 3-position, the remaining 3.00 are benzene rings, E is ethylene, X is 3,6,8-trisulfo-1-naphthylamino, a is 1, b is 2.20, c is 0.80, group F is phenyl, and R is a hydrogen atom).

parts of a wet cake. The wet cake thus obtained was dried to obtain 9.5 parts of free acid of the coloring matter of the present invention represented by the above formula (15) as a blue powder. λmax: 603 nm.

Example 8

Step 1: Synthesis of organic amine represented by the following formula (16) (organic amine of the above formula (3) in which E is ethylene, X is 2,5-disulfoanilino, a is 1, group F is phenyl, and R is a 4-carboxy).

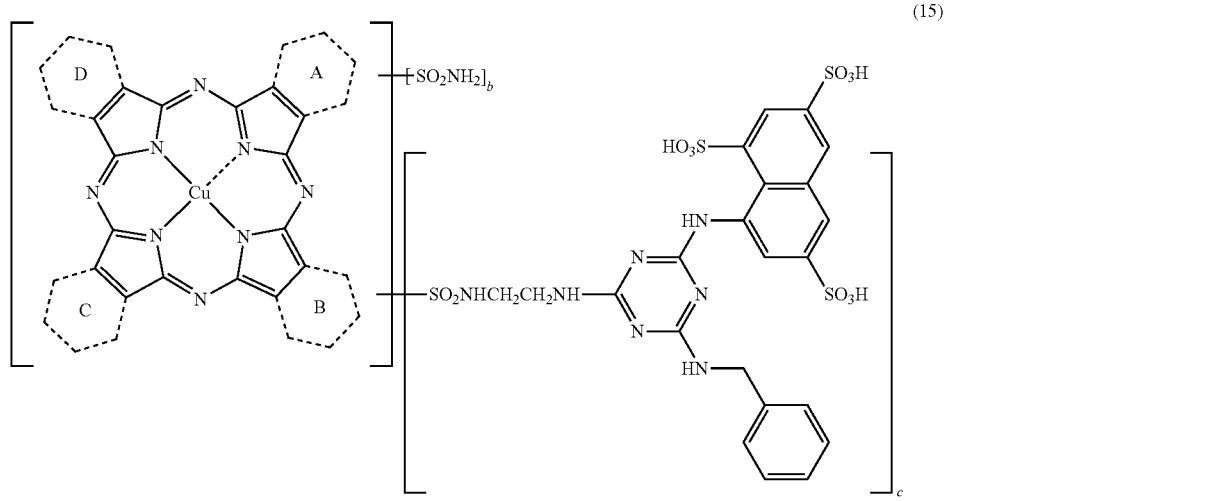

(15)

To 200 parts of ice water were added 25.2 parts of the wet cake obtained in the above Step 2, followed by allowing to be suspended by stirring at no higher than 5° C. After 10 min, a solution in which 6.2 parts of the organic amine of the formula (14) obtained in the above Step 3 was dissolved into the mixed liquid of 1 part of 28% aqueous ammonia and 40 parts of water was added to this suspension while maintaining at no higher than 10° C., and was allowed to react while maintaining a pH of 9.0 with 28% aqueous ammonia. The temperature was elevated to 20° C. while maintaining at the same pH, and reaction was further allowed over night at the same temperature. The amount of the liquid was 300 parts in this step. The temperature of the reaction liquid was elevated to 50° C., and 50.0 parts of sodium chloride was added thereto and stirred for 10 min, after which the pH was adjusted to 1.0 with concentrated hydrochloric acid, followed by filtrating and separating the precipitated solid, and washing with 100 parts of a 20% aqueous sodium chloride solution to obtain 78.6 parts of a wet cake. The wet cake thus obtained was added to 180 parts of water, and the pH was adjusted to 9.0 with a 25% aqueous sodium hydroxide solution, thereby permitting dissolution. The amount of the liquid was 270 parts in this step. The temperature of this solution was elevated to 50° C., and 55 parts of sodium chloride was added thereto. After the mixture was stirred for 30 min, the pH was adjusted to 1.0 with concentrated hydrochloric acid, followed by filtration and separation of the precipitated solid, and washing with 100 parts of a 20% aqueous sodium chloride solution to obtain 52.6 parts of a wet cake. The wet cake thus obtained was added to a mixed liquid of 40 parts of water and 160 parts of methanol. After stirring the mixture at 50° C. for 1 hour, the precipitated solid was filtrated and separated to obtain 47.4

(16)

Into 200 parts of ice water were added 18.4 parts of cyanuric chloride and Leocol TD-90 (0.05 parts), and the mixture was stirred at no higher than 10° C. for 30 min. Next, thereto was added 31.7 parts of 2,5-disulfoaniline (using 88.4% purity commercially available product), and the reaction was allowed while adjusting the pH to 2.8 to 3.0 with a 10% aqueous sodium hydroxide solution at 0 to 10° C. for 2 hours, and while adjusting the pH to 2.8 to 3.0 at 25 to 30° C. for 1 hour. Subsequently, to this reaction liquid were added 13.6 parts of 4-carboxybenzylamine, and was allowed to react while adjusting the pH to 6.0 to 6.5 with a 10% aqueous sodium hydroxide solution at 25 to 30° C. for 1 hour, and at 40 to 45° C. for 2.5 hours to obtain a reaction liquid containing a secondary condensate.

To an aqueous solution in which 60.1 parts of ethylenediamine had been added to 150 parts of ice, the reaction liquid containing the secondary condensate obtained in the above way was gradually added, and then stirred at room temperature for 1 hour. To this solution were added 150 parts of ice and 210 parts of concentrated hydrochloric acid to adjust the pH to 1.0. The amount of the liquid was 900 parts in this step. To this reaction liquid were added 180 parts of sodium chloride, and the mixture was stirred overnight to allow a solid to precipitate. The precipitated solid was filtrated and separated to obtain 154.8 parts of a wet cake. The wet cake thus obtained was added to 270 parts of water, and permitted to dissolve by adjusting the pH to 9.0 with a 10% aqueous sodium hydroxide solution. The amount of the liquid was 450 parts in this step. This solution was adjusted to a pH of 1.0 with concentrated hydrochloric acid, and 100 parts of sodium chloride was added thereto, followed by stirring overnight to allow a solid to be precipitated. The precipitated solid was filtrated and separated to obtain 85.7 parts of a wet cake. The wet cake thus obtained was added into a mixed solvent of 480 parts of isopropyl alcohol and 120 parts of water, followed by stirring at 50° C. for 2 hours, after which the precipitated solid was filtrated and separated to obtain 146.5 parts of a wet cake. The wet cake thus obtained was dried to obtain 35.0 parts of a white powder of the intended organic amine represented by the formula (16).

Step 4: Synthesis of porphyrazine coloring matter of the present invention represented by the following formula (17) (coloring matter of the above formula (1) in which 1.37 of rings A to D are pyridine rings that have been ring condensed at the 2-position and 3-position, the remaining 2.63 are benzene rings, E is ethylene, X is 2,5-disulfoanilino, a is 1, b is 1.43, c is 1.20, group F is phenyl, and R is 4-carboxy).

To 120 parts of ice water were added 33.0 parts of the wet cake of formula (2) obtained in Step 2 of Example 1, followed by allowing to be suspended by stirring at no higher than 5° C. After 10 min, a solution in which 7.9 parts of the organic amine represented by the formula (16) was dissolved into the mixed liquid of 1 part of 28% aqueous ammonia and 40 parts of water was added to this suspension while maintaining at no higher than 10° C., and was allowed to react while maintaining a pH of 9.0 with 28% aqueous ammonia. The temperature was elevated to 20° C. while maintaining at the same pH over 1 hour, and reaction was further allowed over night at the same temperature. The liquid amount of the reaction liquid in this step was 250 parts. The temperature of the reaction liquid was elevated to 50° C., and 25 parts of sodium chloride was added thereto and stirred for 10 min, after which the pH was adjusted to 1.0 over 20 min with concentrated hydrochloric acid, followed by filtrating and separating the precipitated solid, and washing with 100 parts of a 10% aqueous sodium chloride solution, whereby 76.6 parts of a wet cake were obtained. The wet cake thus obtained was added to 200 parts of water, and the pH was adjusted to 9.0 with a 25% aqueous sodium hydroxide solution to permit dissolution. The amount of the liquid was 300 parts in this step. The temperature of this solution was elevated to 50° C., and 30 parts of sodium chloride was added thereto. After the mixture was stirred for 10 min, the pH was adjusted to 3.0 with concentrated hydrochloric acid, followed by filtration and separation of the precipitated solid, and washing with 100 parts of a 10% aqueous sodium chloride solution to obtain 75.1 parts of a wet cake. The wet cake thus obtained was added to a mixed liquid of 255 parts of methanol and 45 parts of water. After stirring the mixture at 50° C. for 1 hour, the precipitated solid was filtrated and separated to obtain 46.6 parts of a wet cake. The wet cake thus obtained was dried to obtain 8.8 parts of free acid of the coloring matter of the present invention represented by the formula (17) as a blue powder. λmax: 600 nm.

Example 9

Step 1: Synthesis of organic amine represented by the following formula (18) (organic amine of the above formula

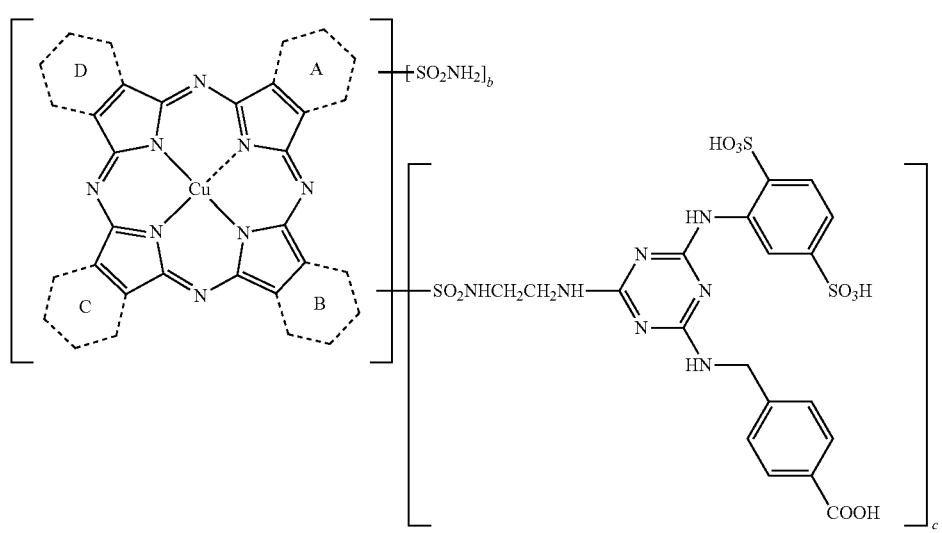

(17)

(3) in which E is ethylene, X is 2,4-disulfoanilino, a is 1, group F is phenyl, and R is a hydrogen atom).

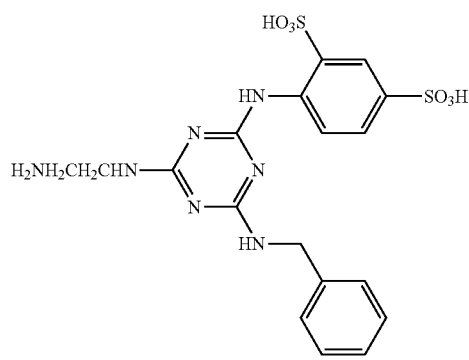

Into 100 parts of ice water were added 14.7 parts of cyanuric chloride and Leocol TD-50 (0.1 parts), and the mixture was stirred at no higher than 10° C. for 30 min. Next, thereto was added 20.3 parts of 2,4-disulfoaniline, and the reaction was allowed while adjusting the pH to 2.8 to 3.0 with a 10% aqueous sodium hydroxide solution at 0 to 10° C. for 1 hour, at 10 to 20° C. for 1 hour, and at 25 to 30° C. for 1.5 hours. Subsequently, to this reaction liquid were added 9.4 parts of benzylamine, and was allowed to react overnight while adjusting the pH to 7.0 to 8.0 with a 10% aqueous sodium hydroxide solution at 25 to 30° C. to obtain a reaction liquid containing a secondary condensate.

To an aqueous solution in which 60.1 parts of ethylenediamine had been added to 120 parts of ice, the reaction liquid containing the secondary condensate obtained in the above way was gradually added, and then stirred at room temperature for 1 hour. To this solution were added 155 parts of concentrated hydrochloric acid to adjust the pH to 1.0. The amount of the liquid was 630 parts in this step. To this reaction liquid were added 65 parts of sodium chloride, and the mixture was stirred overnight to allow a solid to precipitate. The precipitated solid was filtrated and separated to obtain 86.7 parts of a wet cake. The wet cake thus obtained was added to 400 parts of water, and permitted to dissolve by adjusting the pH to 9.0 with a 25% aqueous sodium hydroxide solution. The amount of the liquid was 540 parts in this step. This solution was adjusted to a pH of 1.0 with concentrated hydrochloric acid, and 40 parts of sodium chloride was added thereto, followed by stirring overnight to allow a solid to be precipitated. The precipitated solid was filtrated and separated to obtain 164.1 parts of a wet cake. The wet cake thus obtained was added into a mixed solvent of 1312 parts of isopropyl alcohol and 328 parts of water, followed by stirring at 50° C. for 1 hour, after which the precipitated solid was filtrated and separated to obtain 45.7 parts of a wet cake. The wet cake thus obtained was dried to obtain 21.2 parts of a white powder of the intended organic amine represented by the formula (18).

Step 2: Synthesis of porphyrazine coloring matter of the present invention represented by the following formula (19) (coloring matter of the above formula (1) in which 1.37 of rings A to D are pyridine rings that have been ring condensed at the 2-position and 3-position, the remaining 2.63 are benzene rings, E is ethylene, X is 2,4-disulfoanilino, a is 1, b is 1.43, c is 1.20, group F is phenyl, and R is a hydrogen atom).

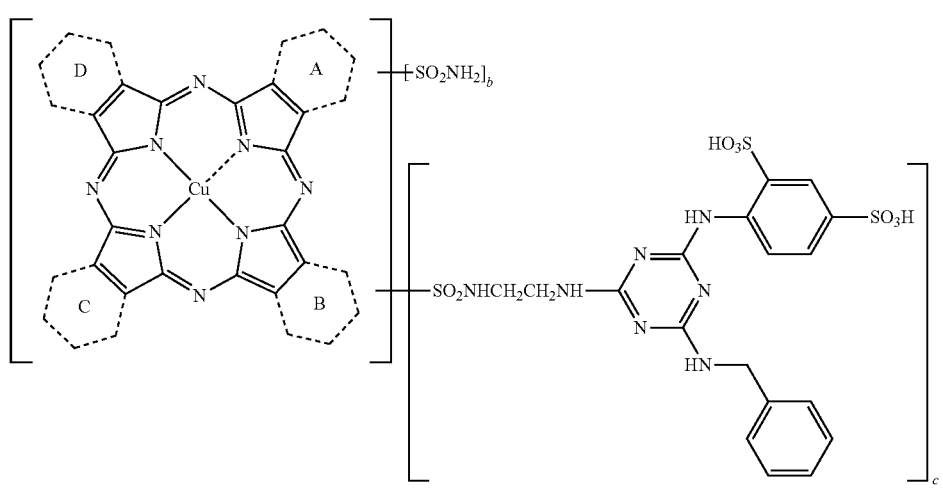

To 200 parts of ice water were added 33.0 parts of the wet cake obtained similarly to Step 2 in Example 1, followed by allowing to be suspended by stirring at no higher than 5° C. After 10 min, a solution in which 7.4 parts of the organic amine of the formula (18) obtained in the above Step 1 was dissolved into the mixed liquid of 1 part of 28% aqueous ammonia and 40 parts of water was added to this suspension while maintaining at no higher than 10° C., and was allowed to react while maintaining a pH of 9.0 with 28% aqueous ammonia. The temperature was elevated to 20° C. while maintaining at the same pH, and reaction was further allowed over night at the same temperature. The amount of the liquid was 300 parts in this step. The temperature of the reaction liquid was elevated to 50° C., and 50 parts of sodium chloride was added thereto and stirred for 10 min, after which the pH was adjusted to 1.0 with concentrated hydrochloric acid, followed by filtrating and separating the precipitated solid, and washing with 100 parts of a 20% aqueous sodium chloride solution to obtain 51.4 parts of a wet cake. The wet cake thus obtained was added to 225 parts of water, and the pH was adjusted to 9.0 with a 25% aqueous sodium hydroxide solution, thereby permitting dissolution. The amount of the liquid was 300 parts in this step. The temperature of this solution was elevated to 50° C., and 34.5 parts of sodium chloride was added thereto. After the mixture was stirred for 30 min, the pH was adjusted to 1.0 with concentrated hydrochloric acid, followed by filtration and separation of the precipitated solid, and washing with 100 parts of a 20% aqueous sodium chloride solution to obtain 50.0 parts of a wet cake. The wet cake thus obtained was added to a mixed liquid of 40 parts of water and 160 parts of isopropyl alcohol. After stirring the mixture at 50° C. for 1 hour, the precipitated solid was filtrated and separated to obtain 22.1 parts of a wet cake. The wet cake thus obtained was dried to obtain 11.7 parts of free acid of the coloring matter of the present invention represented by the above formula (19) as a blue powder. λmax: 607 nm.

(A) Preparation of Ink

Each component listed in the following Table 5 was mixed and dissolved, and then filtered with a 0.45 μm membrane filter (manufactured by Advantech Co., Ltd.), thereby preparing an ink for evaluation tests. Ion-exchanged water was used as the "water" for the preparation of ink. In addition, the pH of the ink was adjusted with sodium hydroxide so as to be 8 to 10, and water was added so as to make up the total amount of 100 parts. The preparation of the ink using the coloring matter obtained in Example 1 is defined as Example 10, and similarly, the preparations of inks using the coloring matters obtained in Examples 2 to 6, 8 and 9 are defined as Examples 11 to 15, 16 and 17, respectively. In addition, a comparative coloring matter 1 represented by the following formula (21) was obtained by the method described in the following Synthesis Example 1. Other than using the comparative coloring matter 1 of the formula (21) in place of each coloring matter obtained in the Examples, the ink for comparison was obtained in the same way for Examples 10 to 17. The preparation of this comparative coloring matter is defined as Comparative Example 1.

It should be noted that trade name Sulfynol® 104PG50 manufactured by Nissin Chemical Co., Ltd. was used as the "surfactant" in Table 5.

TABLE 5

| Respective coloring matters obtained in Examples | 5.0 parts |
|---|---|
| Glycerin | 5.0 parts |
| Urea | 5.0 parts |
| N-methyl-2-pyrrolidone | 4.0 parts |
| Isopropyl alcohol | 3.0 parts |
| butylcarbitol | 2.0 parts |
| taurine | 0.3 parts |
| sodium ethylenediamine tetraacetate | 0.1 parts |
| Surfactant | 0.1 parts |
| Water + sodium hydroxide aqueous solution | 75.5 parts |
| Total | 100.0 parts |

Synthesis Example 1

Synthesis of Comparative Coloring Matter 1

In place of each of the coloring matters obtained in the Examples, synthesis of the comparative coloring matter was performed following the synthesis method described in Example 3 of Patent Document 17.

Step 1: Synthesis of organic amine for comparison represented by the following formula (20).

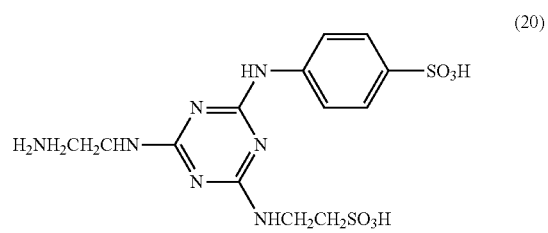

Into 330 parts of ice water were added 18.4 parts of cyanuric chloride and Leocol TD-90 (0.2 parts), and the mixture was stirred at no higher than 10° C. for 30 min. Next, thereto was added 17.4 parts of 4-sulfoaniline (using 99.3% purity commercially available product), and the reaction was allowed while adjusting the pH to 2.6 to 3.0 with a 10% aqueous sodium hydroxide solution at 0 to 5° C. for 1 hour, and while adjusting the pH to 3.0 to 3.5 at 0 to 5° C. for 1 hour, and at 25 to 30° C. for 1 hour. Subsequently, to this reaction liquid were added 12.6 parts of 2-sulfoethylamine, and was allowed to react while adjusting the pH to 7.0 to 8.0 with a 10% aqueous sodium hydroxide solution at 25° C. for 2 hours. To the reaction liquid were added 250 parts of ice. The mixture was cooled to 0° C., and 60 parts of ethylenediamine was added dropwise while maintaining at no higher than 5° C. Thereafter, the mixture was stirred over night at room temperature, and was adjusted to a pH of 1.0 using concentrated hydrochloric acid. During this time, heat generation was suppressed by adding ice to maintain at 10 to 15° C. The amount of the liquid was 980 parts in this step. To this reaction liquid were added 190 parts of sodium chloride, and the mixture was stirred for 30 min to allow a solid to precipitate. The precipitated solid was filtrated and separated to obtain 70.6 parts of a wet cake. The wet cake thus obtained was added to 280 parts of water, and permitted to dissolve by adjusting the pH to 9.0 with a 10% aqueous sodium hydroxide solution. The amount of the liquid was 400 parts in this step. This solution was adjusted to a pH of 1.0 with concentrated hydrochloric acid, and 80 parts of sodium chloride was added thereto, followed by stirring for 30 min to allow a solid to be precipitated. The precipitated solid was filtrated and separated to obtain 110.1 parts of a wet cake. The wet cake thus obtained was added into a mixed solvent of 260 parts of methanol and 26 parts of water, followed by stirring at 50° C. for 1 hour, after which the precipitated solid was filtrated and separated to obtain 89.1 parts of a wet cake. The wet cake thus obtained was dried to obtain 49.3 parts of a white powder of the intended organic amine for comparison represented by the formula (20).

Step 2: Synthesis of comparative coloring matter represented by the following formula (21) (coloring matter of the formula (21) in which 1.37 of rings A to D are pyridine rings that have been ring condensed at the 2-position and 3-position, the remaining 2.63 are benzene rings, b is 1.43, and c is 1.20).

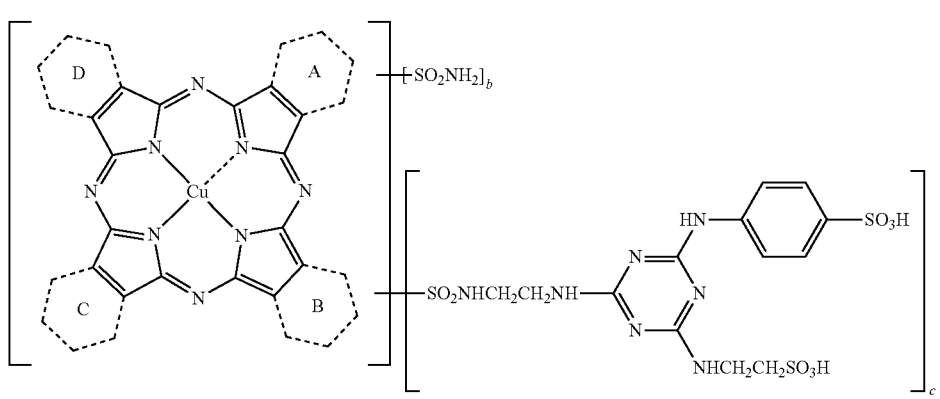

(21)

To 120 parts of ice water were added 33.0 parts of the wet cake obtained similarly to Step 2 of Example 1, followed by allowing to be suspended by stirring at no higher than 5° C. After 10 min, a solution in which 6.5 parts of the organic amine of the formula (20) obtained in the above Step 1 was dissolved while maintaining at no higher than 10° C. into the mixed liquid of 1 part of 28% aqueous ammonia and 40 parts of water was added to this suspension, and was allowed to react while maintaining a pH of 9.0 with 28% aqueous ammonia. The temperature was elevated to 20° C. while maintaining at the same pH, and reaction was further allowed over night at the same temperature. The amount of the liquid in this step was 250 parts. The temperature of the reaction liquid was elevated to 50° C., and 37.5 parts of sodium chloride was added thereto and stirred for 10 min, after which the pH was adjusted to 3.0 with concentrated hydrochloric acid, followed by filtrating and separating the precipitated solid, and washing with 100 parts of a 10% aqueous sodium chloride solution to obtain 101.2 parts of a wet cake. The wet cake thus obtained was added to 150 parts of water, and the pH was adjusted to 9.0 with a 25% aqueous sodium hydroxide solution, thereby permitting dissolution. The amount of the liquid was 275 parts in this step. The temperature of this solution was elevated to 50° C., and 27.5 parts of sodium chloride was added thereto. After the mixture was stirred for 30 min, the pH was adjusted to 2.0 with concentrated hydrochloric acid, followed by filtration and separation of the precipitated solid, and washing with 100 parts of a 10% aqueous sodium chloride solution to obtain 92.5 parts of a wet cake. The wet cake thus obtained was added to a mixed liquid of 45 parts of water and 255 parts of methanol. After stirring the mixture at 50° C. for 1 hour, the precipitated solid was filtrated and separated to obtain 51.6 parts of a wet cake. The wet cake thus obtained was dried to obtain 10.6 parts of free acid of the comparative coloring matter 1 represented by the formula (21) as a blue powder. λmax: 604 nm.

(B) Ink Jet Recording

Ink jet recording was carried out using the ink prepared in each of the Examples and Comparative Example and an ink jet printer (manufactured by Canon, Inc., PIXUS® ip4500) on the following two types of glossy papers of the glossy paper (A) and glossy paper (B).

Glossy Paper (A): manufactured by Seiko Epson Corporation, Photo Paper (Glossy)

Glossy Paper (B): manufactured by Canon, Inc., Glossy Photo Paper Pro Platinum Grade Upon ink jet recording, an image pattern was produced such that the tone with the gradations in the six steps of 100%, 85%, 70%, 55%, 40% and 25% density could be yielded, and a recorded matter of a half tone was obtained for use as a test piece.

During the ozone resistance test, the print density (Dc) of the recorded matter prior to the test was measured, and the coloring matter residual ratio was obtained at the gradation portion closest to Dc=1.0.

In addition, reflecting density was measured by colorimetry using a colorimetry system (SpectroEye, manufactured by X-rite). The colorimetry was performed under conditions of DIN density standard, 20° observer angle, D65 light source.

Various test methods for recorded images and evaluation methods for results are described in the following.

(C) Evaluation of Recorded Image

1. Ozone Resistance Test (1)

Using an ozone weather meter (manufactured by Suga Test Instruments Co., Ltd.), a test piece obtained from printing on glossy paper A was left for 24 hours at 10 ppm ozone concentration, a basin temperature of 24° C. and humidity of 60% RH. By using the above-mentioned colorimetry system after the test, the print density (Dc) before and after the test had been measured by colorimetry, from which the coloring matter residual ratio was obtained, and was evaluated in four levels.

S: Post-test coloring matter residual ratio of 90% or higher

A: Post-test coloring matter residual ratio of at least 85% to less than 90%

B: Post-test coloring matter residual ratio of at least 80% to less than 85%

C: Post-test coloring matter residual ratio of less than 80%

The coloring matter residual ratio is superior for higher values. The results are shown in the following Table 6.

2. Ozone Resistance Test (2)

Using an ozone weather meter (manufactured by Suga Test Instruments Co., Ltd.), a test piece obtained from printing on glossy paper B was left for 64 hours at 10 ppm ozone concentration, a basin temperature of 24° C. and humidity of 60% RH. By using the above-mentioned colorimetry system after the test, the print density (Dc) before and after the test had been measured by colorimetry, from which the coloring matter residual ratio was obtained, and was evaluated in four levels.

S: Post-test coloring matter residual ratio of 75% or higher

A: Post-test coloring matter residual ratio of at least 68% to less than 75%

B: Post-test coloring matter residual ratio of at least 60% to less than 68%

C: Post-test coloring matter residual ratio less than 60%

The coloring matter residual ratio is superior for higher values. The results are shown in the following Table 6.

3. Bronzing Property Evaluation

In the evaluation of the bronzing property, whether the bronzing phenomenon occurred at the gradation portion closest to Dc=1.0, similarly to the ozone resistance test, was determined visually.

A: no bronzing observed
C: bronzing occurred

The results are shown in the following Table 7.

4. Dc Value of Test Piece

Using the above-mentioned colorimetry system, the print density Dc value of the cyan color for each gradation portion on the glossy paper (A) was measured, and the maximum value of Dc value was obtained. This was evaluated in three levels.

S: Dc value of 2.15 or higher
A: Dc value of at least 2.10 to less than 2.15
B: Dc value of at least 2.00 to less than 2.10
C: Dc value less than 2.00

A larger numerical value for the Dc value indicates higher (deeper) print density, and thus is superior. The results are shown in the following Table 7.

TABLE 6

| Ozone resistance | (1) | (2) |
| --- | --- | --- |
| Example 10 | A | A |
| Example 11 | A | A |
| Example 12 | A | A |
| Example 13 | A | A |
| Example 14 | A | A |
| Example 15 | A | A |
| Example 16 | A | A |
| Example 17 | A | A |
| Comparative Example 1 | B | B |

TABLE 7

|  | Bronzing property | Dc value |
| --- | --- | --- |
| Example 10 | A | S |
| Example 11 | A | S |
| Example 12 | A | S |
| Example 13 | A | S |
| Example 14 | A | S |
| Example 15 | A | S |
| Example 16 | A | S |
| Example 17 | A | A |
| Comparative Example 1 | A | A |

As is evident from Tables 6 and 7, each of the examples using a compound of the present invention has favorable ozone resistance compared to Comparative Example 1. More specifically, for both glossy papers, the decrease in coloring matter residual ratio due to ozone exposure was small, which clearly shows high ozone resistance. In addition, together with exhibiting high print density, bronzing phenomenon was not observed.

Example 18

After cooling 95 parts of 98% sulfuric acid to 10° C., 45.0 parts of benzylamine was added over 1 hour while maintaining at no higher than 50° C. After cooling the reaction liquid to 10° C., 174.5 parts of 28% fuming sulfuric acid was added dropwise over 30 min, while maintaining at no higher than 70° C. After adding dropwise, the mixture was allowed to react for 1 hour while maintaining at 50° C. The reaction liquid was added into 250 parts of ice water over 1 hour. The amount of the liquid was 570 parts in this step. To the reaction liquid were added 233 parts of sodium sulfate, and stirred for 1 hour, then 330 parts of ice were added, followed by filtrating and separating the precipitated solid to obtain 126 parts of a wet cake. To the wet cake thus obtained were added 300 parts of water, and after confirming complete dissolution with 25% caustic soda, the pH was adjusted to no higher than 1.0 with concentrated hydrochloric acid, and the precipitated solid was filtrated and separated to obtain 68.3 parts of a wet cake. The wet cake thus obtained was dried to obtain 31.2 parts of benzylamine sulfonic acid represented by the following formula (22) as a white powder.

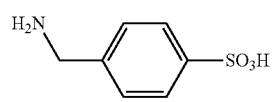

(22)

Example 19

Step 1: Synthesis of compound represented by the above formula (4) in which 0.75 of rings A to D are pyridine rings that have been ring condensed at the 2-position and 3-position, and the remaining 3.25 are benzene rings.

Added to 375 parts of sulfolane were 36.1 parts of phthalic anhydride, 9.4 parts of quinolinic acid, 108 parts of urea, 10.1 parts of copper(II) chloride and 1.5 parts of ammonium molybdate, the temperature of the mixture was elevated to 200° C., and was allowed to react for 5 hours at the same temperature. After completing the reaction, the mixture was cooled to 65° C., 50 parts of DMF (N,N-dimethylformamide) was added thereto, and the precipitated solid was filtrated and separated. The solid thus obtained was washed with 50 parts of DMF to obtain 75.1 parts of a wet cake. The wet cake thus obtained was added to 450 parts of DMF, the temperature of the mixture was elevated to 110° C., and was allowed to react for 1 hour at the same temperature. The precipitated solid was filtrated and separated, then washed with 200 parts of water to obtain a wet cake. The wet cake thus obtained was added into 450 parts of 5% hydrochloric acid, the temperature was elevated to 60° C. and stirred for 1 hour at the same temperature, followed by filtrating and separating the precipitated solid, and washing with 200 parts of water to obtain a wet cake. The wet cake thus obtained was added into 450 parts of 5% aqueous ammonia, stirred for 1 hour at 60° C., then the precipitated solid was filtrated and separated, followed by washing with 200 parts of water to obtain 78.6 parts of a wet cake. The wet cake thus obtained was dried to obtain 32.6 parts of the target compound as a blue solid.

Step 2: Synthesis of compound represented by the above formula (2) in which 0.75 of rings A to D are pyridine rings that have been ring condensed at the 2-position and 3-position, the remaining 3.25 are benzene rings, and n is 3.25.

Under room temperature, 5.8 parts of the compound of the formula (4) obtained in Step 1 of Example 19 was gradually added into 46.2 parts of chlorosulfonic acid so as not to exceed 60° C., and then the reaction was allowed at 140° C. for 4 hours. The reaction liquid thus obtained was cooled to 70° C., to which 17.9 parts of thionyl chloride was added dropwise over 30 min, and the reaction was further allowed at 80° C. for 3 hours. The reaction liquid was cooled to no higher than 30° C., and was slowly poured into 1000 parts of ice water. Thus precipitated solid was filtrated and separated, and washed with 400 parts of cold water to obtain 32.2 parts of a wet cake of the target compound.

Step 3: Synthesis of porphyrazine coloring matter of the present invention represented by the above formula (11) (coloring matter of the above formula (1) in which 0.75 of rings A to D are pyridine rings that have been ring condensed at the 2-position and 3-position, the remaining 3.25 are benzene rings, E is ethylene, X is 2,5-disulfoanilino, a is 1, b is 2.09, c is 1.16, group F is phenyl, and R is a hydrogen atom).

To 200 parts of ice water were added 32.2 parts of the wet cake obtained similarly to Step 2 in Example 1, followed by allowing to be suspended by stirring at no higher than 5° C. After 10 min, a solution in which 7.4 parts of the organic amine of the formula (10) obtained in Step 3 of Example 4 was dissolved into the mixed liquid of 2 parts of 28% aqueous ammonia and 30 parts of water was added to this suspension while maintaining at no higher than 10° C., and was allowed to react while maintaining a pH of 9.0 with 28% aqueous ammonia. The temperature was elevated to 20° C. while maintaining at the same pH, and reaction was further allowed over night at the same temperature. The amount of the liquid was 300 parts in this step. The temperature of the reaction liquid was elevated to 50° C., and 46 parts of sodium chloride was added thereto and stirred for 10 min, after which the pH was adjusted to 4.5 with concentrated hydrochloric acid. The precipitated solid was filtrated and separated, followed by washing with 200 parts of a 20% aqueous sodium chloride solution to obtain 42.8 parts of a wet cake. To the wet cake thus obtained was added 200 parts of water, and the pH was adjusted to 9.0 with a 25% aqueous sodium hydroxide solution, thereby permitting dissolution. The amount of the liquid was 260 parts in this step. The temperature of this solution was elevated to 50° C., and 50 parts of sodium chloride was added thereto. After the mixture was stirred for 30 min, the precipitated solid was filtrated and separated, followed by washing with 200 parts of a 20% aqueous sodium chloride solution to obtain 36.24 parts of a wet cake. The wet cake thus obtained was added to a mixed liquid of 40 parts of water and 160 parts of isopropyl alcohol. After stirring the mixture at 50° C. for 1 hour, the precipitated solid was filtrated and separated to obtain 31.3 parts of a wet cake. The wet cake thus obtained was dried to obtain 12.5 parts of free acid of the coloring matter of the present invention represented by the above formula (11) as a blue powder. λmax: 611 nm.

Example 20

Step 1: Synthesis of compound of the following formula (23) in which 1.00 of rings A to D are pyridine rings that have been ring condensed at the 3-position and 4-position, the remaining 3.00 are benzene rings, Q is 3.00, and a sulfo group for which the position of substitution has not been specified is substituted at the β-position.

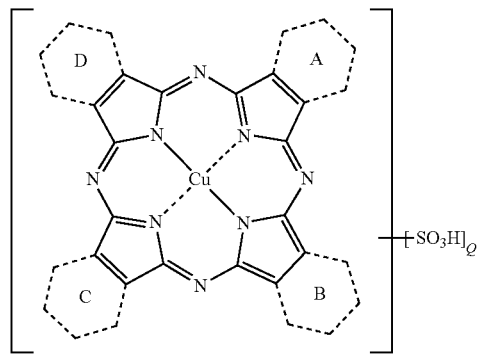

Into a four-necked flask were charged 250 parts of sulfolane, 73.86 parts of 4-sulfophthalic acid (using a commercial product obtained as a 50% aqueous solution), and 11.0 parts of 28% aqueous ammonia. The temperature of the mixture was elevated to 200° C., and was allowed to react at the same temperature for 2 hours. Thereafter, the mixture was cooled to 65° C., 8.35 parts of cinchomeronic acid, 72 parts of urea, 9.1 parts of copper(II) acetate, and 1 part of ammonium molybdate were added thereto, the temperature was elevated to 200° C. again, and the reaction was allowed at the same temperature for 5 hours. After completing the reaction, the mixture was cooled to 65° C., 50 parts of methanol was added thereto, the precipitated solid was filtrated and separated, following by washing with 200 parts of methanol to obtain 106.1 parts of a wet cake. The total amount of the wet cake thus obtained was added to 343 parts of water, 57 parts of hydrochloric acid, and 100 parts of sodium chloride, the temperature of the mixture was elevated to 60° C., and then stirred at the same temperature for 1 hour. The precipitated solid was filtrated and separated, followed by washing with 200 parts of a 20% aqueous sodium chloride solution to obtain a wet cake. The wet cake thus obtained was added into a mixed solvent of 400 parts of methanol and 100 parts of a 25% aqueous sodium hydroxide solution, followed elevating the temperature to 60° C. and stirring at the same temperature for 1 hour. The precipitated solid was filtrated and separated, followed by washing with 200 parts of methanol to obtain 76.5 parts of a wet cake. The wet cake thus obtained was added into a mixed solvent of 540 parts of methanol and 60 parts of water, followed elevating the temperature to 60° C. and stirring at the same temperature for 1 hour. The precipitated solid was filtrated and separated, followed by washing with 200 parts of methanol to obtain 72.0 parts of a wet cake. The wet cake thus obtained was dried to obtain 31.2 parts of the target compound as a blue solid. λmax: 623 nm (in aqueous solution).

Step 2: Synthesis of compound of the above formula (2) in which 1.00 of rings A to D are pyridine rings that have been ring condensed at the 3-position and 4-position, the remaining 3.00 are benzene rings, n is 3.00, and a chlorosulfonyl group for which the position of substitution has not been specified is substituted at the β-position.

Into 39.8 parts of chlorosulfonic acid was gradually added 6.65 parts of the compound obtained in the above Step 1 so as not to exceed 60° C., followed by elevating the temperature to 120° C., and then the reaction was allowed for 4 hours. The reaction liquid was cooled to 70° C., to which 13.4 parts of thionyl chloride was added dropwise over 30 min, and the reaction was allowed at 80° C. for 3 hours. The reaction liquid was cooled to no higher than 30° C., and was slowly poured into 1000 parts of ice water. Thus precipitated solid was filtrated and separated, and washed with 100 parts of cold water to obtain 33.3 parts of a wet cake of the target compound.

Step 3: Synthesis of porphyrazine coloring matter of the present invention represented by the above formula (11) (coloring matter of the above formula (1) in which 1.00 of rings A to D are pyridine rings that have been ring condensed at the 3-position and 4-position, the remaining 3.00 are benzene rings, E is ethylene, X is 2,5-disulfoanilino, a is 1, b is 1.80, c is 1.20, group F is phenyl, and R is a hydrogen atom).

To 150 parts of ice water were added 25.0 parts of the wet cake obtained in the above Step 2, followed by allowing to be suspended by stirring at no higher than 5° C. After 10 min, a solution in which 5.6 parts of the organic amine of the formula (10) obtained in Step 3 of Example 4 was dissolved into the mixed liquid of 1.0 part of 28% aqueous ammonia and 30 parts of water was added to this suspension while maintaining at no higher than 10° C., and was allowed to react while maintaining a pH of 9.0 with 28% aqueous ammonia. The temperature was elevated to 20° C. while maintaining at the same pH, and reaction was further allowed over night at the same temperature. The amount of the liquid was 225 parts in this step. The temperature of the reaction liquid was elevated to 50° C., and 33.8 parts of sodium chloride was added thereto and stirred for 30 min, after which the pH was adjusted to 4.5 with concentrated hydrochloric acid, followed by filtrating and separating the precipitated solid, and washing with 150 parts of a 20% aqueous sodium chloride solution to obtain 20.6 parts of a wet cake. The wet cake thus obtained was added to 150 parts of water, and the pH was adjusted to 9.0 with a 25% aqueous sodium hydroxide solution, thereby permitting dissolution. The amount of the liquid was 180 parts in this step. The temperature of this solution was elevated to 50° C., and 33.8 parts of sodium chloride was added thereto. After the mixture was stirred for 30 min, the pH was adjusted to 4.0 with concentrated hydrochloric acid, followed by filtration and separation of the precipitated solid, and washing with 150 parts of a 20% aqueous sodium chloride solution to obtain 29.5 parts of a wet cake. To the wet cake thus obtained were added a mixed liquid of 120 parts of isopropyl alcohol and 30 parts of water. After stirring the mixture at 50° C. for 1 hour, 23.0 parts of a wet cake were obtained. The wet cake thus obtained was dried to obtain 9.0 parts of free acid of the coloring matter of the present invention represented by the above formula (11) as a blue powder. λmax: 626 nm.

Example 21

Step 1: Synthesis of porphyrazine coloring matter of the present invention represented by the above formula (11) (coloring matter of the above formula (1) in which 1.00 of rings A to D are pyridine rings that have been ring condensed at the 3-position and 4-position, the remaining 3.00 are benzene rings, E is ethylene, X is 2,5-disulfoanilino, a is 1, b is 2.20, c is 0.80, group F is phenyl, and R is a hydrogen atom).

To 150 parts of ice water were added 25.0 parts of the wet cake obtained in Step 2 of Example 20, followed by allowing to be suspended by stirring at no higher than 5° C. After 10 min, a solution in which 3.7 parts of the organic amine of the formula (10) obtained in Step 3 of Example 4 was dissolved into the mixed liquid of 1.0 parts 28% aqueous ammonia and 30 parts water was added to this suspension while maintaining at no higher than 10° C., and was allowed to react while maintaining a pH of 9.0 with 28% aqueous ammonia. The temperature was elevated to 20° C. while maintaining at the same pH, and reaction was further allowed over night at the same temperature. The amount of the liquid was 225 parts in this step. The temperature of the reaction liquid was elevated to 50° C., and 33.8 parts of sodium chloride was added thereto and stirred for 30 min, after which the pH was adjusted to 4.5 with concentrated hydrochloric acid, followed by filtrating and separating the precipitated solid, and washing with 150 parts of a 20% aqueous sodium chloride solution to obtain 21.6 parts of a wet cake. The wet cake thus obtained was added to 150 parts of water, and the pH was adjusted to 9.0 with a 25% aqueous sodium hydroxide solution, thereby permitting dissolution. The amount of the liquid was 180 parts in this step. The temperature of this solution was elevated to 50° C., and 33.8 parts of sodium chloride was added thereto. After the mixture was stirred for 30 min, the pH was adjusted to 4.0 with concentrated hydrochloric acid, followed by filtration and separation of the precipitated solid, and washing with 150 parts of a 20% aqueous sodium chloride solution to obtain 29.7 parts of a wet cake. To the wet cake thus obtained were added a mixed liquid of 120 parts of isopropyl alcohol and 30 parts of water. After stirring the mixture at 50° C. for 1 hour, 19.8 parts of a wet cake were obtained. The wet cake thus obtained was dried to obtain 8.6 parts of free acid of the coloring matter of the present invention represented by the above formula (11) as a blue powder. λmax: 623 nm.

Example 22

Step 1: Synthesis of compound represented by the above formula (4) in which 1.00 of rings A to D are pyridine rings that have been ring condensed at the 2-position and 3-position, and the remaining 3.00 are benzene rings.

Added to 375 parts of sulfolane were 33.32 parts of phthalic anhydride, 12.5 parts of quinolinic acid, 108 parts of urea, 10.1 parts of copper(II) chloride and 1.5 parts of ammonium molybdate, the temperature of the mixture was elevated to 200° C., and was allowed to react for 5 hours at the same temperature. After completing the reaction, the mixture was cooled to 65° C., 50 parts of DMF (N,N-dimethylformamide) was added thereto, and the precipitated solid was filtrated and separated. The solid thus obtained was washed with 50 parts of DMF to obtain 75.1 parts of a wet cake. The wet cake thus obtained was added to 450 parts of DMF, the temperature of the mixture was elevated to 110° C., and was allowed to react for 1 hour at the same temperature. The precipitated solid was filtrated and separated, then washed with 200 parts of water to obtain a wet cake. The wet cake thus obtained was added into 450 parts of 5% hydrochloric acid, and the temperature was elevated to 60° C., followed by stirring at the same temperature for 1 hour. The precipitated solid was filtrated and separated, then washed with 200 parts of water to obtain a wet cake. The wet cake thus obtained was added into 450 parts of 5% aqueous ammonia, stirred for 1 hour at 60° C., then the precipitated solid was filtrated and separated, followed by washing with 200 parts of water to obtain 78.6 parts of a wet cake. The wet cake thus obtained was dried at 80° C. to obtain 25.2 parts of the target compound as a blue solid.

Step 2: Synthesis of compound of the above formula (2) in which 1.00 of rings A to D are pyridine rings that have been ring condensed at the 2-position and 3-position, the remaining 3.00 are benzene rings, and n is 3.00.

Under room temperature, 5.8 parts of the compound of formula (4) obtained in the above Step 1 was gradually added into 46.2 parts of chlorosulfonic acid so as not to exceed 60° C., and then the reaction was allowed at 140° C. for 4 hours. The reaction liquid thus obtained was cooled to 70° C., to which 17.9 parts of thionyl chloride was added dropwise over 30 min, and the reaction was further allowed for 3 hours at 70° C. The reaction liquid was cooled to no higher than 30° C., and was slowly poured into 800 parts of ice water. Thus precipitated solid was filtrated and separated, and washed with 200 parts of cold water to obtain 31.5 parts of a wet cake of the target compound.

Step 3: Synthesis of a potassium salt of the porphyrazine coloring matter of the present invention represented by the above formula (11) (coloring matter of the above formula (1) in which 1.00 of rings A to D are pyridine rings that have been ring condensed at the 2-position and 3-position, the remaining 3.00 are benzene rings, E is ethylene, X is 2,5-disulfoanilino, a is 1, b is 1.80, c is 1.20, group F is phenyl, and R is a hydrogen atom).

To 200 parts of ice water were added 31.5 parts of the wet cake obtained in Step 2 of Example 22, followed by allowing to be suspended by stirring at no higher than 5° C. After 10 min, a solution in which 7.4 parts of the organic amine of the formula (10) obtained in Step 3 of Example 4 was dissolved into the mixed liquid of 1.0 part of 28% aqueous ammonia and 30 parts of water was added to this suspension while maintaining at no higher than 10° C., and was allowed to react while maintaining a pH of 9.0 with 28% aqueous ammonia. The temperature was elevated to 20° C. while maintaining at the same pH, and reaction was further allowed overnight at the same temperature. The amount of the liquid was 300 parts in this step. The temperature of the reaction liquid was elevated to 50° C., and 45 parts of sodium chloride was added thereto and stirred for 30 min, after which the pH was adjusted to 4.5 with concentrated hydrochloric acid, followed by filtrating and separating the precipitated solid, and washing with 200 parts of a 20% aqueous sodium chloride solution to obtain 41.3 parts of a wet cake. The wet cake thus obtained was added to 200 parts of water, and the pH was adjusted to 8.0 with a 25% aqueous sodium hydroxide solution, thereby permitting dissolution. The amount of the liquid was 240 parts in this step. The temperature of this solution was elevated to 50° C., and 45 parts of sodium chloride was added thereto. After the mixture was stirred for 30 min, the pH was adjusted to 4.0 with concentrated hydrochloric acid, followed by filtration and separation of the precipitated solid, and washing with 200 parts of a 20% aqueous sodium chloride solution to obtain 51.0 parts of a wet cake. The wet cake thus obtained was added to 200 parts of water, and the pH was adjusted to 9.0 with a 10% aqueous potassium hydroxide solution, thereby permitting dissolution. The amount of the liquid was 280 parts in this step. The temperature of the reaction liquid was elevated to 50° C., and 50 parts of potassium chloride was added thereto. After the mixture was stirred for 30 min, the pH was adjusted to 1.0 with concentrated hydrochloric acid, followed by filtration and separation of the precipitated solid, and washing with 100 parts of a 3% aqueous potassium chloride solution to obtain 56.0 parts of a wet cake. The wet cake thus obtained was added to 200 parts of water, and the pH was adjusted to 8.0 with a 10% aqueous potassium hydroxide solution, thereby permitting dissolution. The amount of the liquid was 290 parts in this step. The temperature of the reaction liquid was elevated to 50° C., and 50 parts of potassium chloride was added thereto. After the mixture was stirred for 30 min, the pH was adjusted to 1.0 with concentrated hydrochloric acid, followed by filtration and separation of the precipitated solid, and washing with 100 parts of a 2% aqueous potassium chloride solution to obtain 67.0 parts of a wet cake. This wet cake was added to a mixed liquid of 160 parts of isopropyl alcohol and 40 parts of water. After stirring the mixture at 50° C. for 1 hour, 34.3 parts of a wet cake were obtained. The wet cake thus obtained was dried to obtain 12.2 parts of potassium salt of the coloring matter of the present invention represented by the above formula (11) as a blue powder. λmax: 609 nm.

Example 23

Step 1: Synthesis of a potassium salt of porphyrazine coloring matter of the present invention represented by the above formula (11) (coloring matter of the above formula (1) in which 1.20 of rings A to D are pyridine rings that have been ring condensed at the 2-position and 3-position, the remaining 2.80 are benzene rings, E is ethylene, X is 2,5-disulfoanilino, a is 1, b is 1.60, c is 1.20, group F is phenyl, and R is a hydrogen atom).

Into 165 parts of water were dissolved 15 parts of the free acid obtained in Step 4 of Example 4, and the temperature was elevated to 60° C. After adding 10 parts of potassium chloride thereto and stirring for 30 min, the pH was adjusted to 1.0 with concentrated hydrochloric acid, followed by filtrating and separating the precipitated solid, and washing with 100 parts of a 5% aqueous potassium chloride solution to obtain 86 parts of a wet cake. The wet cake thus obtained was added to 125 parts of water, and the pH was adjusted to 9.0 with an aqueous potassium hydroxide solution, thereby permitting dissolution. The amount of the liquid was 220 parts in this step. The temperature of reaction liquid was elevated to 60° C., and 11 parts of potassium chloride was added thereto. After the mixture was stirred for 30 min, the pH was adjusted to 1.0 with concentrated hydrochloric acid, followed by filtration and separation of the precipitated solid, and washing with 50 parts of water to obtain 85 parts of a wet cake. The wet cake thus obtained was added to a mixed liquid of 680 parts of isopropyl alcohol and 170 parts of water. After stirring the mixture at 60° C. for 1 hour, 47.2 parts of a wet cake were obtained. The wet cake thus obtained was dried to obtain 14.0 parts of a potassium salt of the coloring matter of the present invention represented by the above formula (11) as a blue powder. λmax: 607 nm.

Example 24

Step 1: Synthesis of compound represented by the following formula (24).

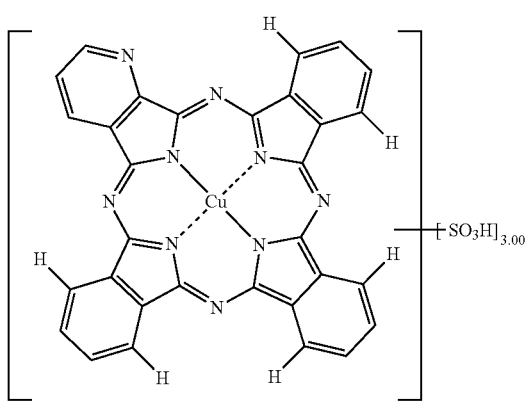

(24)

To 750 parts of sulfolane were added 295.4 parts of 4-sulfophthalic acid (using a commercial product obtained as a 50% aqueous solution), and 43.7 parts of 28% aqueous ammonia. The temperature of the mixture was elevated to 200° C., and was allowed to react at the same temperature for 2 hours. Thereafter, the mixture was cooled to 65° C., 33.4 parts of quinolinic acid, 288 parts of urea, 26.88 parts of copper(II) chloride, and 4 part of ammonium molybdate were added thereto, the temperature was elevated up to 200° C. again, and the reaction was allowed at the same temperature for 5 hours. After completing the reaction, the mixture was cooled to 65° C., 50 parts of methanol was added thereto, and the precipitated solid was filtrated and separated. The solid thus obtained was washed with 200 parts of methanol to obtain 531 parts of a wet cake. The wet cake thus obtained was added to 2800 parts of water, 400 parts of hydrochloric acid and 720 parts of sodium chloride, the temperature was elevated to 60° C., and the mixture was allowed to react at the same temperature for 1 hour. The precipitated solid was filtrated and separated, followed by washing with 400 parts of a 20% aqueous sodium chloride solution to obtain a wet cake. The wet cake thus obtained was added to 3000 parts of water, 80 parts of sulfuric acid and 600 parts of sodium chloride, followed elevating the temperature to 60° C. and stirring at the same temperature for 1 hour. The precipitated solid was filtrated and separated, followed by washing with 400 parts of a 20% aqueous sodium chloride solution to obtain 361 parts of a wet cake. The wet cake thus obtained was dried at 80° C. to obtain 144.2 parts of the intended compound represented by the above formula (24) as a blue solid.

Step 2: Synthesis of compound represented by the following formula (25).

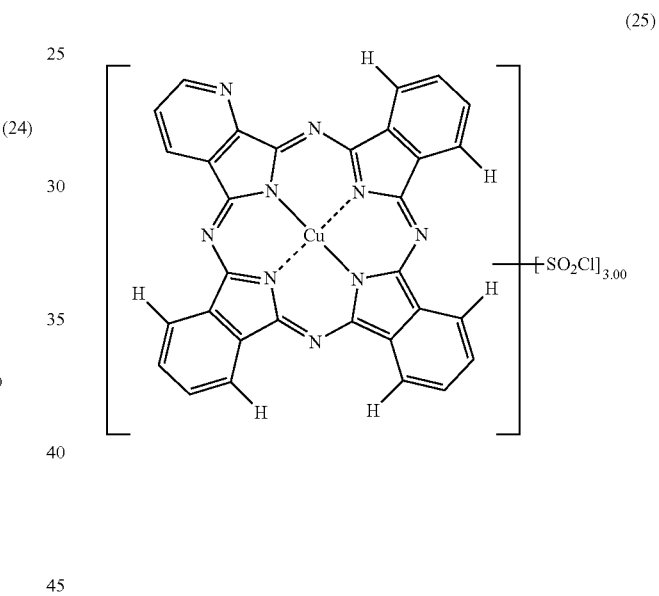

(25)

Under room temperature, 8.9 parts of the compound of formula (24) obtained in the above Step 1 was gradually added into 53 parts of chlorosulfonic acid so as not to exceed 60° C., and then the reaction was allowed at 120° C. for 4 hours. The reaction liquid thus obtained was cooled to 70° C., to which 25 parts of thionyl chloride was added dropwise in 30 min, and the reaction was further allowed for 3 hours at 80° C. The reaction liquid was cooled to no higher than 30° C., and was slowly poured into 500 parts of ice water. Thus precipitated solid was filtrated and separated, and washed with 100 parts of cold water to obtain 41.3 parts of a wet cake of the target compound.

Step 3: Synthesis of porphyrazine coloring matter of the present invention represented by the following formula (26) (coloring matter of the above formula (1) in which 1.00 of rings A to D are pyridine rings that have been ring condensed at the 2-position and 3-position, the remaining 3.00 are benzene rings, E is ethylene, X is 2,5-disulfoanilino, a is 1, b is 2.20, c is 0.80, group F is phenyl, and R is a hydrogen atom).

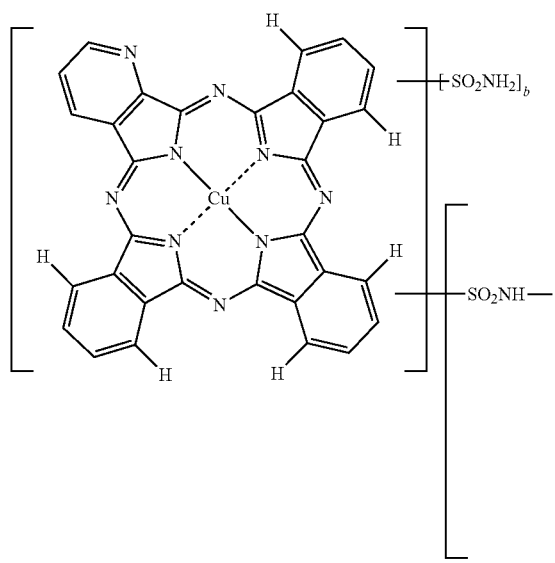
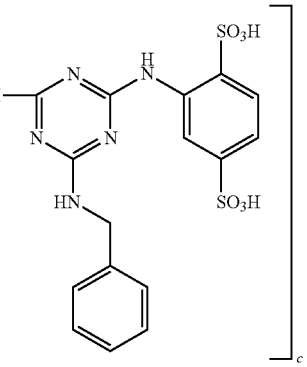

(26)

To 200 parts of ice water were added 41.3 parts of the wet cake obtained in the above Step 2, followed by allowing to be suspended by stirring at no higher than 5° C. After 10 min, a solution in which 5.0 parts of the organic amine of the formula (10) obtained in Step 3 of Example 4 was dissolved into the mixed liquid of 1.0 part of 28% aqueous ammonia and 30 parts of water was added to this suspension while maintaining at no higher than 10° C., and was allowed to react while maintaining a pH of 8.0 with 28% aqueous ammonia. The temperature was elevated to 20° C. while maintaining at the same pH, and reaction was further allowed over night at the same temperature. The amount of the liquid was 280 parts in this step. The temperature of the reaction liquid was elevated to 60° C., and 45 parts of sodium chloride was added thereto. After the mixture was stirred for 30 min, the pH was adjusted to 5.0 with concentrated hydrochloric acid, followed by filtration and separation of the precipitated solid, and washing with 200 parts of a 20% aqueous sodium chloride solution to obtain 43.1 parts of a wet cake. The wet cake thus obtained was added to 200 parts of water, and the pH was adjusted to 9.0 with a 25% aqueous sodium hydroxide solution, thereby permitting dissolution. The amount of the liquid was 290 parts in this step. The temperature of the reaction liquid was elevated to 60° C., and 45 parts of sodium chloride was added thereto. After the mixture was stirred for 30 min, the pH was adjusted to 5.0 with concentrated hydrochloric acid, followed by filtration and separation of the precipitated solid, and washing with 200 parts of a 20% aqueous sodium chloride solution to obtain 44.9 parts of a wet cake. This wet cake was added to a mixed liquid of 360 parts of isopropyl alcohol and 90 parts of water. After stirring the mixture at 50° C. for 1 hour, 45.8 parts of a wet cake were obtained. The wet cake thus obtained was dried to obtain 10.5 parts of the coloring matter of the present invention represented by the above formula (26) as a blue solid. λmax: 611 nm.

Example 25

Step 1: Synthesis of porphyrazine coloring matter of the present invention represented by the above formula (26) (coloring matter of the above formula (1) in which 1.00 of rings A to D are pyridine rings that have been ring condensed at the 2-position and 3-position, the remaining 3.00 are benzene rings, E is ethylene, X is 2,5-disulfoanilino, a is 1, b is 2.00, c is 1.00, group F is phenyl, and R is a hydrogen atom).

To 200 parts of ice water were added 41.3 parts of the wet cake obtained in Step 2 of Example 24, followed by allowing to be suspended by stirring at no higher than 5° C. After 10 min, a solution in which 6.2 parts of the organic amine of the formula (10) obtained in Step 3 of Example 4 was dissolved into the mixed liquid of 1.0 part 28% aqueous ammonia and 30 parts water was added to this suspension while maintaining at no higher than 10° C., and was allowed to react while maintaining a pH of 8.0 with 28% aqueous ammonia. The temperature was elevated to 20° C. while maintaining at the same pH, and reaction was further allowed over night at the same temperature. The amount of the liquid was 280 parts in this step. The temperature of the reaction liquid was elevated to 60° C., and 45 parts of sodium chloride was added thereto. After the mixture was stirred for 30 min, the pH was adjusted to 5.0 with concentrated hydrochloric acid, followed by filtration and separation of the precipitated solid, and washing with 200 parts of a 20% aqueous sodium chloride solution to obtain 26.1 parts of a wet cake. The wet cake thus obtained was added to 200 parts of water, and the pH was adjusted to 9.0 with a 25% aqueous sodium hydroxide solution, thereby permitting dissolution. The amount of the liquid was 290 parts in this step. The temperature of the reaction liquid was elevated to 60° C., and 45 parts of sodium chloride was added thereto. After the mixture was stirred for 30 min, the pH was adjusted to 5.5 with concentrated hydrochloric acid, followed by filtration and separation of the precipitated solid, and washing with 200 parts of a 20% aqueous sodium chloride solution to obtain 46.1 parts of a wet cake. This wet cake was added to a mixed liquid of 240 parts of isopropyl alcohol and 60 parts of water. After stirring the mixture at 50° C. for 1 hour, 18.3 parts of a wet cake were obtained. The wet cake thus obtained was dried to obtain 9.4 parts of a free acid of the coloring matter of the present invention represented by the above formula (26) as a blue solid. λmax: 614 nm.

Example 26

Step 1: Synthesis of porphyrazine coloring matter of the present invention represented by the above formula (26) (coloring matter of the above formula (1) in which 1.00 of rings A to D are pyridine rings that have been ring condensed at the 2-position and 3-position, the remaining 3.00 are benzene rings, E is ethylene, X is 2,5-disulfoanilino, a is 1, b is 2.40, c is 0.60, group F is phenyl, and R is a hydrogen atom).

To 200 parts of ice water were added 41.3 parts of the wet cake obtained in Step 2 of Example 24, followed by allowing to be suspended by stirring at no higher than 5° C. After 10 min, a solution in which 3.7 parts of the organic amine of the formula (10) obtained in Step 3 of Example 4 was dissolved into the mixed liquid of 1.0 part of 28% aqueous ammonia and 30 parts of water was added to this suspension while maintaining at no higher than 10° C., and was allowed to react while maintaining a pH of 8.0 with 28% aqueous ammonia. The temperature was elevated to 20° C. while maintaining at the same pH, and reaction was further allowed over night at the same temperature. The amount of the liquid was 270 parts in this step. The temperature of the reaction liquid was elevated to 60° C., and 45 parts of sodium chloride was added thereto. After the mixture was stirred for 30 min, the pH was adjusted to 5.0 with concentrated hydrochloric acid, followed by filtration and separation of the precipitated solid, and washing with 200 parts of a 20% aqueous sodium chloride solution to obtain 43.5 parts of a wet cake. The wet cake thus obtained was added to 200 parts of water, and the pH was adjusted to 9.0 with a 25% aqueous sodium hydroxide solution, thereby permitting dissolution. The amount of the liquid was 270 parts in this step. The temperature of the reaction liquid was elevated to 60° C., and 45 parts of sodium chloride was added thereto. After the mixture was stirred for 30 min, the pH was adjusted to 5.0 with concentrated hydrochloric acid, followed by filtration and separation of the precipitated solid, and washing with 200 parts of a 20% aqueous sodium chloride solution to obtain 42.8 parts of a wet cake. This wet cake was added to a mixed liquid of 240 parts of isopropyl alcohol and 60 parts of water. After stirring the mixture at 50° C. for 1 hour, 45.8 parts of a wet cake were obtained. The wet cake thus obtained was dried to obtain 10.5 parts of a free acid of the coloring matter of the present invention represented by the above formula (26) as a blue solid. λmax: 608 nm.

(D) Preparation of Ink

Each component listed in the above Table 5 was mixed and dissolved with the coloring matters of the respective Examples obtained in the above Examples, and then filtrated with a 0.45 μm membrane filter (manufactured by Advantech Co., Ltd.), thereby preparing inks for evaluation tests. Ion-exchanged water was used as the "water" for the preparation of ink. In addition, for inks in which the coloring matter in the Example is a sodium salt, the pH of the ink was adjusted using sodium hydroxide so as to be 8 to 10, and for inks in which the coloring matter in the Example is a potassium salt, by using potassium hydroxide, and water was added so as to make up the total amount of 100 parts. The preparation of the ink using the coloring matter obtained in Example 19 is defined as Example 27, and similarly, the preparations of inks using the coloring matters obtained in Examples 20 to 26 are defined as Examples 27 to 34, respectively.

(E) Ink Jet Recording

Ink jet recording was carried out using the ink prepared in each of the Examples and Comparative Example 1 and an ink jet printer (manufactured by Canon, Inc., PIXUS® ip4500) on the following glossy paper (B) and glossy paper (C).

Glossy Paper (B): manufactured by Canon, Inc., Glossy Photo Paper Pro Platinum Grade Glossy Paper (C): manufactured by Seiko Epson Corporation, Photo Paper CRISPIA (Super Glossy)

Upon ink jet recording, printing was performed in an image pattern similar to the above-mentioned (B) Ink Jet Recording for use as a test piece. In addition, colorimetry was performed using the same conditions as the colorimetry conditions in the above-mentioned (B) Ink Jet Recording. The test methods and evaluation methods for results are described in the following.

(F) Evaluation of Recorded Image

1. Ozone Resistance Test (1)

Using an ozone weather meter (manufactured by Suga Test Instruments Co., Ltd.), test pieces obtained from printing on glossy paper (B) and glossy paper (C) were left for 24 hours at 10 ppm ozone concentration, a basin temperature of 23° C. and humidity of 50% RH. By using above-mentioned colorimetry system after the test, the print density (Dc) before and after the test had been measured by colorimetry, from which the coloring matter residual ratio was obtained, and was evaluated in four levels.

S: Post-test coloring matter residual ratio of 90% or higher

A: Post-test coloring matter residual ratio of at least 85% to less than 90%

B: Post-test coloring matter residual ratio of at least 80% to less than 85%

C: Post-test coloring matter residual ratio of less than 80%

The coloring matter residual ratio indicates there is more durability to ozone gas for a coloring matter with a higher numerical value, and is superior as a coloring matter. The results are shown in the following Table 8.

TABLE 8

| Ozone resistance | (B) | (C) |
|---|---|---|
| Example 27 | B | A |
| Example 28 | B | A |
| Example 29 | A | S |
| Example 30 | B | A |
| Example 31 | B | A |
| Example 32 | B | A |
| Example 33 | B | A |
| Example 34 | B | A |
| Comparative Example 1 | C | B |

The coloring matters of the present invention represented by the above formula (1) used in Examples 27 to 34 are compounds in which the number of nitrogen-containing heteroaromatic rings of the rings A to D all represented by dotted lines is 0.75 to 1.20 in terms of mean value.

On the other hand, the compound used in Comparative Example 1 is a compound in which the number of nitrogen-containing heteroaromatic rings is 1.37 in terms of mean value.

As described above, the ozone resistance generally improves accompanying the number of nitrogen-containing heteroaromatic rings of the rings A to D increasing. However, the coloring matter residual ratio of each of the Examples using the coloring matter of the present invention for which the number of nitrogen-containing heteroaromatic rings is smaller, has more favorable ozone resistance than Comparative Example 1 on all of the glossy papers. In a case of this number of nitrogen-containing heteroaromatic rings matching that of the Comparative Example, it is clear that the present invention has a more remarkable difference in the coloring matter residual ratio; therefore, an image recorded using the coloring matter or the ink composition containing this according to the present invention will clearly exhibit high ozone resistance.

INDUSTRIAL APPLICABILITY

Recorded images obtained using the porphyrazine coloring matter and ink composition containing this of the present invention yield high ozone resistance and high print density, and thus the present invention is very useful as an ink for a variety of recording, and particularly inks for ink jet recording.

The invention claimed is:

1. A porphyrazine coloring matter represented by the following formula (1) or a salt thereof,

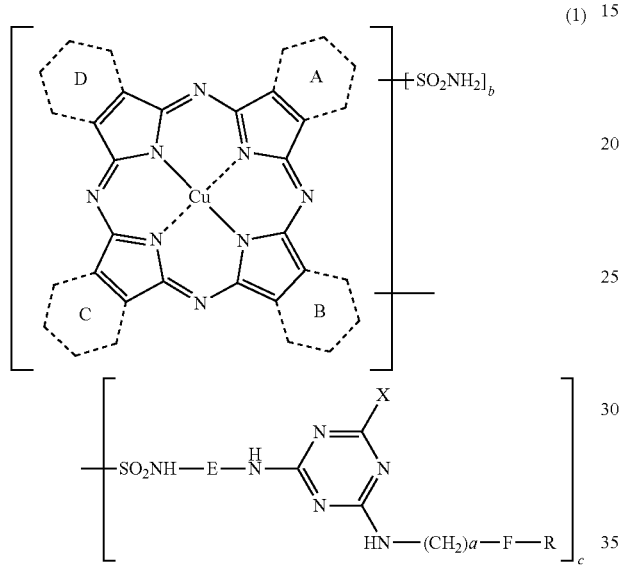

wherein,
rings A to D represented by dotted lines each independently represent a benzene ring or a six-membered nitrogen-containing heteroaromatic ring that has been ring condensed to a porphyrazine ring; and the number of nitrogen-containing heteroaromatic rings is more than 0.00 and no more than 3.00 in terms of mean value, and the rest represents a benzene ring;
E represents a C2-C12 alkylene;
X represents a sulfoanilino group, a carboxyanilino group, a phosphonoanilino group, a sulfonaphthylamino group, a carboxynaphthylamino group or a phosphononaphthylamino group which may have one or at least two types of substituent(s) selected from the group consisting of a sulfo group, a carboxy group, a phosphorate group, a sulfamoyl group, a carbamoyl group, a hydroxy group, a C1-C6 alkoxy group, an amino group, a mono-C1-C4 alkylamino group, a di-C1-C4 alkylamino group, a mono-C6-C10 arylamino group, a di-C6-C10 arylamino group, a C1-C3 alkylcarbonylamino group, an ureido group, a C1-C6 alkyl group, a nitro group, a cyano group, a halogen atom, a C1-C6 alkylsulfonyl group, and a C1-C6 alkylthio group;
R represents a hydrogen atom, a sulfo group, a carboxy group, a phosphorate group, a sulfamoyl group, a carbamoyl group, a hydroxy group, a C1-C6 alkoxy group, an amino group, a mono-C1-C6 alkylamino group, a di-C1-C6 alkylamino group, a mono-C6-C10 arylamino group, a di-C6-C10 arylamino group, a C1-C3 alkylcarbonylamino group, an ureido group, a C1-C6 alkyl group, a nitro group, a cyano group, a halogen atom, a C1-C6 alkylsulfonyl group, or an alkylthio group;
group F represents a phenyl group, or a six-membered nitrogen-containing heteroaromatic ring group;
a represents an integer of 1 to 6,
b is at least 0.00 and less than 3.90 in terms of mean value,
c is at least 0.10 and less than 4.00 in terms of mean value, and
the sum of b and c is at least 1.00 and less than 4.00 in terms of mean value.

2. The porphyrazine coloring matter or salt thereof according to claim 1, wherein the six-membered nitrogen-containing heteroaromatic rings represented by rings A to D is a pyridine ring or a pyrazine ring.

3. The porphyrazine coloring matter or salt thereof according to claim 1, obtained by reacting an organic amine represented by the following formula (3) with a porphyrazine compound represented by the following formula (2) in the presence of ammonia,

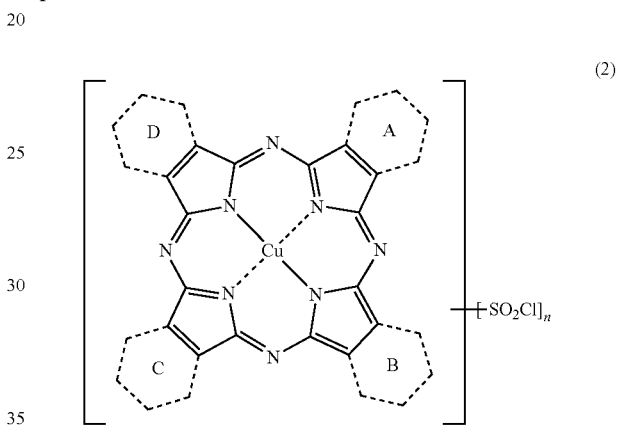

wherein rings A to D are defined similarly to those according to claim 1, and n is at least 1.00 and less than 4.00 in terms of mean value,

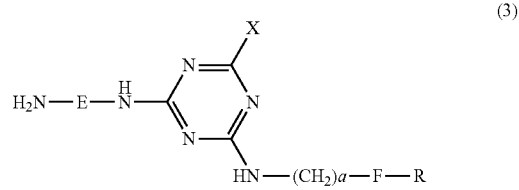

wherein E, X, R, group F and a are defined similarly to those according to claim 1.

4. The porphyrazine coloring matter or salt thereof according to claim 1,
wherein E is a C2-C4 alkylene;
X represents a sulfoanilino group, a carboxyanilino group, a phosphonoanilino group, a sulfonaphthyl amino group, a carboxynaphthyl amino group or a phosphononaphthyl amino group which may have zero to three of one or at least two types of substituent(s) selected from the group consisting of a sulfo group, a carboxy group, a hydroxy group, a sulfamoyl group, a C1-C6 alkoxy group, an amino group, a mono-C1-C4 alkylamino group, a di-C1-C4 alkylamino group, a C1-C3 alkylcarbonylamino group, a nitro group, a halogen atom, a C1-C6 alkylsulfonyl group, and a C1-C6 alkylthio group;

R is a hydrogen atom, a sulfo group, a carboxy group, a C1-C6 alkoxy group, a C1-C6 alkyl group or a halogen atom;

group F is a phenyl group, or a pyridyl group when R is a hydrogen atom; and a is 1 or 2.

5. The porphyrazine coloring matter or salt thereof according to claim 1, wherein E is a linear C2-C4 alkylene;

X represents a sulfoanilino group which may have zero to two of one or two types of substituent(s) selected from the group consisting of a sulfo group, a carboxy group, a hydroxy group, a C1-C6 alkoxy group, an amino group, a mono-C1-C4 alkylamino group, a di-C1-C4 alkylamino group, a C1-C3 alkylcarbonylamino group, a nitro group, a halogen atom, a C1-C6 alkylsulfonyl group, and a C1-C6 alkylthio group; a carboxyanilino group which may have zero to two of one or two types of substituent(s) selected from the group consisting of a sulfo group, a carboxy group, a hydroxy group and a sulfamoyl group; a phosphonoanilino group; or a sulfonaphthyl amino group which may have zero to two of one or two types of substituent(s) selected from the group consisting of a sulfo group and a hydroxy group;

group F is a phenyl group, or a pyridyl group when R is a hydrogen atom; and a is 1 or 2.

6. The porphyrazine coloring matter or salt thereof according to claim 5, wherein the nitrogen-containing heteroaromatic ring of the rings A to D is each independently a pyridine ring that has been ring condensed at the 2-position and 3-position, or the 3-position and 4-position, or a pyrazine ring that has been ring condensed at the 2-position and 3-position; and E is ethylene or propylene.

7. The porphyrazine coloring matter or salt thereof according to claim 1, wherein the nitrogen-containing heteroaromatic ring of the rings A to D are each independently a pyridine ring that has been ring condensed at the 2-position and 3-position;

E is ethylene;

X is a sulfoanilino group which may have zero or one sulfo group as a substituent, or is a sulfonaphthylamino group having two sulfo groups as substituents;

R is a sulfo group or a carboxy group;

group F is a phenyl group, or a pyridyl group when R is a hydrogen atom;

a is 1, b is at least 0.00 and less than 3.90 in terms of mean value, c is at least 0.10 and less than 4.00 in terms of mean value, and the sum of b and c is at least 1.00 and less than 4.00 in terms of mean value.

8. An ink composition comprising the porphyrazine coloring matter or salt thereof according to claim 1 as a coloring matter.

9. The ink composition according to claim 8, further comprising an organic solvent.

10. The ink composition according to claim 9, wherein the ink composition is utilizing in ink jet recording.

11. An ink jet recording method, comprising discharging ink droplets of the ink composition according to claim 8 in response to a recording signal to execute recording on a record-receiving material.

12. The ink jet recording method according to claim 11, wherein the record-receiving material is a communication sheet.

13. The ink jet recording method according to claim 12, wherein the communication sheet is a sheet on which surface treatment has been performed, the sheet having an ink receiving layer containing white inorganic pigment particles on a substrate.

14. A vessel containing the ink composition according to claim 8.

15. An ink jet printer in which the vessel according to claim 14 is loaded.

16. A colored object which is colored by the porphyrazine coloring matter or salt thereof according to claim 1.

17. A colored object which is colored by the ink composition according to claim 8.

18. A colored object which is colored by the ink jet recording method according to claim 11.

* * * * *